United States Patent
Miyagawa et al.

(10) Patent No.: US 9,900,818 B2
(45) Date of Patent: Feb. 20, 2018

(54) COMMUNICATION SYSTEM

(75) Inventors: Yusuke Miyagawa, Tokyo (JP);
Takayuki Kido, Tokyo (JP); Takuo Akimoto, Tokyo (JP); Yuki Nakanishi, Tokyo (JP); Osamu Kurokawa, Tokyo (JP); Yasuhiro Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/343,439

(22) PCT Filed: Aug. 28, 2012

(86) PCT No.: PCT/JP2012/071657
§ 371 (c)(1),
(2), (4) Date: Mar. 7, 2014

(87) PCT Pub. No.: WO2013/038897
PCT Pub. Date: Mar. 21, 2013

(65) Prior Publication Data
US 2014/0213260 A1 Jul. 31, 2014

(30) Foreign Application Priority Data
Sep. 16, 2011 (JP) .................. 2011-203677

(51) Int. Cl.
*H04W 36/16* (2009.01)
*H04W 36/00* (2009.01)
(Continued)

(52) U.S. Cl.
CPC ..... *H04W 36/165* (2013.01); *H04W 36/0033* (2013.01); *H04W 76/04* (2013.01); *H04W 36/12* (2013.01); *H04W 84/045* (2013.01)

(58) Field of Classification Search
CPC ......... H04L 29/12009; H04L 29/12047; H04L 61/15; H04L 67/1002; H04L 67/1008;
(Continued)

(56) References Cited

U.S. PATENT DOCUMENTS

| 2004/0017798 A1* | 1/2004 | Hurtta et al. ................ 370/352 |
| 2005/0157673 A1* | 7/2005 | Verma et al. ................ 370/328 |

(Continued)

FOREIGN PATENT DOCUMENTS

| CN | 101052161 A | 10/2007 |
| CN | 101242665 A | 8/2008 |

(Continued)

OTHER PUBLICATIONS

ETSI TS 123 236 v 10.2.1 (May 2011), 3GPP TS 23.236 release10.*
(Continued)

*Primary Examiner* — Matthew Sams
(74) *Attorney, Agent, or Firm* — Wilmer Cutler Pickering Hale & Dorr

(57) ABSTRACT

When a representative PS server receives a P-TMSI contained in a PDP context succession request signal from a UE according to a handover communication procedure prescribed in an applicable standard after the UE moves, if the PS server identified with the identification information contained in the received P-TMSI is not its own representative PS server, the representative PS server identifies the PS server identified with the identification information as a PS server that manages a femtocell base station to which the UE belonged before it moved and forwards the PDP context succession request signal to the identified PS server.

6 Claims, 40 Drawing Sheets

(51) Int. Cl.
*H04W 76/04* (2009.01)
*H04W 84/04* (2009.01)
*H04W 36/12* (2009.01)

(58) Field of Classification Search
CPC ............ H04L 67/1019; H04L 67/1021; H04L 67/1029; H04L 67/14; H04W 28/02; H04W 36/22; H04W 60/04; H04W 74/00; H04W 76/04; H04W 80/00; H04W 84/042; H04W 84/12; H04W 88/08
See application file for complete search history.

(56) References Cited

U.S. PATENT DOCUMENTS

| | | |
|---|---|---|
| 2010/0040023 A1 | 2/2010 | Gallagher et al. |
| 2010/0041387 A1 | 2/2010 | Khetawat et al. |
| 2010/0041402 A1 | 2/2010 | Gallagher et al. |
| 2010/0041403 A1 | 2/2010 | Khetawat et al. |
| 2010/0041405 A1 | 2/2010 | Gallagher et al. |
| 2010/0074187 A1 | 3/2010 | Sun et al. |
| 2010/0074223 A1 | 3/2010 | Mahdi |
| 2010/0074224 A1 | 3/2010 | Mahdi et al. |
| 2010/0077459 A1* | 3/2010 | Mahdi et al. .................. 726/4 |
| 2011/0188446 A1* | 8/2011 | Bienas et al. ................ 370/328 |
| 2013/0310028 A1 | 11/2013 | Miyagawa et al. |

FOREIGN PATENT DOCUMENTS

| | | |
|---|---|---|
| EP | 2725832 A1 | 4/2014 |
| JP | 2008-271140 A | 11/2008 |
| JP | 2010-252139 A | 11/2010 |
| WO | WO-2009/133772 A1 | 11/2009 |
| WO | WO-2010/019970 A1 | 2/2010 |
| WO | WO-2010/036535 A1 | 4/2010 |
| WO | WO 2011127224 A1 * | 10/2011 |

OTHER PUBLICATIONS

International Search Report corresponding to PCT/JP2012/071657 dated Nov. 20, 2012 (3 pages).
"LAI and TMSI in Attach Accept and TAU Accept messages," 3GPP TSG-RAV WG5 Meeting #45, R5-096449, Oct. 26, 2009, pp. 1-6.
Extended European Search Report issued by the European Patent Office for Application No. 12832264.1 dated May 11, 2015 (10 pages).
Chinese Office Action issued in corresponding Chinese Application No. 201280045271.8, dated Oct. 10, 2016, 16 pages.

* cited by examiner

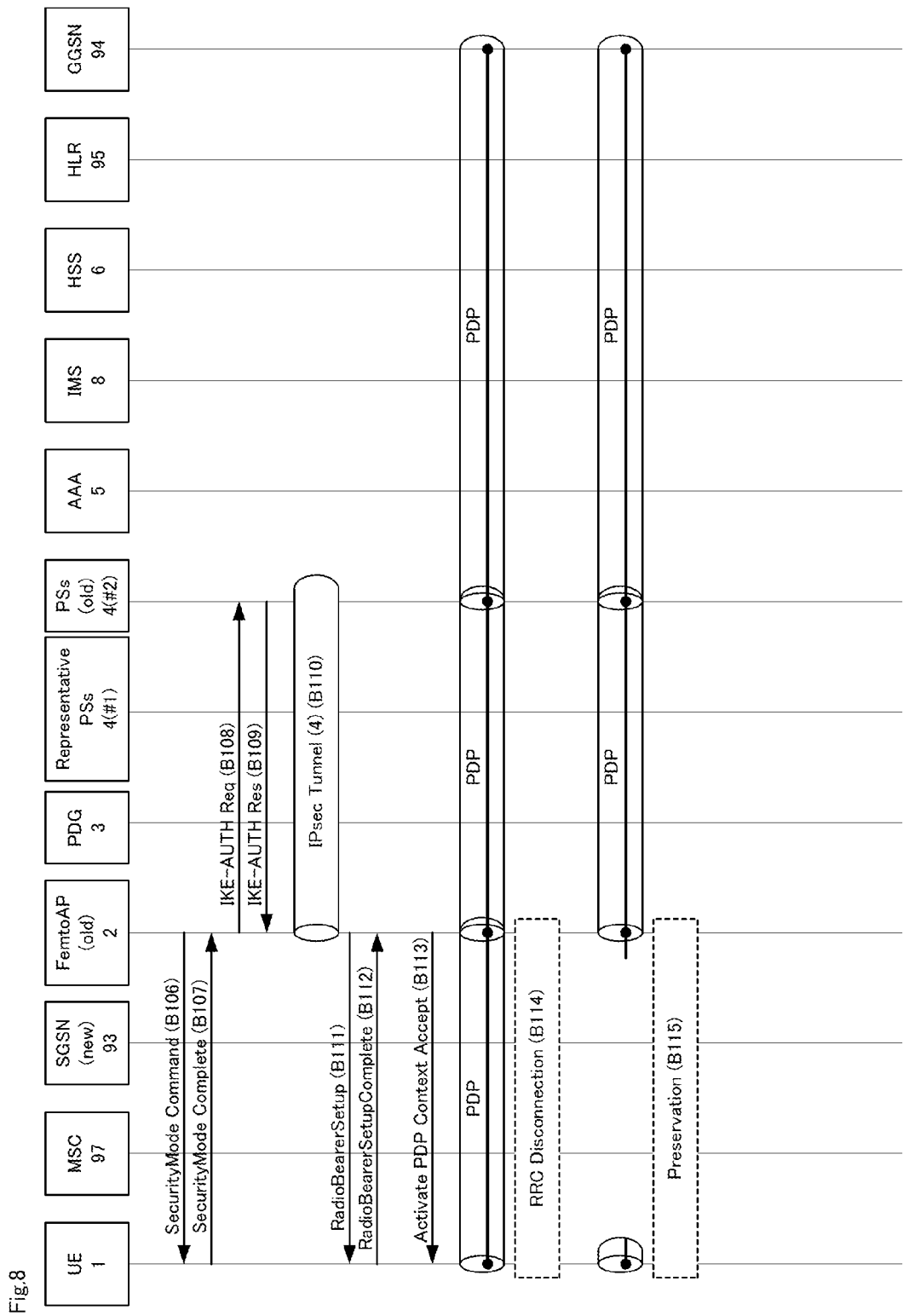

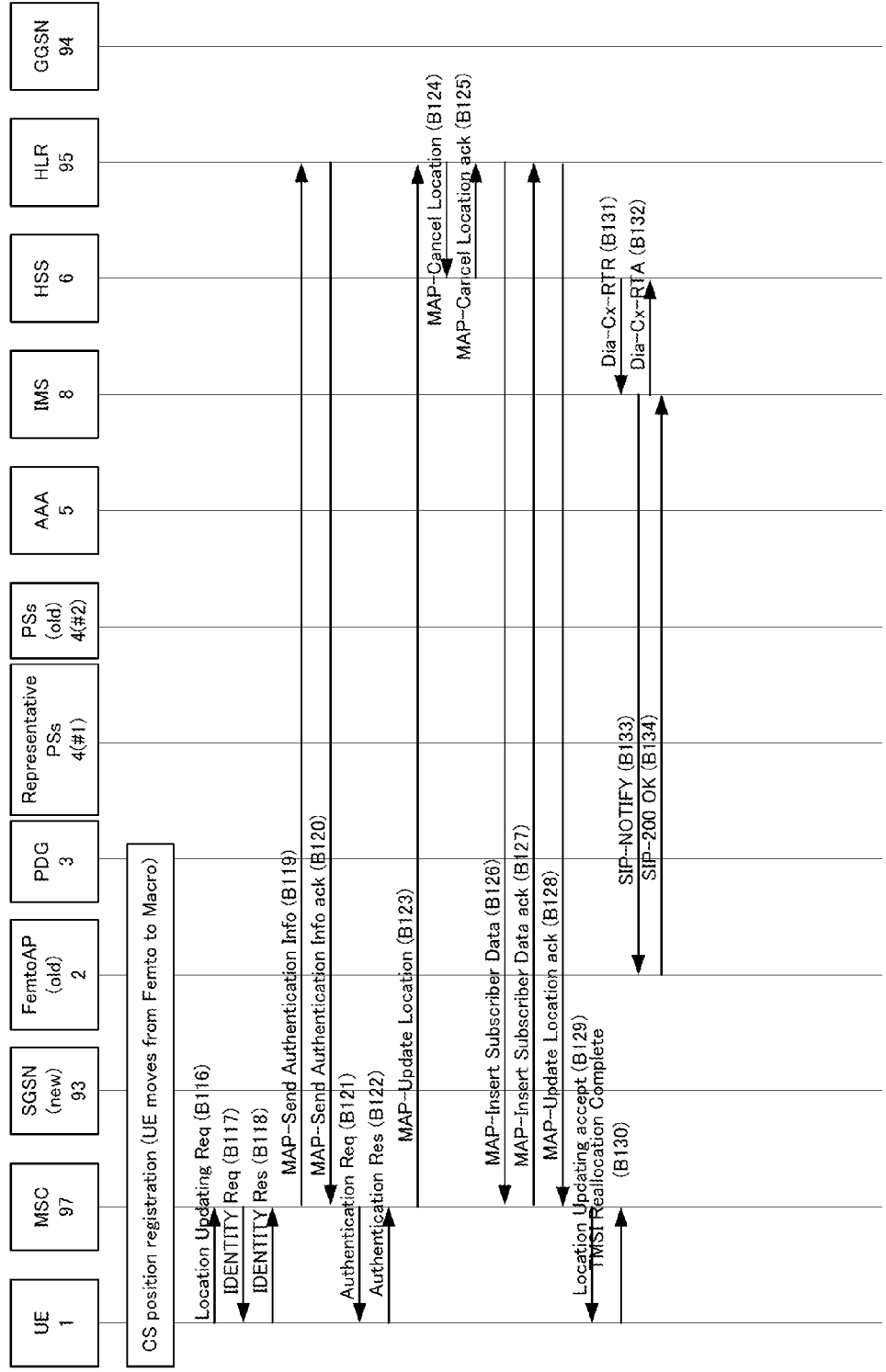

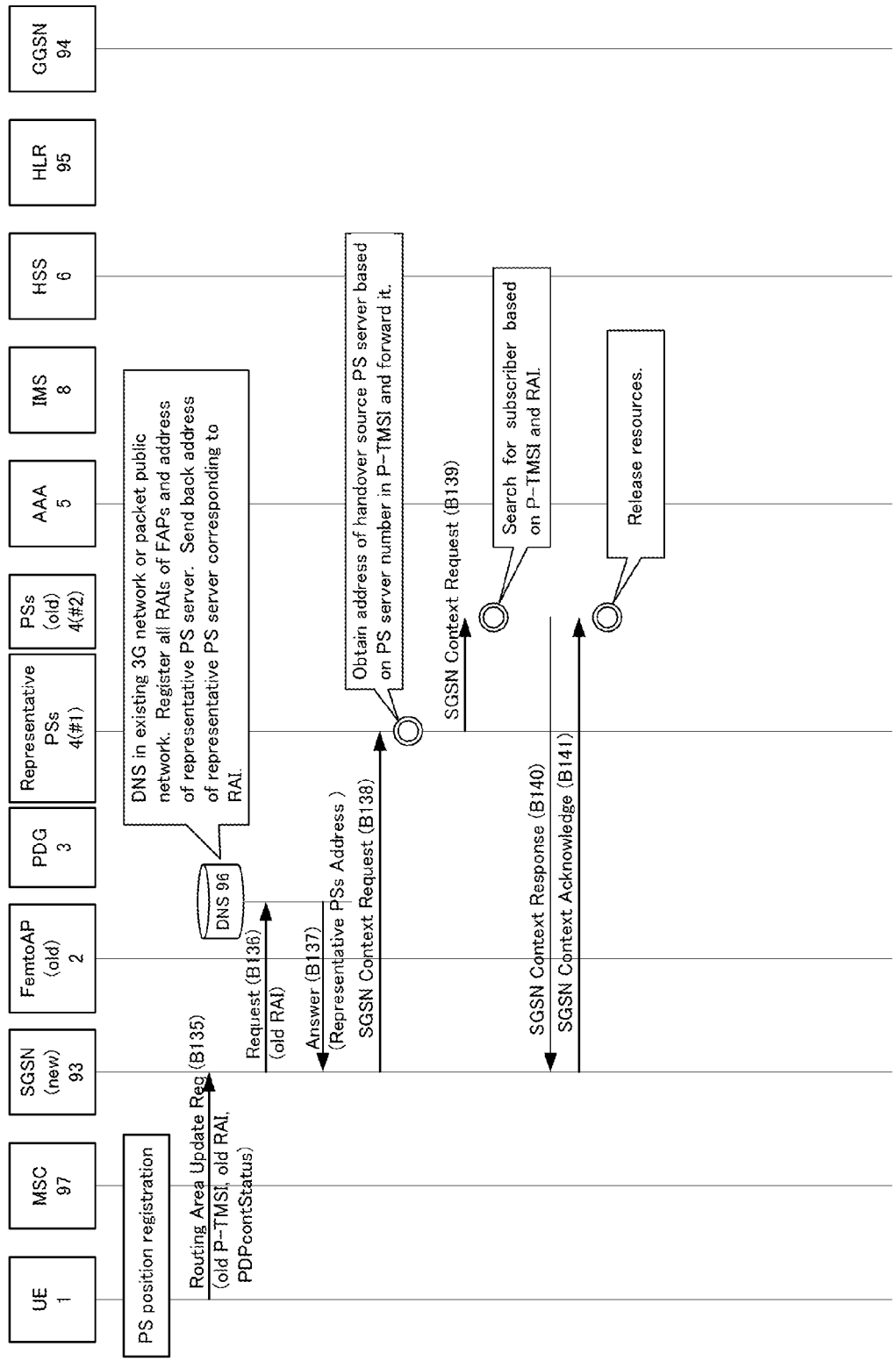

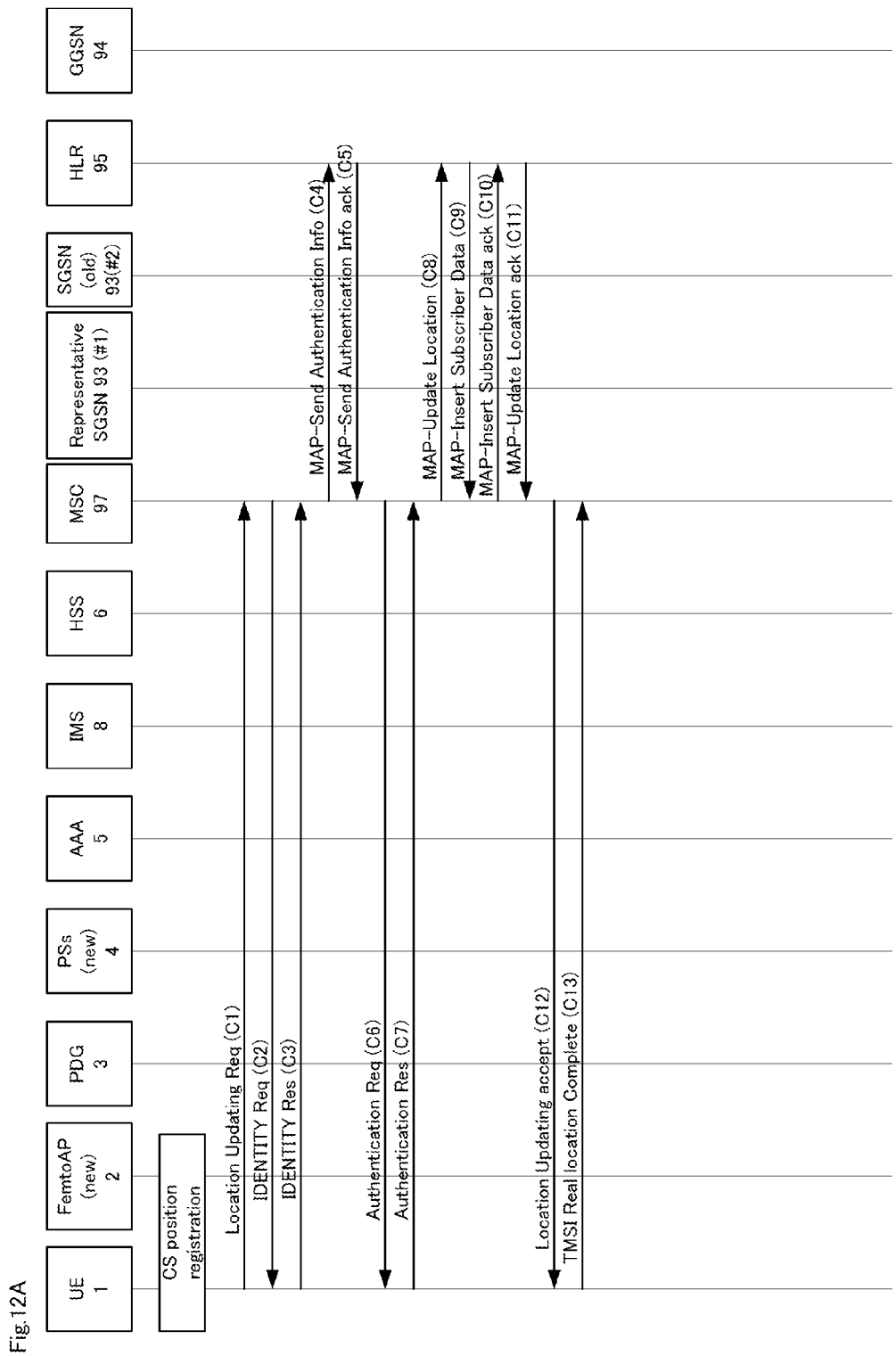

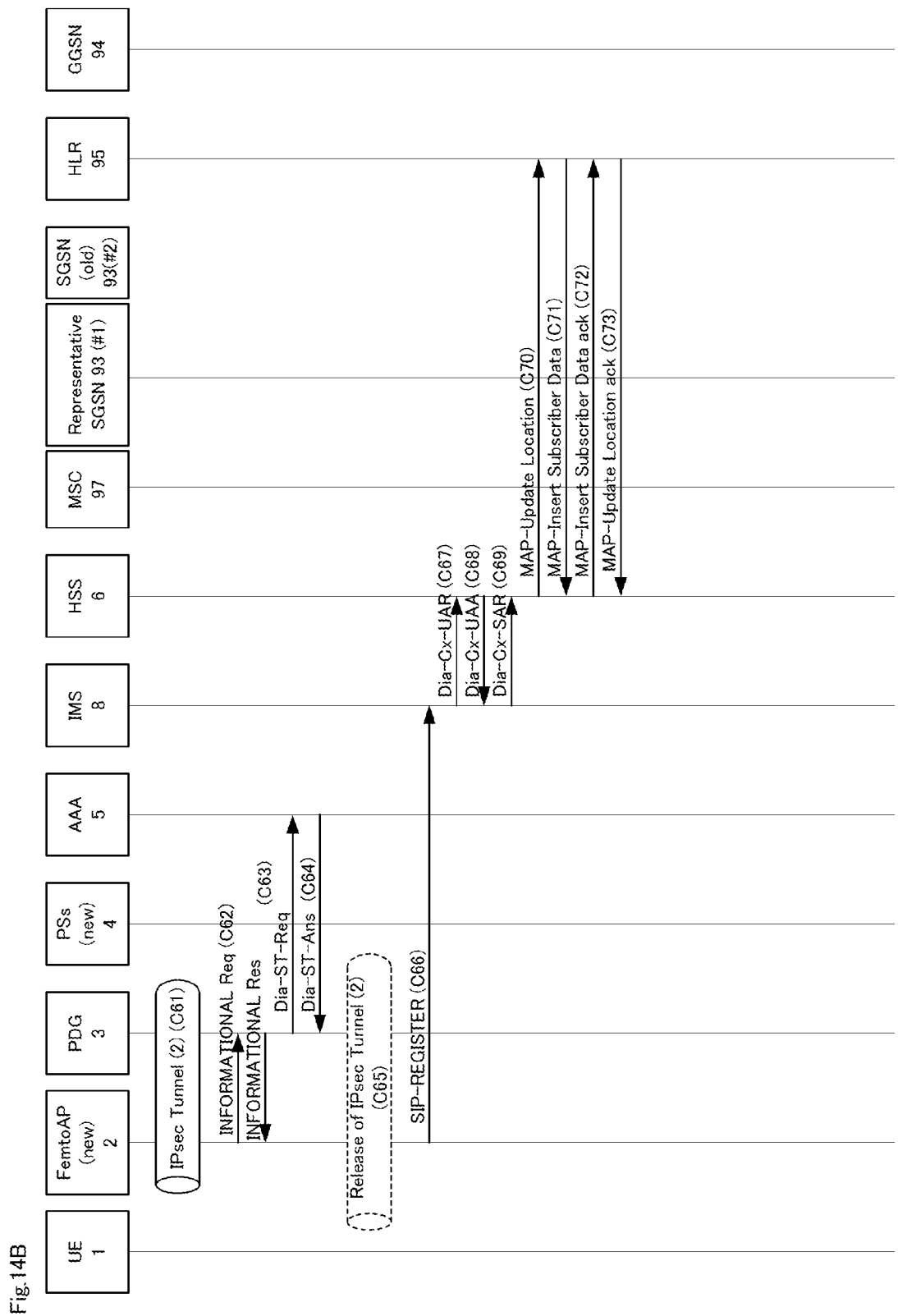

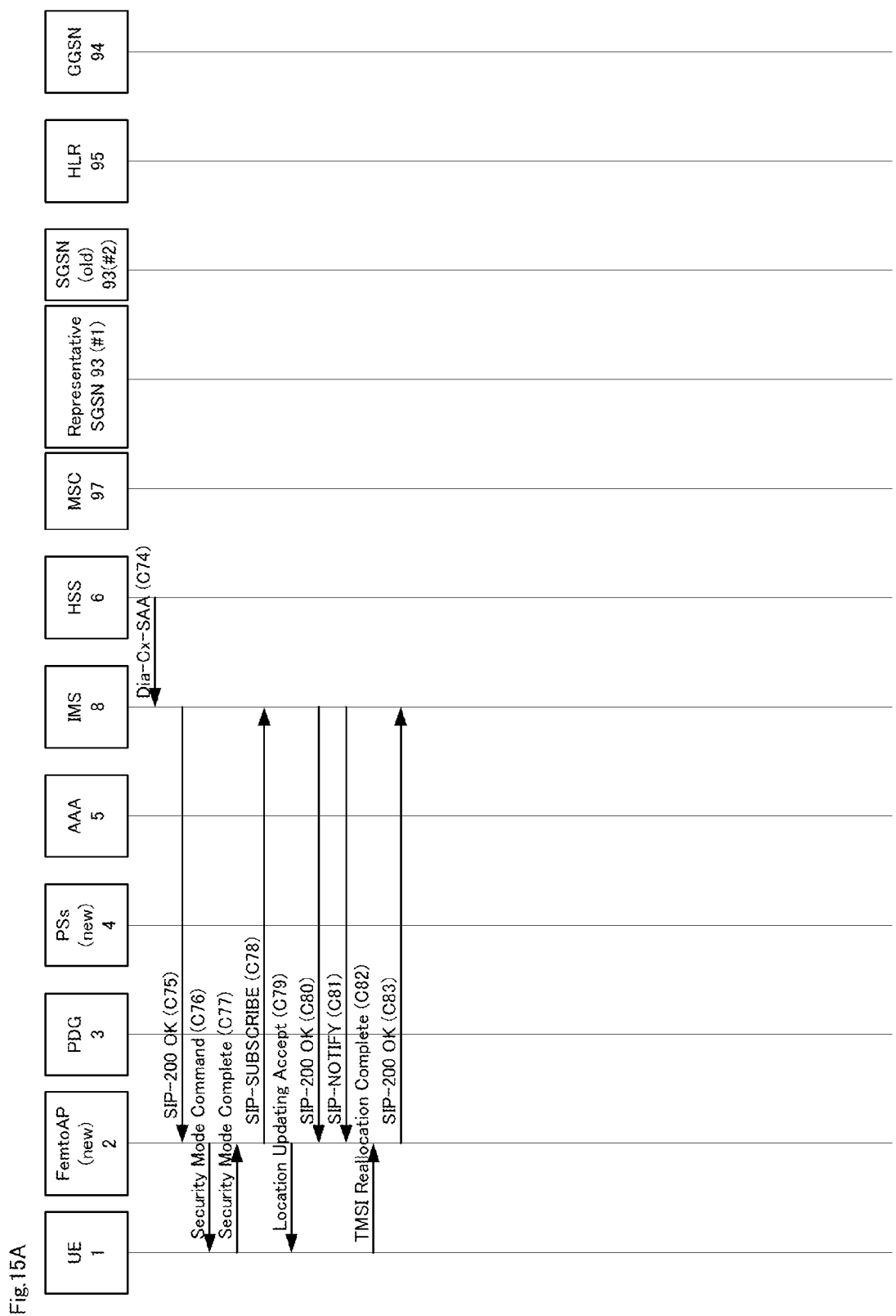

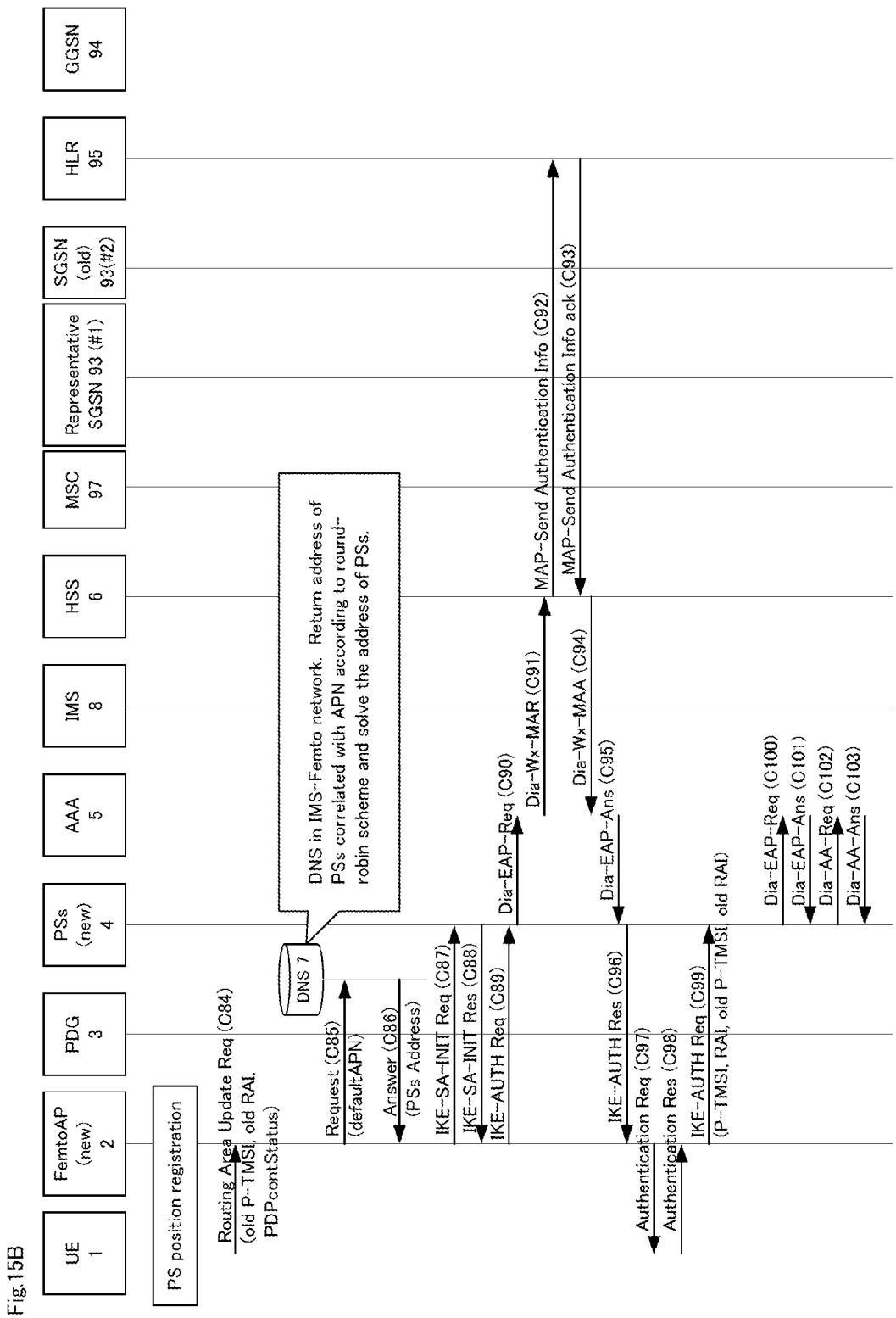

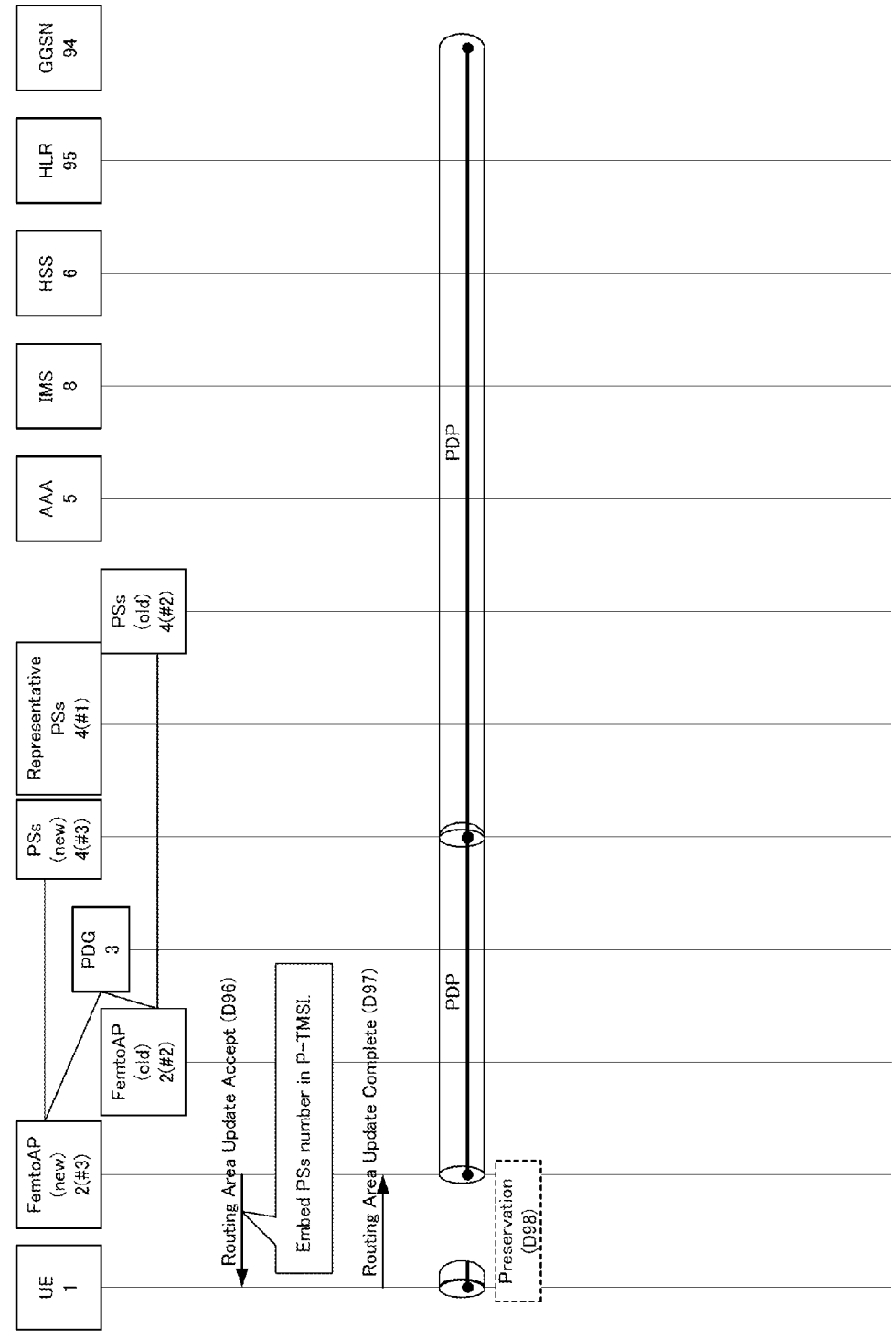

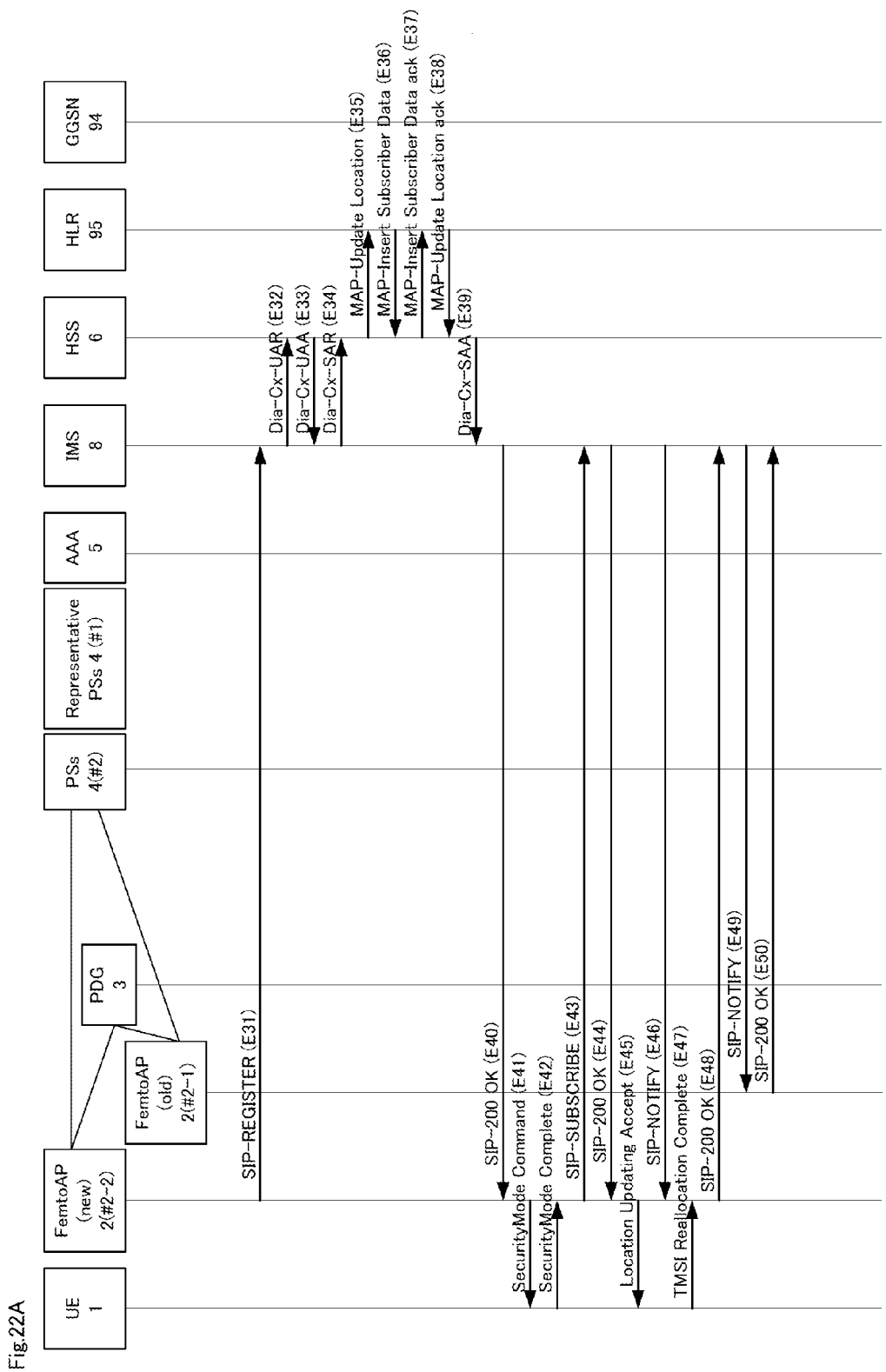

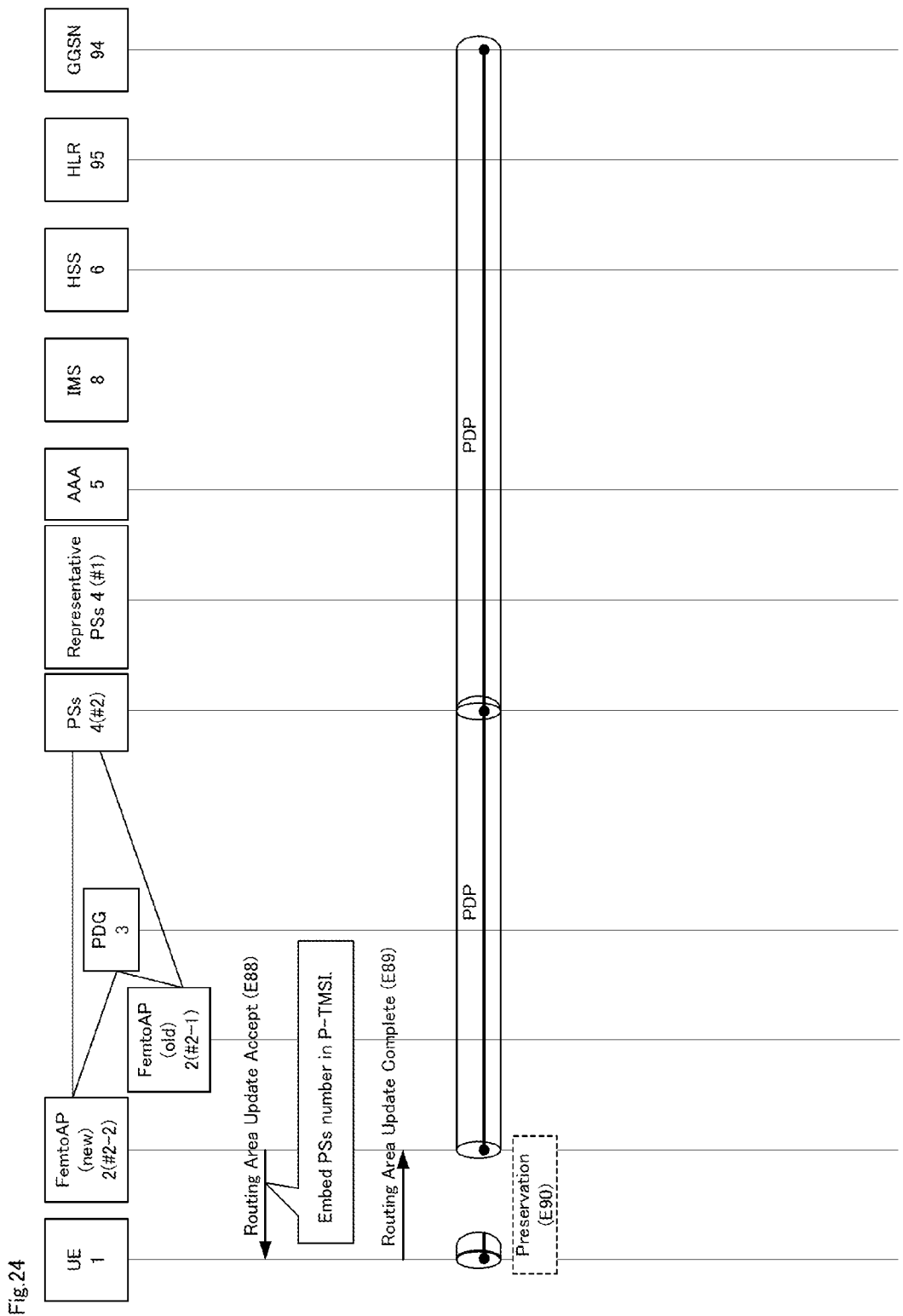

COMMUNICATION SYSTEM

CROSS-REFERENCE TO RELATED APPLICATIONS

This application is a national stage application of International Application No. PCT/JP2012/071657 entitled "Communication System," filed on Aug. 28, 2012, which claims the benefit of the priority of Japanese patent application No. 2011-203677, filed on Sep. 16, 2011, the disclosures of each of which are hereby incorporated by reference in their entirety.

TECHNICAL FIELD

The present invention relates to a communication system that accomplishes handover using a femtocell base station; a service control device, a femtocell base station, and a method that are used for the communication system; and programs for the service control device and the femtocell base station.

BACKGROUND ART

In the existing 3G (third generation) mobile communication network that connects calls of wireless terminals (UE: user equipment) such as mobile phones, even if a UE moves and a base station (wireless link logical node: Node B) to which the UE belongs changes to another base station, handover is performed to continue the telephone call.

With respect to the handover in the existing 3G network, the 3GPP standard (3rd Generation Partnership Project) has established various standards (for example, refer to Non-Patent Literature 1).

One related art reference discloses a system in which when a mobile terminal hands over between the existing 3G network and a wireless LAN, the mobile terminal can refer to GGSN (Gateway General Packet Radio Service Support Node) information at the handover destination coverage such that the mobile terminal can select the same GGSN as the handover source coverage (for example, refer to Patent Literature 1).

The applicant of the present patent application has disclosed a communication system that uses a femtocell base station (FAP: Femto Access Point) that connects a mobile terminal to a mobile communication core network through a wired channel of an IMS (IP Multimedia Subsystem) network installed at home, office, etc. (for example, refer to Patent Literature 2).

The communication system disclosed in Patent Literature 2 allows a mobile terminal that moves to continue a call by handover performed not only between FAPs, but also between the exiting 3G network that controls telephone calls using an MSC (Mobile Service Switching Center) and an FAP-based communication system that uses an IMS core network that controls calls.

RELATED ART LITERATURE

Patent Literature

Patent Literature 1: JP2008-271140A, Publication
Patent Literature 2: JP2010-252139A, Publication

Non-Patent Literature

Non-Patent Literature 1: 3GPP technical specifications TS 23.236 V5.4.0 (2005-09)

SUMMARY OF THE INVENTION

Problem to be Solved by the Invention

However, the IMS network is an architecture for a CS (Circuit Switching) service that mainly implements telephone calls and so forth. The technologies for the exiting 3G networks disclosed in the foregoing Non-Patent Literature 1 and Patent Literature 1 do not consider handover in the communication system that implements an IMS-based femtocell base station (IMS-Femto network).

Thus, PS (Packet Switching) handover for packet communication in the IMS-Femto network cannot successfully use a PDP (Packet Data Protocol) context as the logical relationship of connections of user packets that are forwarded using the PS service like handover in the existing 3G network. Thus, when PS handover is performed in the IMS-Femto network, the PDP context needs to be reactivated at the areas covered by handover destination.

On the other hand, in the system disclosed in Patent Literature 2, CS handover is performed in the IMS-Femto network to continue calls in the CS service, not successively use a PDP context at the areas covered by handover destination. Thus, the system disclosed in Patent Literature 2 cannot achieve the same PS handover as does the existing 3G network.

The present invention was made based on the foregoing point of view. An object of the present invention is to provide a communication system that realizes handover; a database device, a service control device, a femtocell base station, and a method that are used for the communication system; and programs for the service control device and the femtocell base station, each of which can realize the same PS handover as does the existing 3G network without having to modify individual devices of the existing mobile communication network.

Means that Solve the Problem

To accomplish the foregoing object, a communication system according to the present invention is a communication system that configures an IMS (IP Multimedia Subsystem) network, comprising:
a femtocell base station;
a service control device; and
a core device that controls a call,
wherein the service control device has an SGSN (Serving GPRS Support Node) function section that sends back a signal transmitted from a network that uses a communication procedure different from that of the IMS network in the same manner as a signal transmitted from an SGSN, a plurality of service control devices being provided in the IMS network,
wherein one of the plurality of service control devices has been designated as a representative service control device,
wherein the representative service control device correlatively stores identification information of each of the plurality of service control devices and address information of service control devices identified with the identification information,
wherein the femtocell base station has transmission means that transmits a P-TMSI (Packet-Temporary Mobile Subscriber Identity) that accords with a communication procedure prescribed in an applicable standard and that contains identification information of a service control device that manages the its own femtocell base station to a UE (User Equipment) that belongs to the femtocell base station, and wherein the representative service control device has representative control means that receives the P-TMSI contained in a PDP (Packet Data Protocol) context succession request signal from the UE according to a handover communication procedure prescribed in the applicable standard after the UE moves, identifies a service control device identified with the identification information as a service control device that manages a femtocell base station to which the UE belonged before it moved unless the service control device identified with the identification information contained in the received P-TMSI is its own representative service control device, and forwards the PDP context succession request signal to the identified service control device.

A service control device according to the present invention is a service control device used for an IMS (IP Multimedia Subsystem) network, the IMS network comprising:
a femtocell base station;
the service control device; and
a core device that controls a call,
wherein the service control device has an SGSN (Serving GPRS Support Node) function section that sends back a signal transmitted from a network that uses a communication procedure different from that of the IMS network in the same manner as a signal transmitted from an SGSN,
wherein a plurality of service control devices are provided in the IMS network and one of the plurality of service control devices has been designated as a representative service control device,
wherein the representative service control device correlatively stores identification information of each of the plurality of service control devices and address information of service control devices identified with the identification information, and
wherein the representative service control device has representative control means that receives a P-TMSI (Packet-Temporary Mobile Subscriber Identity) contained in a PDP (Packet Data Protocol) context succession request signal from a UE (User Equipment) according to a handover communication procedure prescribed in the applicable standard after the UE moves, identifies a service control device identified with the identification information as a service control device that manages a femtocell base station to which the UE belonged before it moved unless the service control device identified with the identification information contained in the received P-TMSI is the own device, and forwards the PDP context succession request signal to the identified service control device.

A femtocell base station according to the present invention is a femtocell base station used for an IMS (IP Multimedia Subsystem) network, the IMS network comprising:
the femtocell base station;
a service control device; and
a core device that controls a call,
wherein the service control device has an SGSN (Serving GPRS Support Node) function section that sends back a signal transmitted from a network that uses a communication procedure different from that of the IMS network in the same manner as a signal transmitted from an SGSN, a plurality of service control devices being provided in the IMS network, one of the plurality of service control devices having been designated as a representative service control device, and wherein the femtocell base station has transmission means that transmits a P-TMSI (Packet-Temporary Mobile Subscriber Identity) that accords with a communication procedure prescribed in an applicable standard and that contains identification information of a service control device that manages its own femtocell base station to a UE (User Equipment) that belongs to the femtocell base station.

A communication method according to the present invention is a communication method for a communication system that configures an IMS (IP Multimedia Subsystem) network,
wherein the IMS network comprises:
a femtocell base station;
a service control device; and
a core device that controls a call,
wherein the service control device has an SGSN (Serving GPRS Support Node) function section that sends back a signal transmitted from a network that uses a communication procedure different from that of the IMS network in the same manner as a signal transmitted from an SGSN, a plurality of service control devices being provided in the IMS network,
wherein one of the plurality of service control devices has been designated as a representative service control device,
wherein the representative service control device correlatively stores identification information of each of the plurality of service control devices and address information of service control devices identified with the identification information,
wherein the communication method comprises:
a transmission step that causes the femtocell base station to transmit a P-TMSI (Packet-Temporary Mobile Subscriber Identity) that accords with a communication procedure prescribed in an applicable standard and that contains identification information of a service control device that manages its own femtocell base station to a UE (User Equipment) that belongs to the femtocell base station, and
a representative control step that causes the representative service control device to receive the P-TMSI contained in a PDP (Packet Data Protocol) context succession request signal from the UE according to a handover communication procedure prescribed in the applicable standard after the UE moves, identify a service control device identified with the identification information as a service control device that manages a femtocell base station to which the UE belonged before it moved unless the service control device identified with the identification information contained in the received P-TMSI is its own representative service control device, and forward the PDP context succession request signal to the identified service control device.

A program for a service control device according to the present invention is a program for a service control device used for an IMS (IP Multimedia Subsystem) network, the IMS network comprising:
a femtocell base station;
the service control device; and
a core device that controls a call,
wherein the service control device has an SGSN (Serving GPRS Support Node) function section that sends back a signal transmitted from a network that uses a communication procedure different from that of the IMS network in the same manner as a signal transmitted from an SGSN, a plurality of service control devices being provided in the IMS network, one of the plurality of service control devices having been designated as a representative service control device, wherein the representative service control device correlatively stores identification information of each of the plurality of service control devices and address information of service control devices identified with the identification information, and wherein the program causes a computer of the representative service control device to execute a representative control process that receives a P-TMSI (Packet-Temporary Mobile Subscriber Identity) contained in a PDP (Packet Data Protocol) context succession request signal from a UE (User Equipment) according to a handover communication procedure prescribed in the applicable standard after the UE moves, identifies a service control device identified with the identification information as a service control device that manages a femtocell base station to which the UE belonged before it moved unless the service control device identified with the identification information contained in the received P-TMSI is the own device, and forwards the PDP context succession request signal to the identified service control device.

A program for a femtocell base station according to the present invention is a program for a femtocell base station used for an IMS (IP Multimedia Subsystem) network, the IMS network comprising:

the femtocell base station;
a service control device; and
a core device that controls a call, wherein the service control device has an SGSN (Serving GPRS Support Node) function section that sends back a signal transmitted from a network that uses a communication procedure different from that of the IMS network in the same manner as a signal transmitted from an SGSN, a plurality of service control devices being provided in the IMS network, one of the plurality of service control devices having been designated as a representative service control device, and wherein the program cause a computer of the femtocell base station to execute a transmission process that transmits a P-TMSI (Packet-Temporary Mobile Subscriber Identity) that accords with a communication procedure prescribed in an applicable standard and that contains identification information of a service control device that manages the its own femtocell base station to a UE (User Equipment) that belongs to the femtocell base station.

Effect of the Invention

As described above, according to the present invention, PS handover can be realized in the IMS-Femto network in the same manner as PS handover performed in the existing 3G network without having to modify individual devices of the existing mobile communication network such as the existing 3G network.

BRIEF DESCRIPTION OF DRAWINGS

FIG. 8 is a fourth part of a sequence diagram showing an example of a PS handover operation performed from the IMS-Femto network to the existing 3G network.

FIG. 9A is a fifth part of a sequence diagram showing an example of a PS handover operation performed from the IMS-Femto network to the existing 3G network.

FIG. 9B is a fifth part of a sequence diagram showing an example of a PS handover operation performed from the IMS-Femto network to the existing 3G network.

FIG. 12A is a first part of a sequence diagram showing an example of a PS handover operation performed from the existing 3G network to the IMS-Femto network.

FIG. 14B is a third part of a sequence diagram showing an example of a PS handover operation performed from the existing 3G network to the IMS-Femto network.

FIG. 15A is a fourth part of a sequence diagram showing an example of a PS handover operation performed from the existing 3G network to the IMS-Femto network.

FIG. 15B is a fourth part of a sequence diagram showing an example of a PS handover operation performed from the existing 3G network to the IMS-Femto network.

FIG. 20B is a fourth part of a sequence diagram showing an example of a PS handover operation performed between FAPs of different PS servers.

FIG. 22A is a second part of a sequence diagram showing an example of a PS handover operation performed between FAPs that belong to the same PS server.

FIG. 24 is a fourth part of a sequence diagram showing an example of a PS handover operation performed between FAPs that belong to the same PS server.

BEST MODES THAT CARRY OUT THE INVENTION

Next, with reference to the accompanying drawings, a communication system, a service control device, a femtocell base station, a communication method, and programs according to the present invention will be described in details.

First, with reference to FIG. 1, an outline of an embodiment of the present invention will be described.

The IMS-Femto network according to this embodiment allows femtocell base station (FPA: Femto Access Point) to connect a telephone call of a UE that is a wireless terminal and to handover the call to an existing network as prescribed in the applicable standards such as the 3GPP standard without having to change the existing public mobile communication network.

In addition, the IMS-Femto network according to this embodiment successively uses a PDP context when PS handover is performed. Thus, even PS handover can be performed between the IMS-Femto network according to this embodiment and the existing mobile communication network such as the existing 3G network in the same manner as that performed in the existing 3G network. Thus, even if handover is performed while packets are being transmitted or in the preservation state that occurs because no packet transmission state continues for a predetermined time, the packet communication can be continued in the same manner in which PS handover is performed in the existing 3G network.

<Example of Configuration of Communication System>

Next, a configuration of the communication system according to this embodiment will be described in detail.

Figure 1:
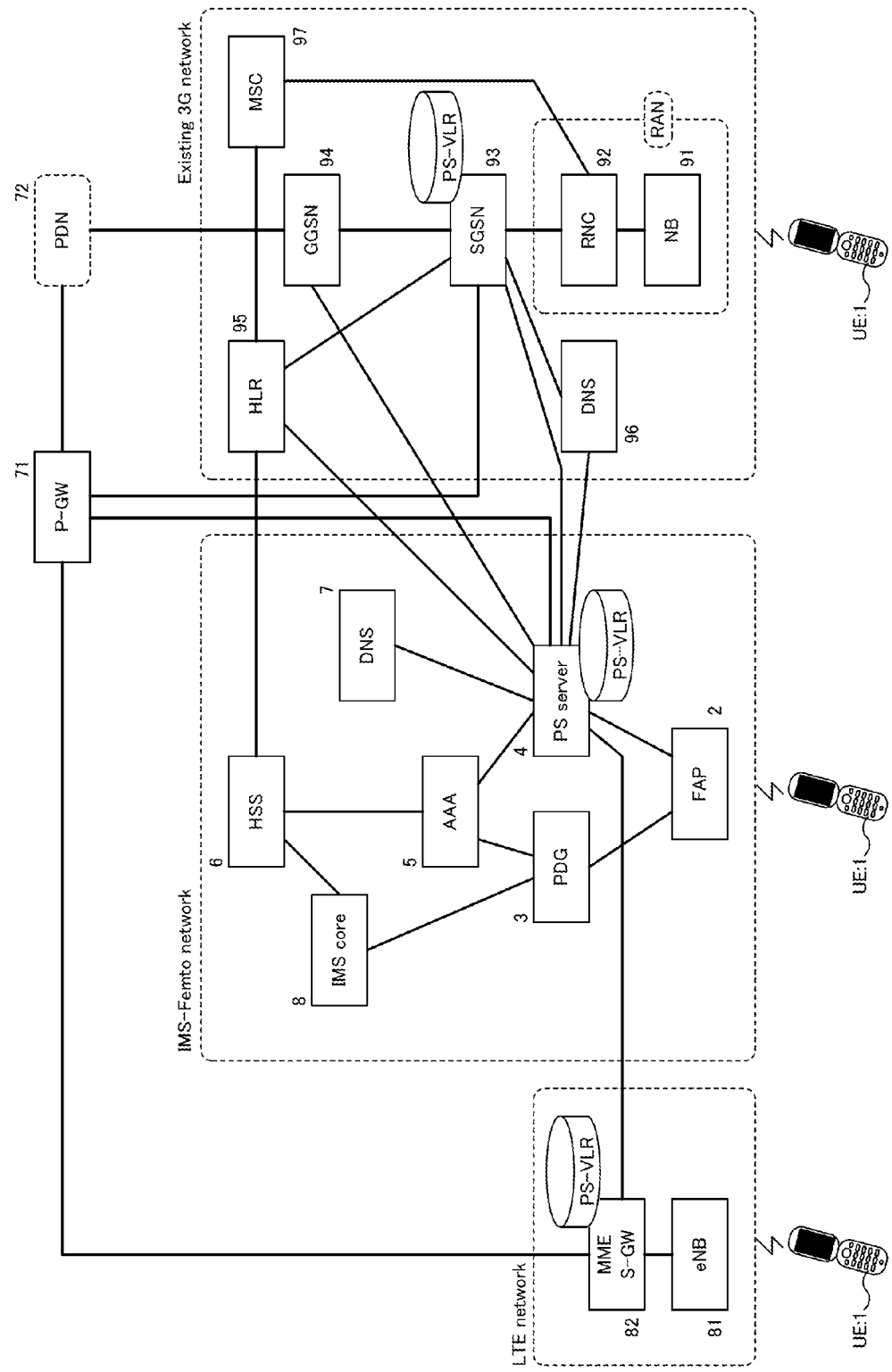
FIG. 1 is a block diagram showing an example of a configuration of a communication system according to an embodiment of the present invention.

As shown in FIG. 1, the communication system according to this embodiment has an existing 3G network (macro network), an IMS-Femto network, and an LTE (Long Term Evolution) network that are connected to various types of public data networks (PDNs) through respective P-GWs (PDN Gateways).

The existing 3G network is an existing mobile communication network that provides a 3G service and has SGSN (Serving GPRS Support Node) 93, GGSN (Gateway GPRS Support Node) 94, HLR (Home Location Register) 95, DNS (Domain Name Server) 96, MSC (Mobile Services Switching Center) 97, and an RAN (Radio Area Network). The RAN has RNC (Radio Network Controller) 92 and NB (Node B) 91. Node B 91 accommodates UE 1 as a subordinate member.

UE 1, Node B 91, RNC 92, SGSN 93, GGSN 94, HLR 95, DNS 96, MSC 97 that configures the existing 3G network are devices that perform processes based on the 3GPP standard. Description of specific processes and operations of these devices will be omitted. Technologies used in the existing 3G network are disclosed, for example, in the foregoing Non-Patent Literature 1, 3GPP TS 33.234 V8.0.0 (2007-12), and so forth.

The LTE network has eNB (eNode B) 81, MME (Mobility Management Entity), S-GW (Serving Gateway) 82, and so forth. eNB 81 accommodates UE 1 as a subordinate member. Individual devices that configure the LTE network are those that perform processes based on the 3GPP standard such as 3GPP TS 23.401 V9.0.0 (2009.3). Their specific processes and operations will be omitted.

The IMS-Femto network forms a predetermined communication coverage and has FAP 2, PDG 3, PS server 4, AAA (Authentication Authorization Accounting) 5, HSS (Home Subscriber Server) 6, DNS 7, and IMS core 8. FAP 2 accommodates UE 1 as a subordinate member.

FAP 2 is a small wireless base station that has a narrow communication coverage with a radius of around several ten meters.

PDG 3 is a device that relays messages.

PS server (service control device) 4 implements an SGSN function section that transmits and receives signals to and from individual devices of another network such as the existing 3G network in the same manner as does SGSN 93 of the existing 3G network and causes individual devices of the other networks to virtually recognize itself as an SGSN. In addition, PS server 4 obtains a PS subscriber profile from HLR 95, correlates it with an IMSI_UE, and stores the correlated data as a PS-VLR (Visitor Location Register) so as to manage a PS subscriber profile of each UE connected to the Femto IMS network.

Figure 2:
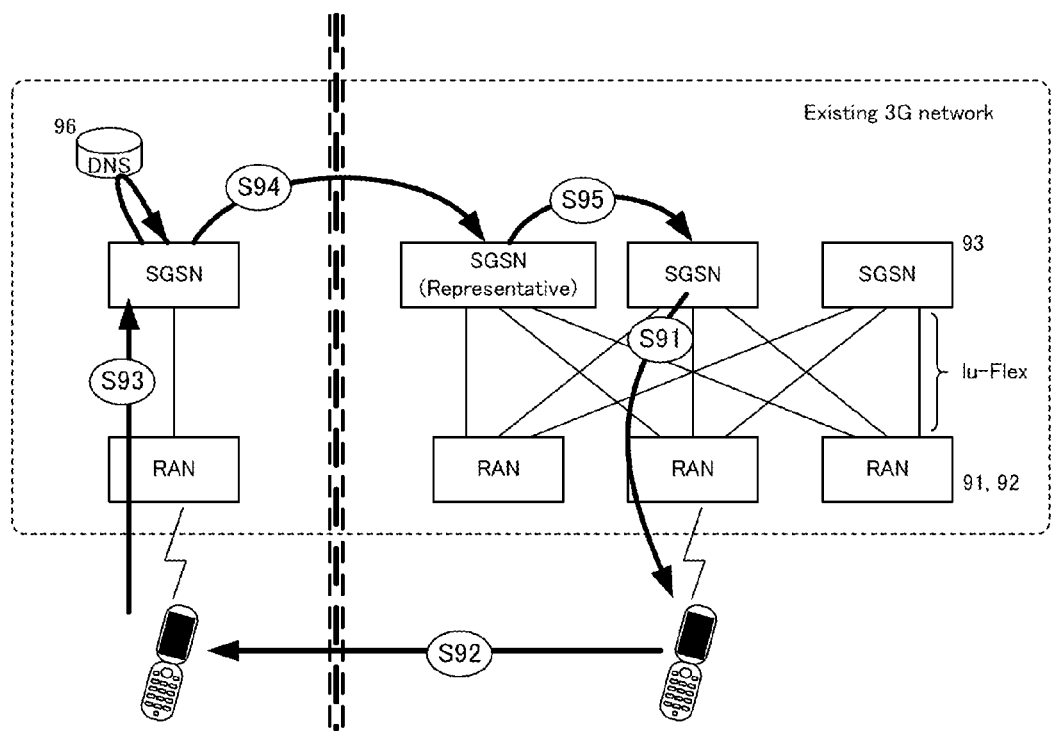
FIG. 2 is a schematic diagram describing an outline of PS handover performed in the existing 3G network.

In addition, as shown in FIG. 2, it is assumed that a plurality of similar SGSNs are provided in the existing 3G network and one of them has been designated as a representative SGSN.

Figure 3:
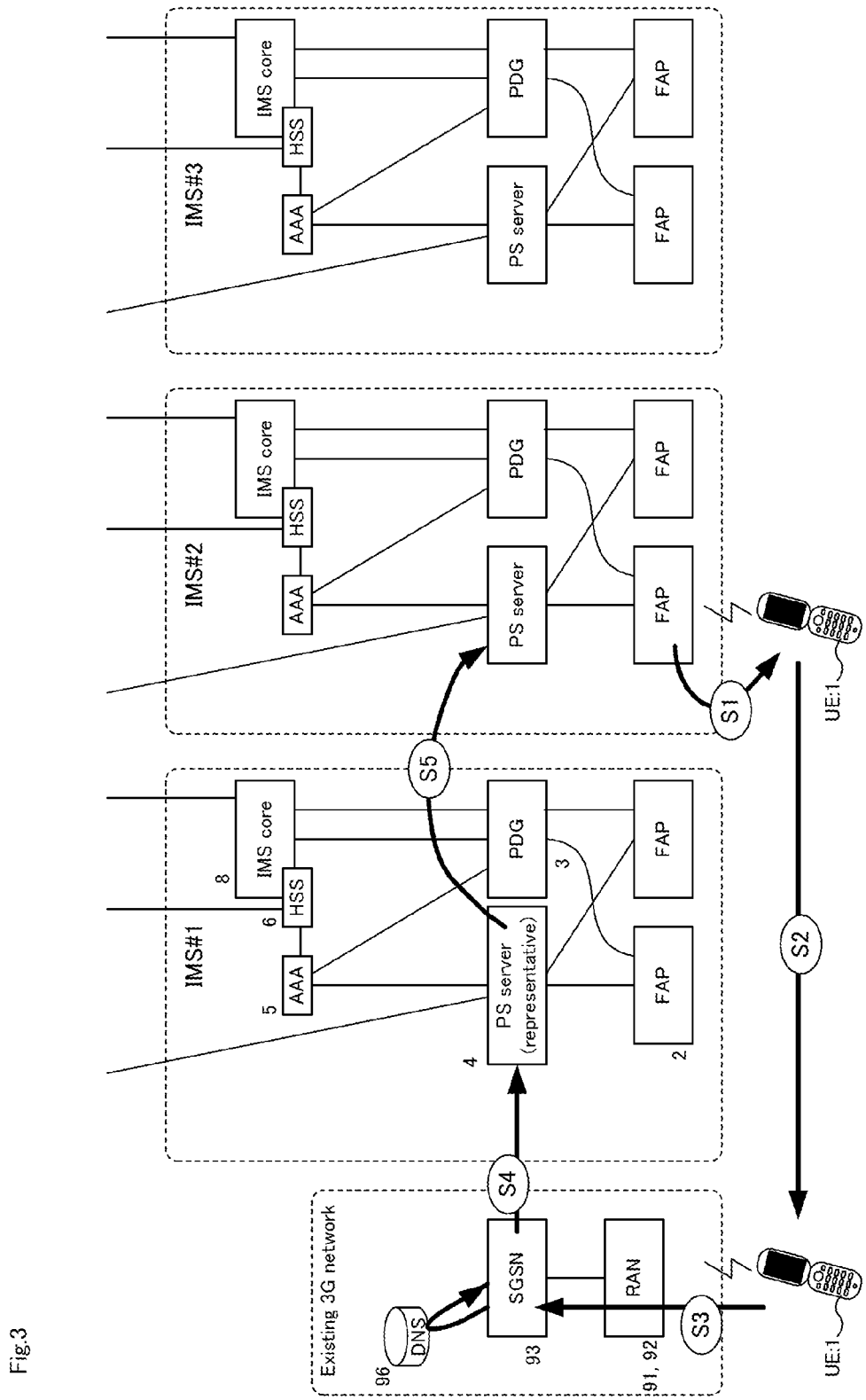
FIG. 3 is a schematic diagram describing an outline of PS handover performed between the IMS-Femto network according to the embodiment and the existing 3G network.

Moreover, as shown in FIG. 3, it is assumed that a plurality of similar PS servers are provided and one of them has been designated as a representative PS server.

Likewise, it is assumed that a plurality of similar LTE networks are provided.

The representative PS server stores table information in which identification information of each PS server 4 of the IMS-Femto network (NRI: Node Resource Indicator) is correlated with address information of each PS server identified with the NRI. As a result, the representative PS server can forward a received signal to a PS server identified with and based on an NRI.

Each NRI and address information of a PS server identified with an NRI may be automatically obtained or manually designated by the operator.

AAA 5 is a device that performs an authentication process and so forth for UE 1.

HSS 6 obtains a CS subscriber profile from HLR 95 and stores it as a CS-VLR so as to manage the CS subscriber profile and so forth of UE 1.

DNS 7 of the IMS-Femto network is a DNS provided to inquire about address information in the IMS-Femto network. Thus, DNS 7 has stored address information of each PS server 4 of the IMS-Femto network. If DNS 7 receives an address request for a PS server along with an APN from FAP 2, DNS 7 sequentially sends back address information of the PS server to FAP 2 according to the round robin scheme. Thus, DNS 7 can allocate address information of a PS server to the inquiring FAP.

IMS core 8 is a core network that includes a core device such as a call state control server (CSCF: Call Session Control Function) that performs a session control and so forth. UE 1 causes IMS core 8 to perform a position registration process through FAP 2 and PDG 3. IMS core 8 implements a call control function and so forth for each UE that belongs to FAP 2.

<Outline of PS Handover Operation (in Existing 3G Network)>

Next, an outline of a PS handover operation in the communication system according to this embodiment will be described.

First, with reference to FIG. 2, an outline of an operation that identifies an SGSN that manages a PS handover source Node B in the existing 3G network will be described so as to help understand an operation that features this embodiment. The PS handover operation performed in the existing 3G network is a technique that has been standardized in 3GPP TS 23.236.

When the PS position of UE 1 is registered, the SGSN embeds identification information (NRI) of the SGSN in a P-TMSI (Packet-Temporary Mobile Subscriber Identity) and transmits the P-TMSI containing the NRI (at step S91).

After a PS call is established, when an event in which the end user who has UE 1 moves from one coverage to another coverage occurs, handover is started (at step S92). As a result, an Inter-RAU (Routing Area Update) is started (at step S93).

With the Iu-Flex function prescribed in the 3GPP technical specifications, the handover destination SGSN cannot find the address of the handover source SGSN based on an RAI (Routing Area Identity) transmitted from UE 1. Thus, a GTP (GPRS Tunneling Protocol) signal is forwarded to the representative SGSN (at step S94).

The representative SGSN determines an SGSN identified with the NRI contained in the P-TMSI as the handover source SGSN and forwards the received GTP signal to the identified handover source SGSN (at step S95).

<Outline of PS Handover Operation <from IMS-Femto Network to Existing 3G Network>

Next, with reference to FIG. 3, an outline of an operation that identifies a PS server that manages a handover source FAP in the case in which UE 1 hands over a call from an FAP of the IMS-Femto network to a Node B of the existing 3G network will be described.

When the PS position of UE 1 is registered, the FAP embeds identification information of the PS server (NRI) that manages the FAP in a P-TMSI and transmits the P-TMSI (at step S1). The NRI may be embedded in the P-TMSI according to a technique of the Iu-Flex function prescribed in the 3GPP technical specifications.

The FAP may receive the identification information of the PS server that manages the FAP from the PS server when the PS position of UE 1 is registered. Alternatively, if the PS server is specifically allocated to a PDG, the FAP may receive the identification information of the PS server from the PDG when the PS position of UE 1 is registered.

After the PS call is established, when an event in which the end user who has UE 1 moves from one coverage to another coverage occurs, handover is started (at step S2). As a result, the Inter-RAU (Routing Area Update) is started in the existing 3G network as the handover destination (at step S3).

As in the operation in the foregoing existing 3G network at step S94 shown in FIG. 2, since SGSN 93 of the existing 3G network cannot find the address of the handover source SGSN, SGSN 93 of the existing 3G network forwards the GTP signal to the representative PS server (at step S4).

The representative PS server determines a PS server identified with the NRI contained in the P-TMSI as the handover source PS server and forwards the received GTP signal to the identified handover source PS server (at step S5).

As described above, the IMS-Femto network according to this embodiment allows the handover source PS server to be identified without having to modify individual devices of the existing mobile communication network such as the existing 3G network. Thus, PS handover can be implemented between the IMS-Femto network and the existing mobile communication network such as the existing 3G network in the same manner as that performed in the existing 3G network.

<Example of Operation of Communication System>

Next, the operation of the SGSN function section and the PS handover operation of a PS server in the communication system according to this embodiment will be described in comparison with those prescribed in the 3GPP standard and so forth.

<Example of PS Handover Operation Between SGSNs of Existing 3G Network>

Figure 4:
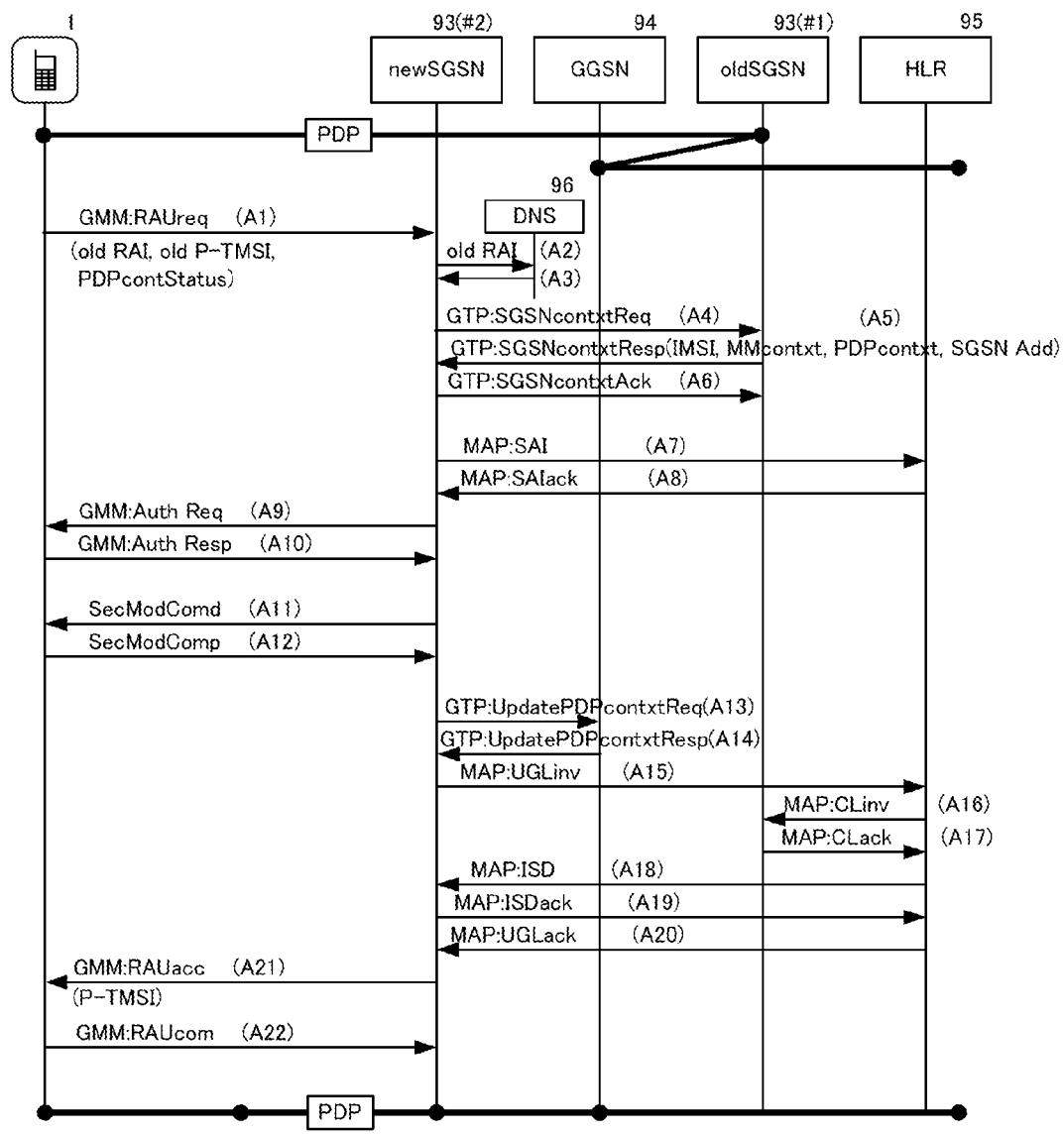
FIG. 4 is a sequence diagram showing an example of a PS handover operation performed between SGSNs of the existing 3G network.
Figure 5A:
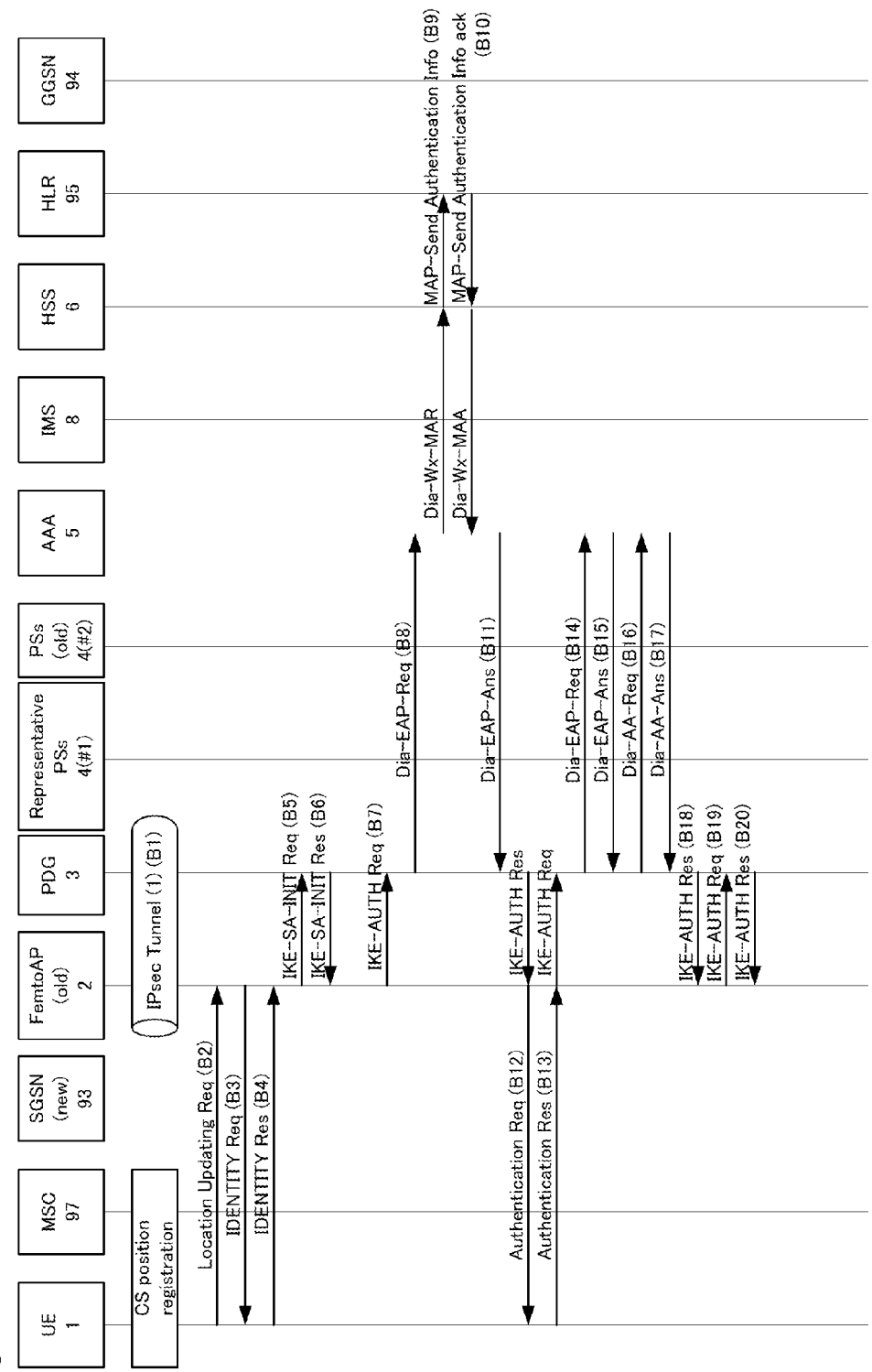
FIG. 5A is a first part of a sequence diagram showing an example of a PS handover operation performed from the IMS-Femto network to the existing 3G network.
Figure 5B:
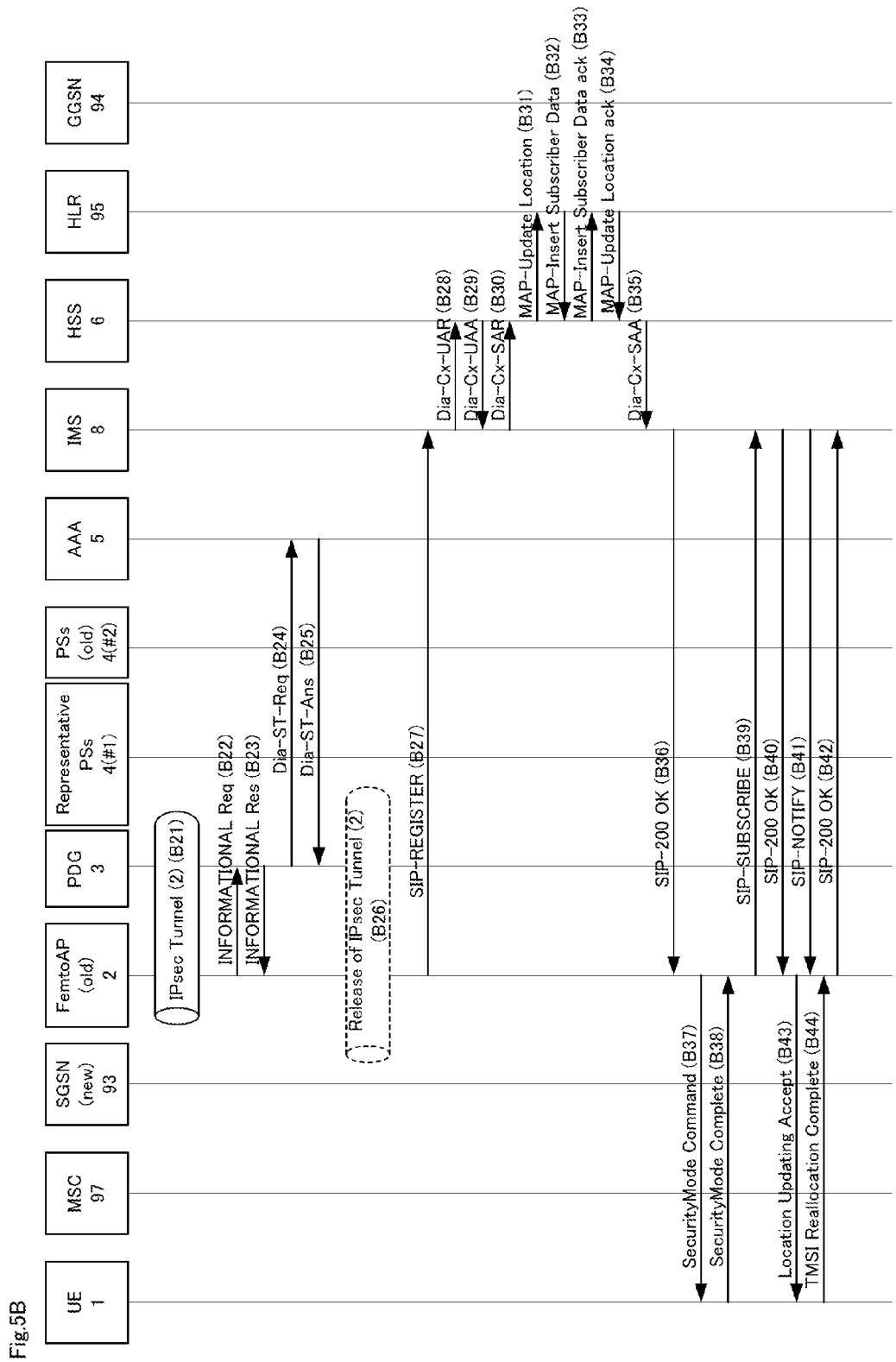
FIG. 5B is a first part of a sequence diagram showing an example of a PS handover operation performed from the IMS-Femto network to the existing 3G network.
Figure 6A:
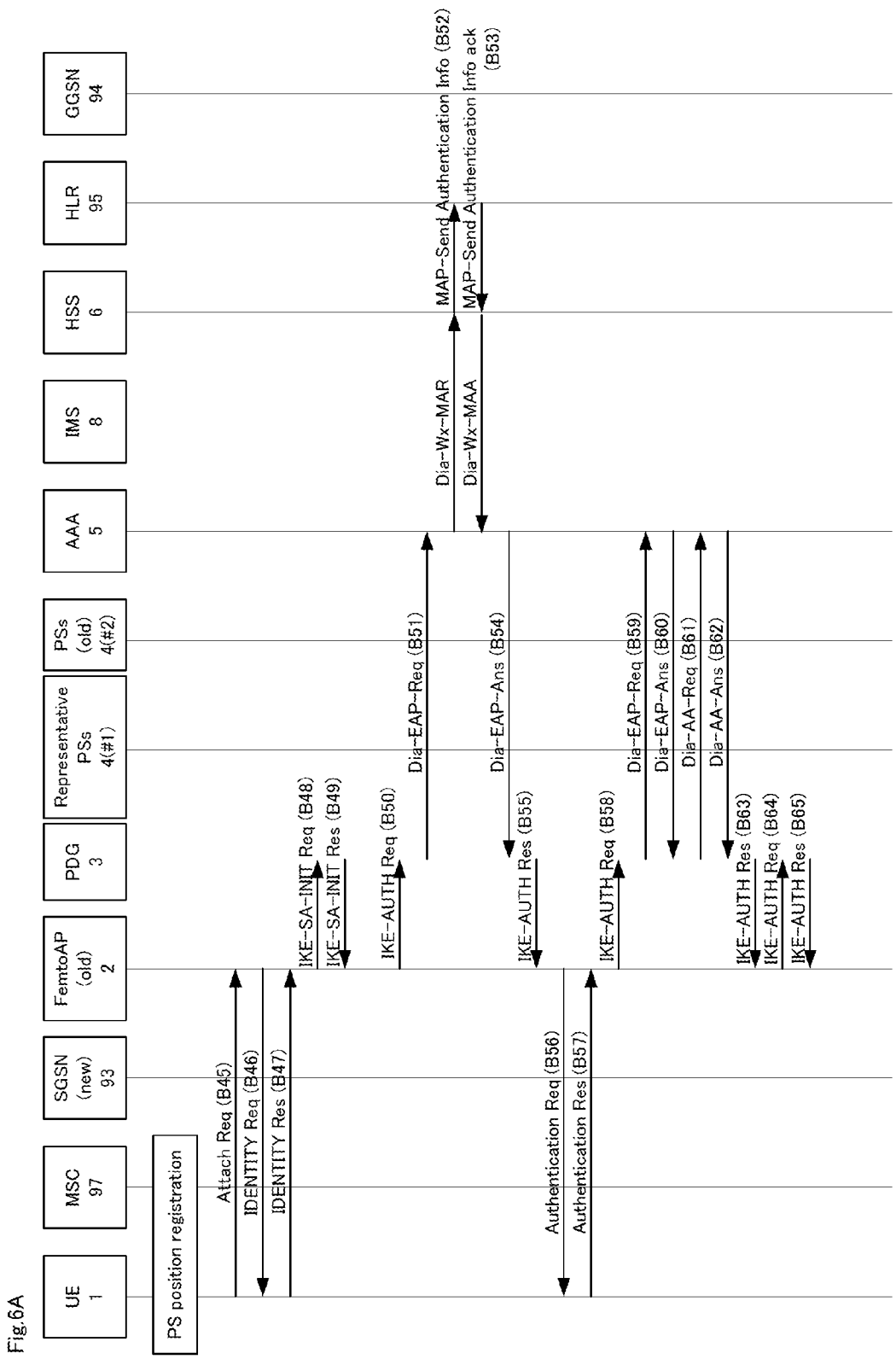
FIG. 6A is a second part of a sequence diagram showing an example of a PS handover operation performed from the IMS-Femto network to the existing 3G network.
Figure 6B:
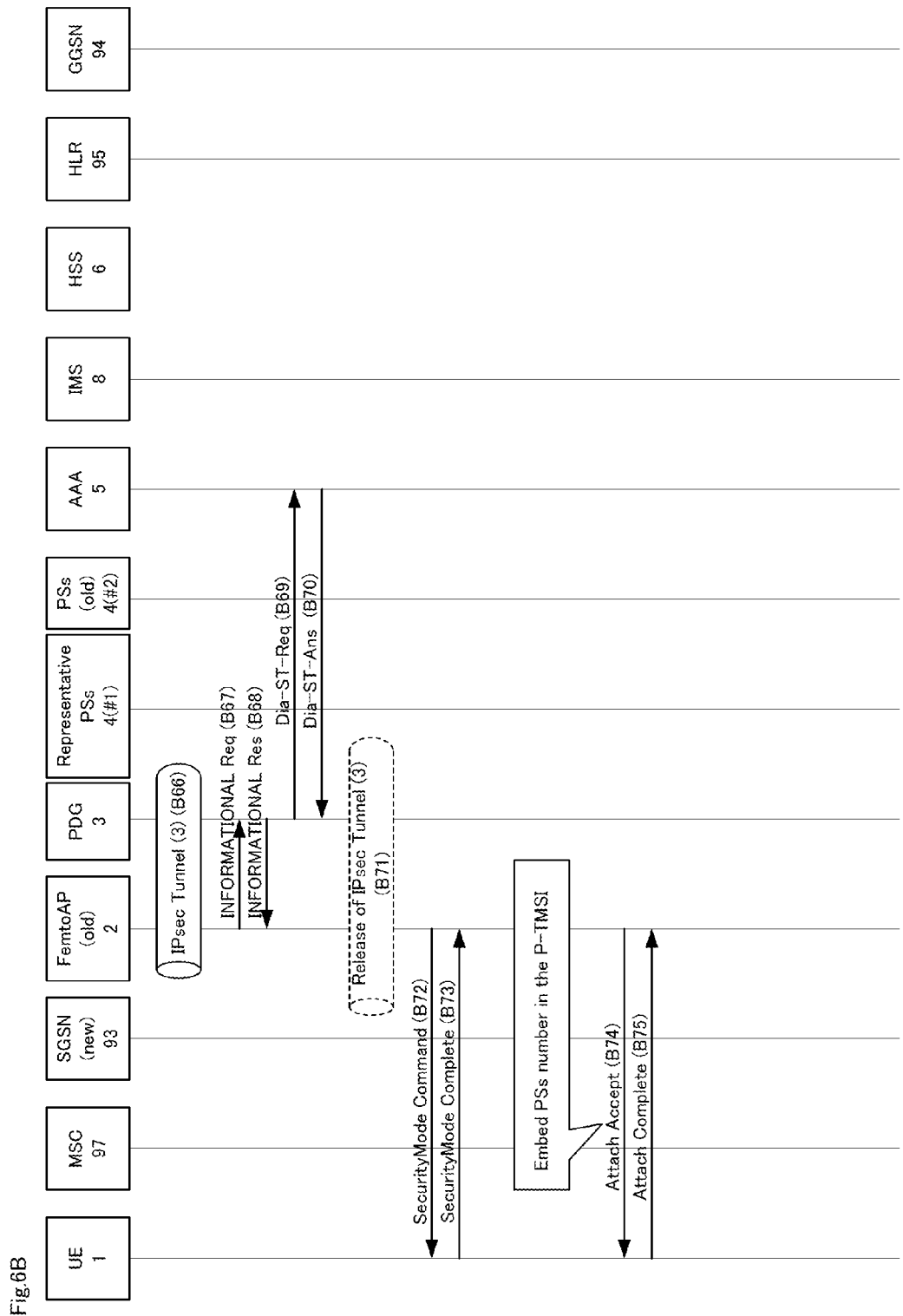
FIG. 6B is a second part of a sequence diagram showing an example of a PS handover operation performed from the IMS-Femto network to the existing 3G network.
Figure 7A:
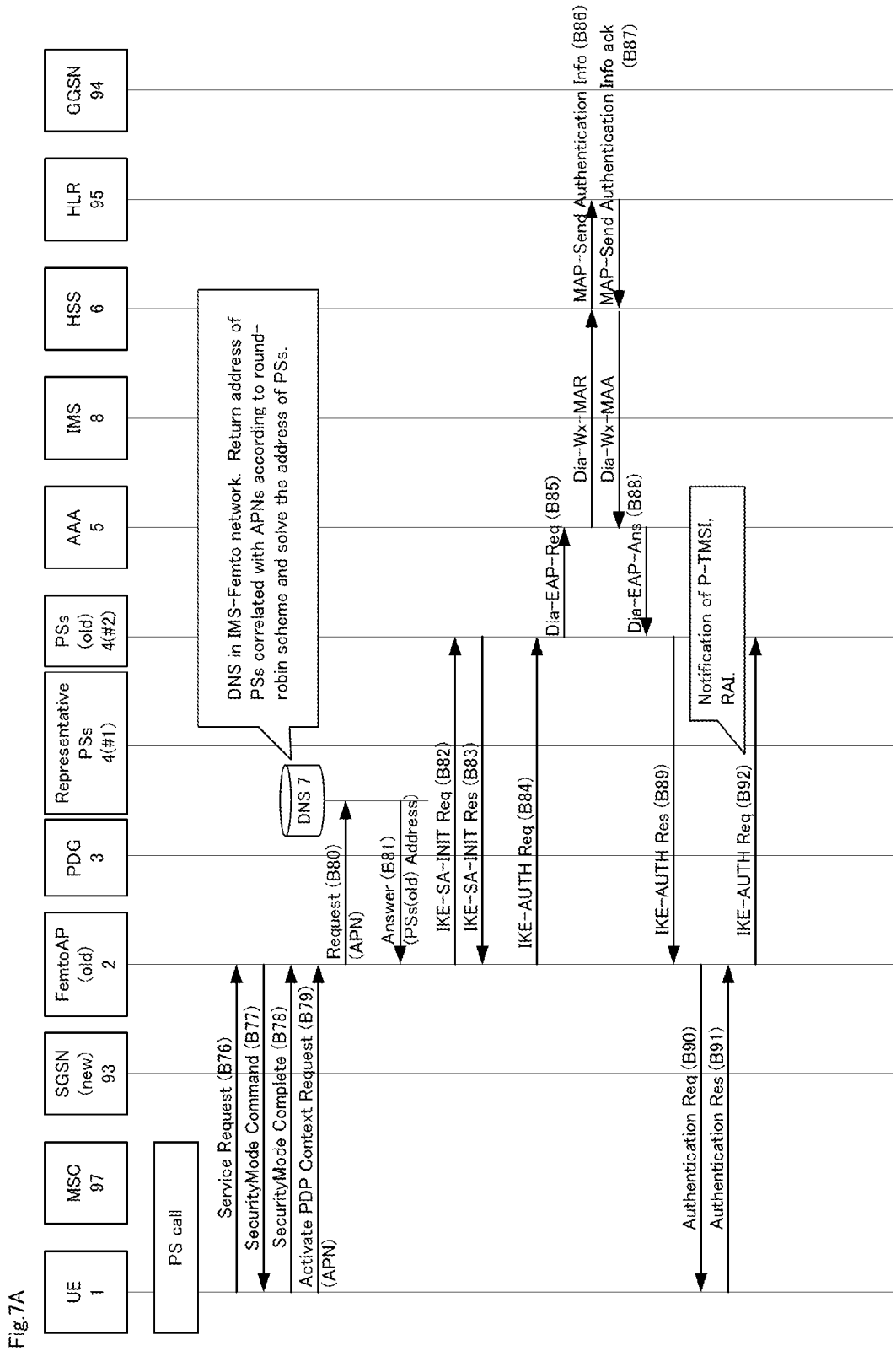
FIG. 7A is a third part of a sequence diagram showing an example of a PS handover operation performed from the IMS-Femto network to the existing 3G network.
Figure 7B:
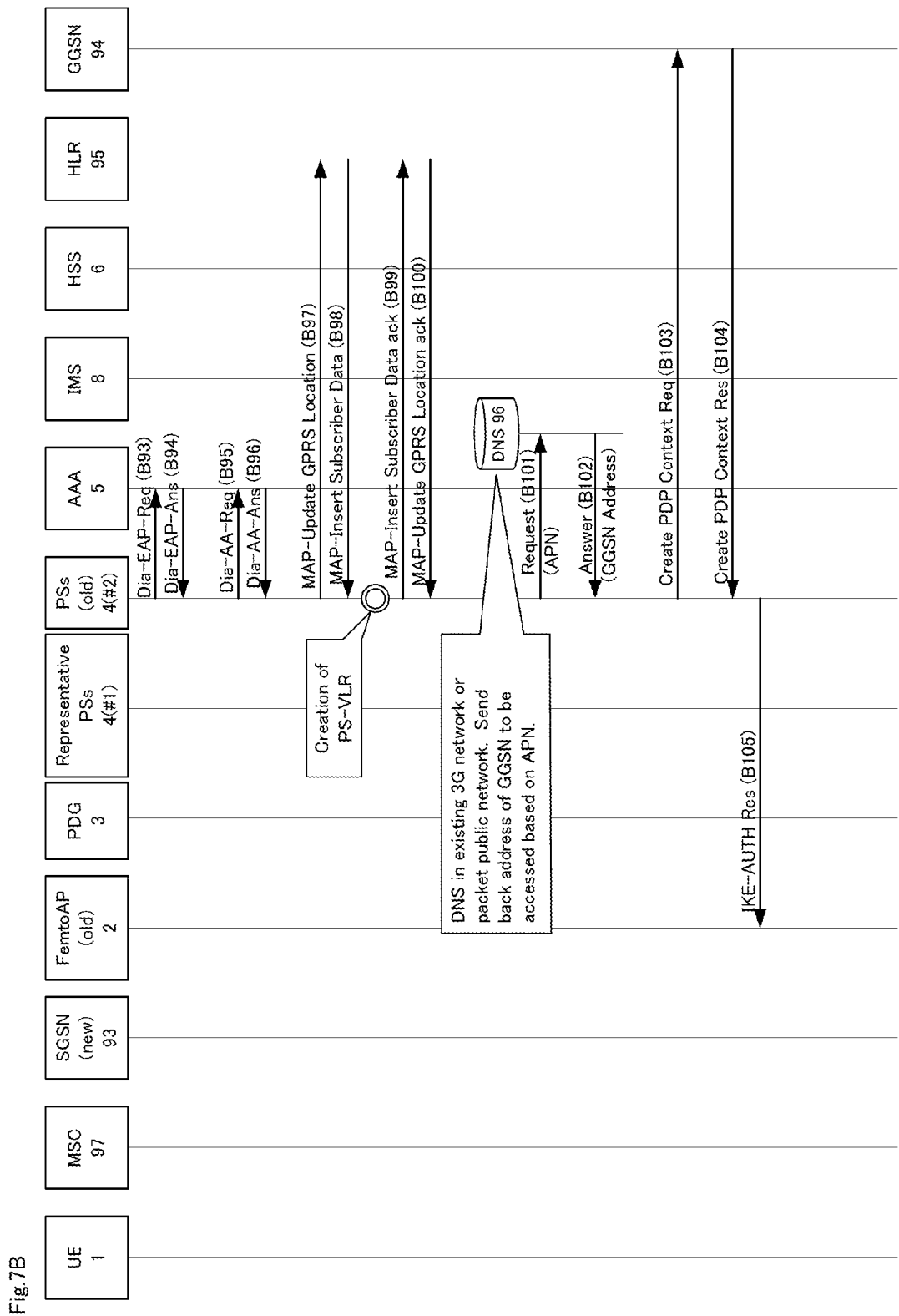
FIG. 7B is a third part of a sequence diagram showing an example of a PS handover operation performed from the IMS-Femto network to the existing 3G network.
Figure 10A:
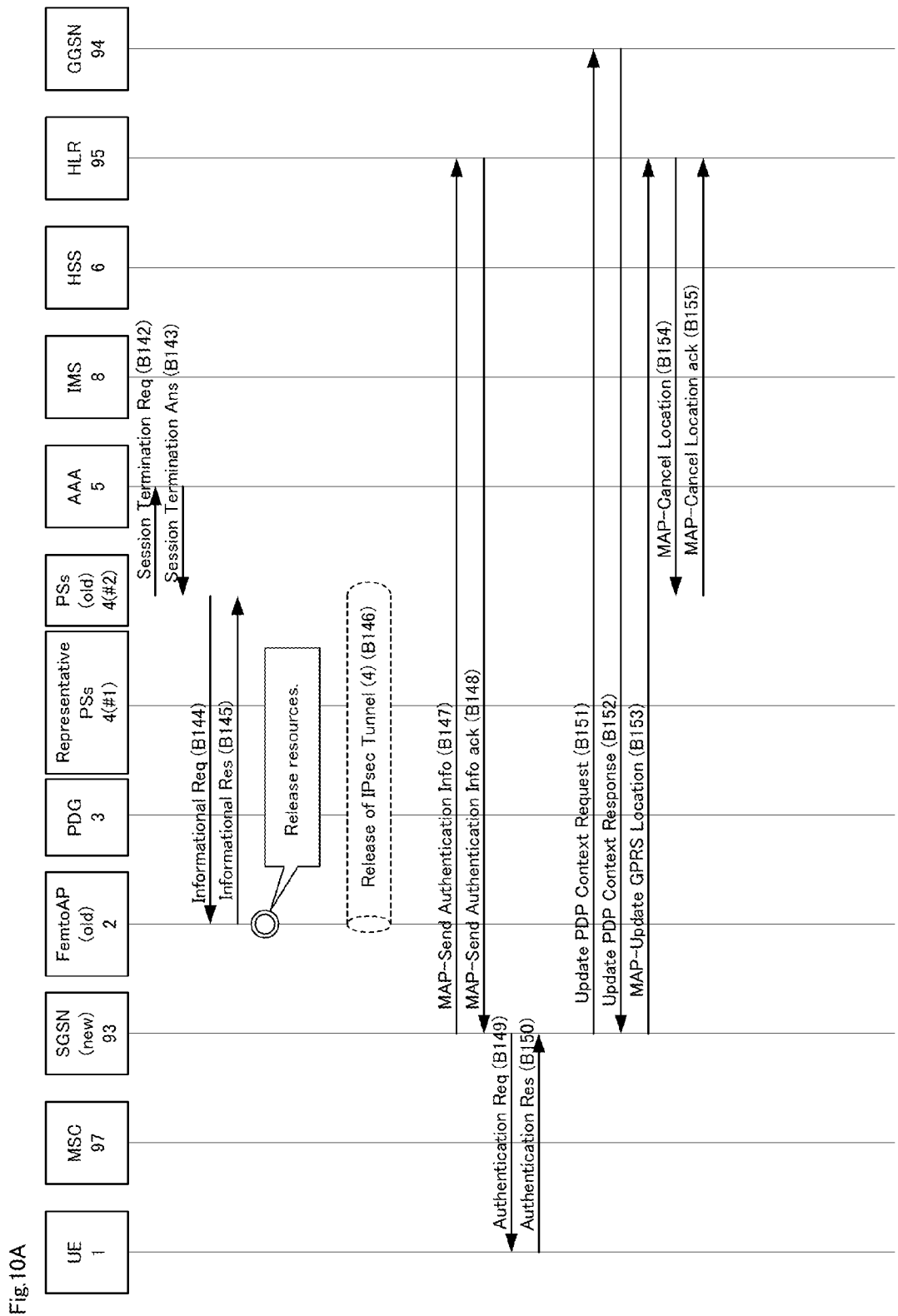
FIG. 10A is a sixth part of a sequence diagram showing an example of a PS handover operation performed from the IMS-Femto network to the existing 3G network.
Figure 10B:
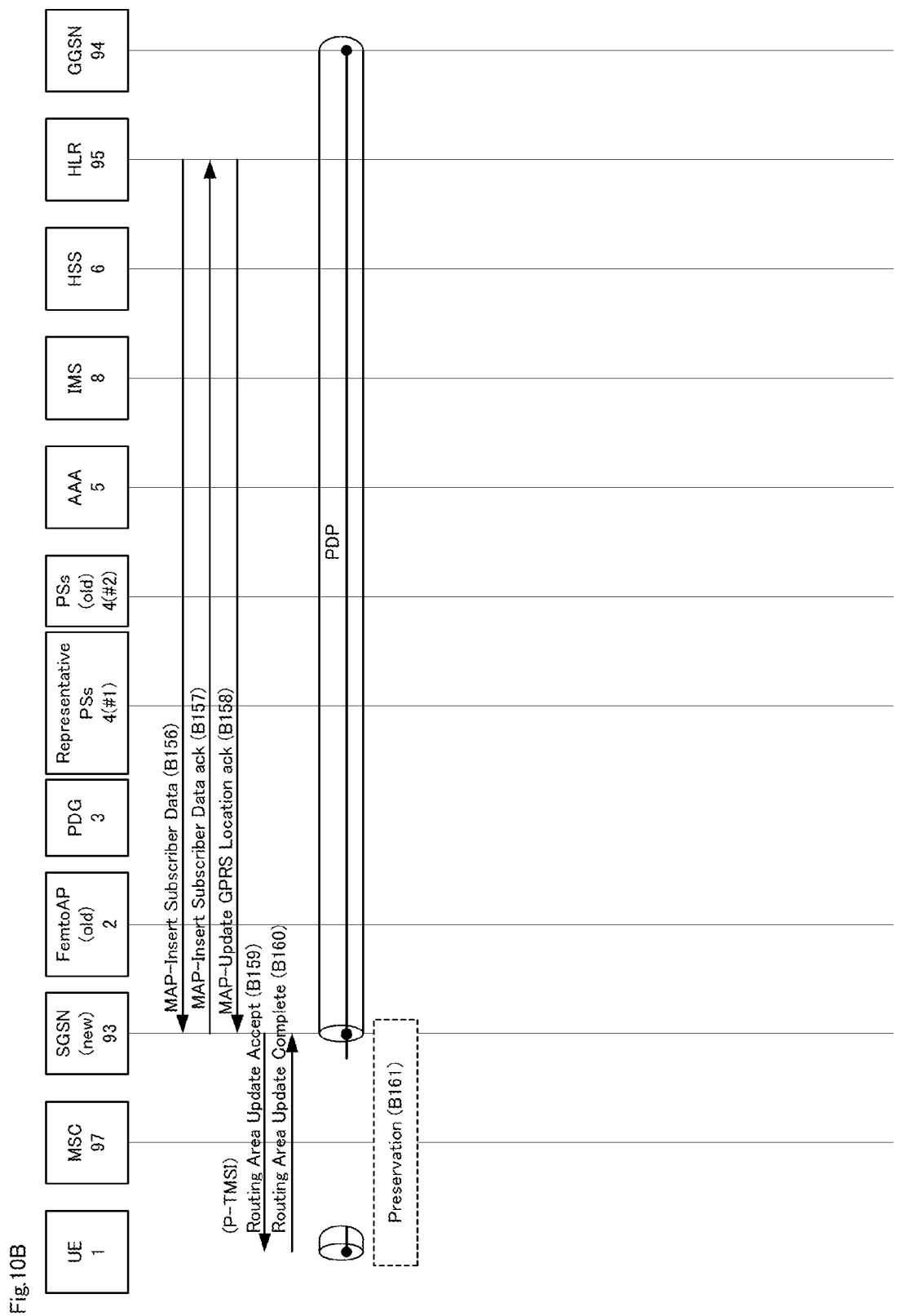
FIG. 10B is a sixth part of a sequence diagram showing an example of a PS handover operation performed from the IMS-Femto network to the existing 3G network.

First, with reference to a sequence diagram shown in FIG. 4, an example of a PS position registration operation in the case in which a UE hands over a call from a Node B under the control of one SGSN of the existing 3G network to a Node B under the control of another SGSN will be described so as to help understand an operation that features this embodiment.

This operation is prescribed in the 3GPP standard. FIG. 4 shows an example in which no simple authentication is implemented.

In the following description, it is assumed that an SGSN that manages a handover source Node B to which the UE belonged is referred to as the SGSN (old) and that an SGSN that manages a handover destination Node B to which the UE newly belongs is referred to as the SGSN (new).

As a PS position registration operation after the UE moves, it transmits a Routing Area Update Request containing an old RAI that identifies the handover source Node B to which the UE belonged, an old P-TMSI received before the UE moved, and a PDP Context Status to the SGSN (new) (at step A1).

Since the SGSN (new) receives the Routing Area Update Request containing the PDP Context Status, the SGSN (new) determines that there is a PDP context to be successively used and transmits an address request for the handover source SGSN (old) containing the old RAI received from the UE to the DNS (at step A2).

When the DNS receives the address request for the SGSN (old), the DNS refers to the old RAI and searches its own device for information of the SGSN (old) that manages the Node B corresponding to the old RAI. The DNS transmits the address information for the SGSN (old) corresponding to the old RAI to the SGSN (new) (at step A3).

When the SGSN (new) receives the address information for the SGSN (old), the SGSN (new) transmits a GTP: SGSN Context Request to the address of the SGSN (old) to cause the SGSN (new) to successively use the PDP context (at step A4).

When the SGSN (old) receives the GTP: SGSN Context Request, the SGSN (old) transmits a GTP: SGSN Context Response containing configuration information of the PDP context to the SGSN (new) so as to cause the SGSN (new) to successively use the PDP context (at step A5). The configuration information of the PDP context contains at least the MM context, PDP context, IMSI_UE, and the address of the SGSN prescribed in the 3GPP standard.

When the SGSN (new) receives the GTP: SGSN Context Response, the SGSN (new) successively uses the PDP context based on the configuration information of the received PDP context and sends back a GTP: SGSN Context Ack to the SGSN (old) (at step A6).

Thereafter, the SGSN (new) transmits a MAP Send Authentication Info to the HLR (at step A7).

When the HLR receives the MAP Send Authentication Info, the HLR transmits a MAP Send Authentication Info Ack to the SGSN (new) (at step A8).

Thereafter, the SGSN (new) transmits a GMM: Authentication Request to the UE (at step A9).

When the UE receives the GMM: Authentication Request, the UE sends back a GMM: Authentication Response to the SGSN (new) (at step A10).

Thereafter, the SGSN (new) transmits a Security Mode Command to the UE (at step A11).

When the UE receives the Security Mode Command, the UE sends back a Security Mode Complete to the SGSN (new) (at step A12).

Thereafter, the SGSN (new) transmits a GTP: Update PDP Context Request to the GGSN (at step A13). When the GGSN receives the GTP: Update PDP Context Request, the GGSN transmits a GTP: Update PDP Context Response to the SGSN (new) (at step A14).

When the SGSN (new) receives the GTP: Update PDP Context Response, the SGSN (new) transmits a MAP Update GPRS Location containing an IMSI.UE to the HLR (at step A15).

When the HLR receives the MAP Update GPRS Location, the HLR transmits a MAP Cancel Location containing the IMSI.UE to the SGSN (old) (at step A16).

When the SGSN (old) receives the MAP Cancel Location, the SGSN (old) deletes the relevant subscriber data from the storage section of the device and transmits a MAP Cancel Location Ack to the HLR (at step A17).

When the HLR receives the MAP Cancel Location Ack, the HLR transmits a MAP Insert Subscriber Data containing the subscriber information of the IMSI.UE to the SGSN (new) (at step A18).

When the SGSN (new) receives the MAP Insert Subscriber Data, the SGSN (new) creates a subscriber profile based on the subscriber information of the IMSI.UE and stores it as a PS-VLR. Thereafter, the SGSN (new) sends back a MAP Insert Subscriber Data Ack to the HLR (at step A19).

When the HLR receives the MAP Insert Subscriber Data Ack, the HLR transmits a MAP Update GPRS Location Ack to the SGSN (new) (at step A20).

When the SGSN (new) receives the MAP Update GPRS Location Ack, the SGSN (new) transmits a Routing Area Update Accept to the UE (at step A21).

When the UE receives the Routing Area Update Accept, the UE transmits a Routing Area Update Complete to the SGSN (new) (at step A22).

<Example of PS Handover Operation from IMS-Femto Network to Existing 3G Network>

Next, with reference to sequence diagrams shown in FIG. 5A to FIG. 10B, an example of an operation in the case in which an UE hands over a call from an FAP of the IMS-Femto network according to this embodiment to a Node B of the existing 3G network will be described.

In the following description, it is assumed that a handover source FAP to which the UE belonged is referred to as the FAP (old), a PS server that manages the FAP (old) is referred to as the PS server (old), and an SGSN that manages a handover destination Node B to which the UE newly belongs is referred to as the SGSN (new). In addition, it is assumed that IPsec Tunnel (1) has been established between the FAP (old) and the PDG.

To initially register the position of the UE before it moves, it starts registering the CS position. When the UE registers the CS position, the UE transmits a Location Updating Request to the FAP (old) (at step B2).

When the FAP (old) receives the Location Updating Request, the FAP (old) transmits an IDENTITY Request to the UE (at step B3).

When the UE receives the IDENTITY Request, the UE transmits an IDENTITY Response containing an IMSI.UE to the FAP (old) (at step B4). The IMSI.UE is information with which the UE is identified.

When the FAP (old) receives the IDENTITY Response, the FAP (old) transmits an IKE-SA-INIT Request to the PDG (at step B5). IKE SA INIT is an acronym of Internet Key Exchange Security Authentication INITialize.

When the PDG receives the IKE-SA-INIT Request, the PDG transmits an IKE-SA-INIT Response to the FAP (old) (at step B6). When the FAP (old) receives the IKE-SA-INIT Response, the IKE SA is established between the FAP (old) and the PDG. Thereafter, the FAP (old) transmits an IKE-AUTH Request containing an APN (Access Point Name) and an NAI (Network Access Identifier) to the PDG (at step B7). IKE-AUTH is an acronym of Internet Key Exchange AUTHentication. The APN is information with which a connection point of the network is identified. The NAI is information with which a network access is identified.

When the PDG receives the IKE-AUTH Request, the PDG transmits a Dia-EAP Request containing the NAI contained in the IKE-AUTH Request to the AAA (at step B8). Dia EAP is an acronym of Diameter Extensible Authentication Protocol.

When the AAA receives the Dia-EAP Request, the AAA determines whether to register the CS position or BS position or to active a PDP context based on the NAI contained in the Dia-EAP Request. In this example, since the AAA determines to register the CS position based on the NAI, the AAA transmits a Dia-Wx-MAR to the HSS. Dia-Wx-MAR is an acronym of Diameter Wx Multimedia Authentication Request.

When the HSS receives the Dia-Wx-MAR, the HSS transmits a MAP Send Authentication Information containing the IMSI.UE contained in the Dia-Wx-MAR to the HLR (at step B9).

When the HLR receives the MAP Send Authentication Information, the HLR obtains RAND/AUTN/CK/IK/XRES corresponding to the IMSI.UE contained in the MAP Send Authentication Information and transmits a MAP Send Authentication Information Ack containing the RAND/AUTN/CK/IK/XRES to the HSS (at step B10).

The RAND/AUTN/CK/IK/XRES is information based on the 3GPP standard. RAND is an acronym of RANDom challenge. AUTN is an acronym of AUthentication TokeN. CK is an acronym of Cipher Key. IK is an acronym of Integrity Key. XRES is an acronym of eXpected RESponse.

The RAND/AUTN/CK/IK/XRES is an example of information contained in the MAP Send Authentication Information Ack that the HLR transmits. Thus, information used for authentication may be any one of various alternatives based on the performance of the NW for which the UE has contracted.

When the HSS receives the MAP Send Authentication Information Ack, the HSS transmits a Dia-Wx-MAA containing the RAND/AUTN/CK/IK/XRES received from the HLR to the AAA. Dia-Wx-MAA is an acronym of Diameter Wx Multimedia Authentication Answer.

When the AAA receives the Dia-Wx-MAA, the AAA transmits a Dia-EAP Answer containing the RAND/AUTN/CK/IK contained in the Dia-Wx-MAA to the PDG (at step B11).

When the PDG receives the Dia-EAP Answer, the PDG transmits an IKE-AUTH Response containing the EAP Request/AKA Challenge and RAND/AUTN/CK/IK contained in the Dia-EAP Answer to the FAP (old). AKA is an acronym of Authentication and Key Agreement.

When the FAP (old) receives the IKE-AUTH Response, the FAP (old) transmits an Authentication Request containing the RAND/AUTN contained in the IKE-AUTH Response to the UE (at step B12).

When the UE receives the Authentication Request, the UE performs an authentication calculation based on the RAND/AUTN contained in the Authentication Request. The authentication calculation is performed according to a technique based on the 3GPP standard.

The UE calculates the response and transmits an Authentication Response containing the response to the FAP (old) (at step B13). The UE calculates the response according to a technique based on the 3GPP standard.

When the FAP (old) receives the Authentication Response, the FAP (old) transmits an IKE-AUTH Request containing the EAP Response/AKA Challenge and the response contained in the Authentication Response to the PDG.

When the PDG receives the IKE-AUTH Request, the PDG calculates an MAC (Message Authentication Code) and transmits a Dia-EAP Request containing the RES and MAC to the AAA (at step B14). The PDG calculates the MAC according to a technique based on the 3GPP standard.

When the AAA receives the Dia-EAP Request, the AAA authenticates the UE. The AAA authenticates the UE according to a technique based on the 3GPP standard. In this example, it is assumed that the AAA has successfully authenticated the UE. The AAA transmits a Dia-EAP Answer containing the EAP-Success to the PDG (at step B15).

When the PDG receives the Dia-EAP Answer, the PDG transmits a Dia-AA Request containing the APN to the AAA (at step B16).

When the AAA receives the Dia-AA Request, the AAA transmits a Dia-AA Answer containing the IMSI.UE to the PDG (at step B17).

When the PDG receives the Dia-AA Answer, the PDG transmits an IKE-AUTH Response containing the EAP-Success to the FAP (old) (at step B18).

When the FAP (old) receives the IKE-AUTH Response, the FAP (old) transmits an IKE-AUTH Request to the PDG (at step B19).

When the PDG receives the IKE-AUTH Request, the PDG transmits an IKE-AUTH Response to the FAP (old) (at step B20).

As a result, the FAP (old) receives the IKE-AUTH Response and thereby IPsec Tunnel (2) is established between the FAP (old) and the PDG (at step B21).

Thereafter, the FAP (old) transmits an INFORMATIONAL Request to the PDG (at step B22).

When the PDG receives the INFORMATIONAL Request, the PDG transmits an INFORMATIONAL Response to the FAP (old) (at step B23).

In addition, the PDG transmits a Dia-ST-Request to the AAA (at step B24).

When the AAA receives the Dia-ST-Request, the AAA transmits a Dia-ST-Answer to the PDG (at step B25).

When the PDG receives the Dia-ST-Answer, the PDG releases IPsec Tunnel (2) established at step B21 (at step B26). After the UE has been authenticated, since IPsec Tunnel (2) that becomes unnecessary is released, the resources can be effectively used.

Thereafter, the FAP (old) transmits a SIP-REGISTER containing the IMSI.UE to the IMS core (at step B27).

When the IMS core receives the SIP-REGISTER, the IMS core transmits a Dia-Cx-UAR to the HSS (at step B28).

When the HSS receives the Dia-Cx-UAR, the HSS transmits a Dia-Cx-UAA to the IMS core (at step B29).

When the IMS core receives the Dia-Cx-UAA, the IMS core transmits a Dia-Cx-SAR containing the IMSI.UE to the HSS (at step B30).

When the HSS receives the Dia-Cx-SAR, the HSS transmits a MAP Update Location containing the IMSI.UE to the HLR (at step B31).

When the HLR receives the MAP Update Location, the HLR transmits a MAP Insert Subscriber Data containing the CS subscriber information of the IMSI.UE to the HSS (at step B32).

When the HSS receives the MAP Insert Subscriber Data, the HSS creates a CS subscriber profile based on the subscriber information of the IMSI.UE contained in the MAP Insert Subscriber Data. The HSS registers the CS subscriber profile to the CS-VLR so as to manage the CS subscriber profile.

Thereafter, the HSS transmits a MAP Insert Subscriber Data Ack to the HLR (at step B33).

When the HLR receives the MAP Insert Subscriber Data Ack, the HLR transmits a MAP Update Location Ack to the HSS (at step B34).

When the HSS receives the MAP Update Location Ack, the HSS transmits a Dia-Cx-SAA containing the IMSI.UE and MSISDN based on the registration information of the CS-VLR to the IMS core (at step B35).

When the IMS core receives the Dia-Cx-SAA, the IMS core transmits a SIP-200 OK containing the MSISDN to the FAP (old) (at step B36).

When the FAP (old) receives the SIP-200 OK, the FAP (old) transmits a Security Mode Command to the UE (at step B37).

When the UE receives the Security Mode Command, the UE performs an encryption process according to a technique based on the 3GPP standard and transmits a Security Mode Complete to the FAP (old) (at step B38).

When the FAP (old) receives the Security Mode Complete, the FAP (old) complements a TMSI (Temporary Mobile Subscriber Identifies) according to a technique based on the 3GPP standard.

The FAP (old) transmits a SIP SUBSCRIBE to the IMS core. The IMS core performs an acknowledge process (at step B39). When the result of the acknowledge process is OK, the IMS core transmits a SIP-200 OK to the FAP (old) (at step B40).

In addition, the IMS core transmits an SIP NOTIFY to the FAP (old) (at step B41). The FAP (old) sends back an SIP-200 OK to the IMS core (at step B42).

The FAP (old) transmits a Location Updating Accept to the UE (at step B43). When the UE receives the Location Updating Accept, the UE transmits a TMSI Reallocation Complete to the FAP (old) (at step B44).

Thus, when the CS position is registered in the communication system according to this embodiment, while IPsec Tunnel (1) is being established between the FAP and the PDG (at step B1), messages are transmitted and received among the UE, FAP (old), PDG, AAA, HSS, and HLR, the authentication process is performed for the UE. If the UE is successfully authenticated, IPsec Tunnel (2) will be established between the FAP (old) and the PDG (at steps B2 to B21). Thereafter, in the authentication process for the UE, IPsec Tunnel (2) that has been established between the FAP (old) and the PDG is released (at steps B22 to B26). Thereafter, the HSS registers the CS subscriber profile obtained from the HLR to the CS-VLR of its own HSS (at steps B27 to B32). As a result, when the CS position is registered, the UE can be authenticated through the FAP (old) and the CS subscriber profile of the UE can be registered to the CS-VLR of the HSS.

Thereafter, to initially register the PS position before the UE performs handover, the UE transmits an Attach Request to the FAP (old) (at step B45).

When the FAP (old) receives the Attach Request, the FAP (old) transmits an IDENTITY Request to the UE (at step B46).

When the UE receives the IDENTITY Request, the UE transmits an IDENTITY Response containing the IMSI.UE to the FAP (old) (at step B47). The IMSI.UE is information with which the UE is identified.

When the FAP (old) receives the IDENTITY Response, the FAP (old) transmits an IKE-SA-INIT Request to the PDG (at step B48). Thereafter, the IKE SA is established between the FAP (old) and the PDG (at step B49).

The FAP (old) transmits an IKE-AUTH Request containing the APN (Access Point Name) and NAI (Network Access Identifier) to the PDG (at step B50).

Since the FAP (old) has received the Attach Request from the UE, the FAP (old) determines to register the PS position and transmits a "0PS0<UE_IMSI>/<Femto_IMSI>@realmname" as the NAI. "0PS0" is information that represents the registration of the PS position. "<UE_IMSI>" is information with which the UE is identified and is IMSI.UE contained in the IDENTITY Response received at step B47. "Femto_IMSI" is information with which the FAP (old) is identified.

When the PDG receives the IKE-AUTH Request, the PDG transmits a Dia-EAP Request containing the NAI contained in the IKE-AUTH Request to the AAA (at step B51).

When the AAA receives the Dia-EAP Request, the AAA determines whether to register the CS position or PS position or activate a PDP context based on the NAI contained in the Dia-EAP Request. In this example, since the AAA determines to register the PS position, the AAA transmits a Dia-Wx-MAR to the HSS.

Since the NAI is "0PS0<UE_IMSI>/<Femto_IMSI>@realmname," the AAA determines to register the PS position, the AAA transmits a Dia-Wx-MAR containing the IMSI of the NAI contained in the Dia-EAP Request.

When the HSS receives the Dia-Wx-MAR, the HSS transmits a MAP Send Authentication Info containing the IMSI.UE contained in the Dia-Wx-MAR to the HLR (at step B52).

Steps B53 to B65 of the process are the same as steps B10 to B20 of the process except that the PS position is registered. Steps B55 and B56 correspond to step B12; steps B57 and B58 correspond to step B13.

When the FAP (old) receives the IKE-AUTH Response, IPsec Tunnel (3) is established between the FAP (old) and the PDG (at step B66).

Thereafter, the FAP (old) transmits an INFORMATION Request to the PDG (at step B67).

When the PDG receives the INFORMATION Request, the PDG transmits an INFORMATION Response to the FAP (old) (at step B68).

In addition, the PDG transmits a Dia-ST-Request to the AAA (at step B69).

When the AAA receives the Dia-ST-Request, the AAA transmits a Dia-ST-Answer to the PDG (at step B70).

When the PDG receives Dia-ST-Answer, the PDG releases IPsec Tunnel (3) that has been established at step B66 (at step B71). After the UE has been authenticated, when IPsec Tunnel (3) that becomes unnecessary is released, the resources can be effectively used.

Thereafter, the FAP (old) transmits a Security Mode Command to the UE (at step B72).

When the UE receives the Security Mode Command, the UE transmits a Security Mode Complete to the FAP (old) (at step B73).

When the FAP (old) receives the Security Mode Complete, the FAP (old) transmits an Attach Accept containing the P-TMSI to the UE (at step B74).

While the PS position is being registered after step B45, the FAP (old) receives the NRI that is the identification information of the PS server that manages its own FAP (old) from a PDG. It is assumed that a PDG is specifically allocated to a PS server and that the PDG has stored the NRI of the PS server allocated thereto.

The NRI transmitted from the PDG to the FAP (old) may be contained in any one of predetermined signals transmitted from the PDG to the FAP (old) in the foregoing operation. For example, the NRI may be contained in any one of signals transmitted from the PDG to the FAP (old) at any one of the foregoing steps B49, B55, B63, B65, and B68.

The PDG may notify the FAP (old) of the NRI of the PS server that manages the FAP (old) in such a manner that the PDG transmits the NRI itself to the FAP (old). Alternatively, the PDG may issue a P-TMSI that contains the NRI and transmit the P-TMSI to the FAP (old).

Thus, at this point, the FAP (old) has stored the NRI of the PS server (old) that manages its own FAP (old). As a result, the FAP (old) issues the P-TMSI such that the P-TMSI contains the NRI of the PS server (old) that manages its own FAP (old) and transmits the Attach Accept containing the P-TMSI to the UE at step B74.

As a technique that embeds an NRI in a P-TMSI, a predetermined number of last digits of a P-TMSI can be designated as an NRI in the same manner as the Iu-Flex function in the existing 3G network. Thus, the Attach Accept transmitted to the UE contains a P-TMSI in the same manner in which an NRI is contained by the Iu-Flex function in the existing 3G network.

When the foregoing PDG issues a P-TMSI containing an NRI of the PS server (old) allocated thereto and notifies the FAP (old) of the NRI, the FAP (old) also transmits the Attach Accept containing the P-TMSI received from the PDG to the UE at step B74 in the same manner as described above.

When the UE receives the Attach Accept, the UE stores the P-TMSI in its own UE and transmits an Attach Complete to the FAP (old) (at step B75).

Thereafter, as a PS call that the UE performs before it moves, the UE transmits a Service Request to the FAP (old) (at step B76).

When the FAP (old) receives the Service Request, the FAP (old) transmits a Security Mode Command to the UE (at step B77).

When the UE receives the Security Mode Command, the UE transmits a Security Mode Complete to the FAP (old) (at step B78).

Thereafter, the UE transmits an Activate PDP Context Request containing the IMSI.UE and the APN (Access Point Name) of the FAP (old) to which the UE belongs to the FAP (old) (at step B79).

When the FAP (old) receives the Activate PDP Context Request, the FAP (old) transmits an address request (Request) for the PS server (old) that manages the own device containing the APN received from the UE to the DNS of the IMS-Femto network (at step B80).

When the DNS of the IMS-Femto network receives the address request (Request) containing the APN, the DNS sequentially sends back address information of PS servers according to the round robin scheme. In other words, the DNS transmits address information of a predetermined number of PS servers and then the FAP (old) determines whether or not address information of a PS server can be allocated. If the address information of a PS server can be allocated, the FAP (old) is allocated to the PS server. If the address information of a PS server cannot be allocated, the DNS retransmits address information of a predetermined number of PS servers. The DNS sends back (answers) the address information of PS servers that can be allocated to the FAP (old) (at step B81).

When the FAP (old) receives the address of the PS server (old), the FAP (old) transmits an IKE-SA-INIT Request to the PS server (old) (at step B82).

When the PS server (old) receives the IKE-SA-INIT Request, the PS server (old) transmits an IKE-SA-INIT Response to the FAP (old) (at step B83).

When the FAP (old) receives the IKE-SA-INIT Response, the FAP (old) transmits an IKE-AUTH Request containing the APN and NAI (Network Access Identifier) to the PS server (old) (at step B84).

Since the FAP (old) has received the Activate PDP Context Request from the UE, the FAP (old) determines to activate the PDP context, the PS server (old) transmits a "0PDP0<UE_IMSI>/<Femto_IMSI>@realmname" as the NAI. "0PDP0" is information that represents the activation of the PDP. "<UE_IMSI>" is information with which the UE is identified and is the IMSI.UE contained in the Activate PDP Context Request received at step B79. "<Femto_IMSI>" is information with which the FAP (old) is identified.

When the PS server (old) receives the IKE-AUTH Request, the PS server (old) transmits a Dia-EAP Request containing both the NAI contained in the IKE-AUTH Request and an EAP-Payload (empty) to the AAA (at step B85).

When the AAA receives the Dia-EAP Request, the AAA determines whether to register the CS position or PS position or activate a PDP context based on the NAI contained in the Dia-EAP Request. When the AAA determines to activate the PDP context, the AAA transmits a Dia-Wx-MAR to the HSS.

Since the NAI is "0PDP0<UE_IMSI>/<Femto_IMSI>@realmname," the AAA determines to activate the PDP context, the AAA transmits a Dia-Wx-MAP containing the IMSI.UE of the NAI contained in the Dia-EAP Request to the HSS.

When the HSS receives the Dia-Wx-MAR, the HSS transmits a MAP-SAI [PDP] containing the IMSI.UE contained in the Dia-Wx-MAR to the HLR (at step B86). MAP-SAI is an acronym of MAP Send Authentication Info. [PDP] represents PDP Activate.

When the HLR receives the MAP-SAI [PDP], the HLR obtains RAND/AUTN/CK/IK/XRES that corresponds to the IMSI.UE contained in the MAP-SAI [PDP] and transmits a MAP-SAI Ack containing the RAND/AUTN/CK/IK/XRES to the HSS (at step B87).

When the HSS receives the MAP-SAI Ack, the HSS transmits a Dia-Wx-MAA containing the RAND/AUTN/CK/IK/XRES contained in the MAP-SAI Ack to the AAA.

When the AAA receives the Dia-Wx-MAA, the AAA transmits a Dia-EAP Answer containing a Result Code (multi-round) and EAP Request/AKA Challenge to the PS server (old) (at step B88).

When the PS server (old) receives the Dia-EAP Answer, the PS server (old) transmits an IKE-AUTH Response containing the EAP Request/AKA Challenge to the FAP (old) (at step B89).

When the FAP (old) receives the IKE-AUTH Request, the FAP (old) transmits an Authentication Request to the UE (at step B90).

When the UE receives the Authentication Request, the UE transmits an Authentication Response to the FAP (old) (at step B91).

When the FAP (old) receives the Authentication Response, the FAP (old) transmits an IKE-AUTH Request containing the EAP Response/AKA Challenge and Private Extension that the P-TMSI issued and transmitted to the UE at step B74, and the RAI that is the identification information of its own FAP (old) to the PS server (old) (at step B92).

When the PS server (old) receives the IKE-AUTH Request, the PS server (old) transmits a Dia-EAP Request containing the EAP Response/AKA Challenge to the AAA (at step B93).

When the AAA receives the Dia-EAP Request, the AAA transmits a Dia-EAP Answer to the PS server (old) (at step B94). If the UE is successfully authenticated, the AAA will transmit a Dia-EAP Answer containing the Result Code (Success) and EAP Request/Success to the PS server (old).

When the PS server (old) receives the Dia-EAP Answer, the PS server (old) transmits a Dia-AA Request to the AAA (at step B95).

When the AAA receives the Dia-AA Request, the AAA transmits a Dia-AA Answer to the PS server (old) (at step B96). If the UE is successfully authenticated, the AAA will transmit a Dia-AA Answer containing the Result Code (Success) to the PS server (old).

When the PS server (old) receives the Dia-AA Answer, the PS server (old) transmits a MAP Update GPRS Location to the HLR (at step B97).

When the HLR receives the MAP Update GPRS Location, the HLR transmits a MAP Insert Subscriber Data containing the same PS subscriber information as that transmitted to an SGSN of the existing 3G network to the PS server (old) (at step B98).

When the PS server (old) receives the MAP Insert Subscriber Data, the PS server (old) creates a PS subscriber profile based on the PS subscriber information of the IMSI.UE contained in the MAP Insert Subscriber Data and registers the PS subscriber profile to the PS-VLR so as to manage the PS subscriber profile. Thereafter, the PS server (old) sends back a MAP Insert Subscriber Data Ack to the HLR (at step B99).

When the HLR receives the MAP Insert Subscriber Data Ack, the HLR transmits a MAP Update GPRS Location Ack to the PS server (old) (at step B100).

When the PS server (old) receives the MAP Update GPRS Location Ack, the PS server (old) transmits an address request (Request) for a GGSN containing the APN of the FAP (old) to the DNS of the existing 3G network or packet public network (at step B101).

The DNS of the existing 3G network or packet public network sends back (answers) the address of the GGSN that the PS server (old) needs to access based on APN contained in the address request (Request) (at step B102).

When the PS server (old) receives the address of the GGSN, the PS server (old) transmits a Create PDP Context Request containing the MSISDN of the UE to the received address (at step B103).

When the GGSN receives the Create PDP Context Request, the GGSN transmits a Create PDP Context Response to the PS server (old) (at step B104).

When the PS server (old) receives the Create PDP Context Response, the PS server (old) transmits an IKE-AUTH Response containing the EAP Request/Success to the FAP (old) (at step B105).

When the FAP (old) receives the IKE-AUTH Response, the FAP (old) transmits a Security Mode Complete to the UE (at step B106).

When the UE receives the Security Mode Complete, the UE transmits a Security Mode Complete to the FAP (old) (at step B107).

When the FAP (old) receives the Security Mode Complete, the FAP (old) performs a 3G wireless encryption process and transmits an IKE-AUTH Request to the PS server (old) (at step B108). The FAP (old) performs the 3G wireless encryption process according to a technique based on the 3GPP standard.

When the PS server (old) receives the IKE-AUTH Request, the PS server (old) transmits an IKE-AUTH Response containing the CF (Remote IP address) to the FAP (old) (at step B109). The CF (Remote IP address) is an IP address of the connection source and which is notified to the FAP (old) when IPSec is newly established upon reception of the Active PDP Context and serves to transmit user data.

When the FAP (old) receives the IKE-AUTH Response, IPsec Tunnel (4) is established between the FAP (old) and the PS server (old) (at step B110). Thereafter, the FAP (old) transmits a Radio Bearer Setup to the UE (at step B111).

When the UE receives the Radio Bearer Setup, the UE sends back a Radio Bearer Setup Complete to the FAP (old) (at step B112). When the FAP (old) receives the Radio Bearer Setup Complete, the FAP (old) transmits an Activate PDP Context Accept to the UE (at step B113).

As a result, the PDP context is activated and thereby the UE can communicate with the device of the remote party through the FAP (old). Thereafter, if no communication state continues for a predetermined time, an RRC Disconnection automatically releases only the wireless channel between the UE and the FAP (old) (at step B114) and then the preservation state occurs (at step B115).

After a communication connection is established based on the PDP context, when the UE moves from the FAP (old) of the IMS-Femto network to the Node B of the existing 3G network (Macro network), the UE starts registering the CS position in the existing 3G network. Thus, the UE transmits a Location Updating Request to the MSC that manages the handover destination Node B (at step B116).

When the MSC receives the Location Updating Request, the MSC transmits an IDENTITY Request to the UE (at step B117).

When the UE receives the IDENTITY Request, the UE transmits an IDENTITY Response containing the IMSI.UE to the MSC (at step B118).

When the MSC receives the IDENTITY Response, the MSC transmits a MAP Send Authentication Information containing the IMSI.UE to the HLR (at step B119).

When the HLR receives the MAP Send Authentication Information, the HLR transmits a MAP Send Authentication Information Ack to the MSC (at step B120).

When the MSC receives the MAP Send Authentication Information Ack, the MSC transmits an Authentication Request to the UE (at step B121).

When the UE receives the Authentication Request, the UE performs an authentication calculation based on information contained in the Authentication Request. The UE performs the authentication calculation according to a technique based on the 3GPP standard. The UE transmits an Authentication Response containing the calculated authentication information to the MSC (at step B122).

When the MAC receives the Authentication Response, the MSC transmits a MAP Update Location to the HLR (at step B123).

When the HLR receives the MAP Update Location, the HLR transmits a MAP Cancel Location containing the IMSI.UE to the HSS (at step B124).

When the HSS receives the MAP Cancel Location, the HSS deletes the relevant CS subscriber profile from the CS-VLR and transmits a MAP Cancel Location Ack to the HLR (at step B125).

When the HLR receives the MAP Cancel Location Ack, the HLR transmits a MAP Insert Subscriber Data containing the subscriber information of IMSI.UE to the MSC (at step B126).

When the MSC receives the MAP Insert Subscriber Data, the MSC creates a CS subscriber profile based on the subscriber information of IMSI.UE contained in the MAP Insert Subscriber Data and registers the CS subscriber profile to the CS-VLR so as to manage it. Thereafter, the MSC transmits a MAP Insert Subscriber Data Ack to the HLR (at step B127).

When the HRL receives the MAP Insert Subscriber Data Ack, the HRL transmits a MAP Update Location Ack to the MSC (at step B128).

When the MSC receives the MAP Update Location Ack, the MSC transmits a Location Updating Accept to the UE (at step B129).

When the UE receives the Location Updating Accept, the UE transmits a TMSI Reallocation Complete to the MSC (at step B130). When the MSC receives the TMSI Reallocation Complete, the MSC correlates the IMSI.UE of the UE and the new TMSI so as to manage the subscriber information (CS) of the UE.

After the HSS transmits the MAP Cancel Location Ack to the HLR at step B125, the HSS transmits a Dia-Cx-RTR (Registration-Termination-Request) to the IMS core (at step B131).

When the IMS core receives the Dia-Cx-RTR, the IMS core transmits a Dia-Cx-RTA (Registration Termination Answer) to the HSS (at step B132). In addition, the IMS core transmits an SIP NOTIFY to the handover source FAP (old) (at step B133). The IMS core sets state="terminated," event="deactivated," and so forth to the Contact tag of the body of the SIP NOTIFY such that the message represents De-Register.

When the FAP (old) receives the SIP NOTIFY, the FAP (old) deletes the subscriber information (CS) of the UE, releases connection to the IMS core, and transmits an SIP-200 OK to the IMS core (at step B134).

Thereafter, to register the PS position after the UE performs handover, the UE transmits a Routing Area Update Request containing the old RAI that identifies the handover source FAP (old), the old P-TMSI that the UE received before it moved, and the PDP Context Status to the SGSN (new) (at step B135).

When the SGSN (new) receives the Routing Area Update Request containing the PDP Context Status, the SGSN (new) determines to successively use the PDP context and transmits an address request for the handover source SGSN containing the old RAI received from the UE to the DNS of the existing 3G network or packet public network (at step B136).

The DNS of the existing 3G network or packet public network correlatively stored all FAPs and RAIs to the address of the representative PS server. Thus, when the DNS receives an address request containing the RAI of the FAP (old), the DNS sends back (answers) the address of the representative PS server that has been preset in the IMS-Femto network to the SGSN (new) (at step B137).

When the SGSN (new) receives the address from the DNS, the SGSN (new) transmits an SGSN Context Request to the address so as to successively use the PDP context (at step B138). Since the SGSN (new) has received the address of the representative PS server as the address of the handover source SGSN, the SGSN (new) transmits the SGSN Context Request containing the IMSI.UE, old RAI, and old P-TMSI to the address of the representative PS server at step B137.

When the representative PS server receives the SGSN Context Request, the representative PS server checks a predetermined region that is, for example, a predetermined number of last digits of the P-TMSI contained in the SGSN Context Request as the NRI. The representative PS server has correlatively stored the address information of each PS server and an NRI that is a number that identifies each PS server. Thus, if a number obtained from the predetermined region of the received P-TMSI matches any one of stored NRIs, the representative PS server identifies the address information correlated with the matched NRI as address information of the PS server (old) that manages the FAP (old) to which the UE belonged before it moved.

The representative PS server forwards the SGSN Context Request received from the SGSN (new) to the address of the identified PS server (old) (at step B139).

When the PS server (old) receives the SGSN Context Request, the PS server (old) searches the subscriber profile of the PS-VLR for configuration information of the PDP context corresponding to the IMSI.UE based on the IMSI.UE, old RAI, and old P-TMSI contained in the SGSN Context Request so as to identify the configuration information of the PDP context corresponding to the IMSI.UE. The PS server (old) transmits an SGSN Context Response containing the configuration information of the identified PDP context the SGSN (new) so as to successively use the PDP context (at step B140). It is assumed that the configuration information of the PDP context contains at least the MM context, PDP context, IMSI_UE, and the address of the SGSN prescribed in the 3GPP standard.

When the SGSN (new) receives the SGSN Context Response, the SGSN (new) successively uses the PDP context based on the configuration information of the received PDP context and sends back an SGSN Context Acknowledge containing the IMSI.UE to the PS server (old) (at step B141).

When the PS server (old) receives the SGSN Context Acknowledge, the PS server (old) deletes the subscriber information (PS) of the UE identified with the IMSI.UE so as to release the resources. Thereafter, the PS server (old) transmits a Session Termination Request to the AAA (at step B142).

When the AAA receives the Session Termination Request, the AAA sends back a Session Termination Answer to the PS server (old) (at step B143).

When the PS server (old) receives the Session Termination Answer, the PS server (old) transmits an Informational Request containing the IMSI.UE to the FAP (old) (at step B144).

When the FAP (old) receives the Informational Request, the FAP (old) deletes the subscriber information (PS) of the UE identified with the IMSI.UE so as to release the resources. Thereafter, the FAP (old) sends back an Informational Response to the PS server (old) (at step B145). As a result, IPsec Tunnel (4) is released between the FAP (old) and the PS server (old) (at step B146).

Thereafter, the SGSN (new) transmits a MAP Send Authentication Info to the HLR (at step B147). When the HLR receives the MAP Send Authentication Info, the SGSN (new) transmits a MAP Send Authentication Info Ack to the SGSN (new) (at step B148).

When the SGSN (new) receives the MAP Send Authentication Info Ack, the SGSN (new) transmits a GMM: Authentication Request to the UE (at step B149).

When the UE receives the GMM: Authentication Request, the UE sends back a GMM: Authentication Response to the SGSN (new) (at step B150).

Thereafter, the SGSN (new) transmits a GTP: Update PDP Context Request to the GGSN (at step B151). When the GGSN receives the GTP: Update PDP Context Request, the GGSN updates the communication path information and transmits a GTP: Update PDP Context Response to the SGSN (new) (at step B152).

When the SGSN (new) receives the GTP: Update PDP Context Response, the SGSN (new) transmits a MAP Update GPRS Location containing the IMSI.UE to the HLR (at step B153).

When the HLR receives the MAP Update GPRS Location, the HLR transmits a MAP Cancel Location containing the IMSI.UE to the PS server (old) (at step B154).

When the PS server (old) receives the MAP Cancel Location, since the subscriber information (PS) of the UE identified with the IMSI.UE has been deleted, the PS server (old) simply transmits a MAP Cancel Location Ack to the HLR (at step B155).

When the HLR receives the MAP Cancel Location Ack, the HLR transmits a MAP Insert Subscriber Data containing the subscriber information of IMSI.UE to the SGSN (new) (at step B156).

When the SGSN (new) receives the MAP Insert Subscriber Data, the SGSN (new) creates a subscriber profile (PS) based on the subscriber information of IMSI.UE and stores the created subscriber profile (PS) as the PS-VLR. Thereafter, the SGSN (new) sends back a MAP Insert Subscriber Data Ack to the HLR (at step B157).

When the HLR receives the MAP Insert Subscriber Data Ack, the HLR transmits a MAP Update GPRS Location Ack to the SGSN (new) (at step B158).

When the SGSN (new) receives the MAP Update GPRS Location Ack, the SGSN (new) transmits a Routing Area Update Accept containing the P-TMSI to the UE (at step B159). At this point, the SGSN (new) issues the P-TMSI containing the NRI that is identification information (SGSN number) of its own SGSN (new) as the Iu-Flex function of the existing 3G network and transmits the P-TMSI to the UE.

When the UE receives the Routing Area Update Accept, the UE stores the P-TMSI in its own UE and transmits a Routing Area Update Complete to the SGSN (new) (at step B160).

As a result, after the UE performs PS handover, the PDP context is activated and thereby the UE can communicate with the device of the remote party through the handover destination Node B. Thereafter, if no communication state continues for a predetermined time, the wireless channel between the UE and the Node B is automatically released and the preservation state occurs (at step B161).

<Another Example (PS Handover from IMS-Femto Network to Existing 3G Network)>

Next, with reference to FIG. 11, another example of a PS handover operation performed from the IMS-Femto network to the existing 3G network will be described.

The foregoing PS handover operation performed from the IMS-Femto network to the existing 3G network describes that the FAP (old) transmits the Attach Accept containing the P-TMSI to the UE at step B74. In other words, since the identification information (NRI) of a PS server has been specifically allocated to a PDG, the FAP (old) obtains the identification information (NRI) of the PS server from the PDG and transmits the P-TMSI containing the NRI to the UE.

The operation according to this embodiment is not limited to the foregoing operation as long as the FAP (old) receives the identification information (NRI) of the PS server that manages the FAP (old) from an upper hierarchical device of the IMS-Femto network and the FAP (old) transmits the identification information to the UE before it moves and performs handover.

As another example, the FAP (old) may communicate with the PS server (old) that manages its own FAP (old). After the FAP (old) receives the identification information (NRI) of the PS server (old) from itself, the FAP (old) may be able to transmit the P-TMSI containing the NRI to the UE.

In this case, the FAP (old) may receive the NRI that is the identification information of the PS server (old) from the PS server (old) that manages its own FAP (old) and stores the received NRI in its own FAP (old). The NRI transmitted from the PS server (old) that manages the FAP (old) to itself may be contained in any one of predetermined signals that are transmitted from the PS server (old) to the FAP (old) in the preceding example. The NRI may be contained in any one of the signals transmitted from the PS server (old) to the FAP (old) at any one of the foregoing steps B83, B89, and B105.

An NRI itself may be transmitted from the PS server (old) to the FAP (old). Alternatively, the PS server (old) may issue a P-TMSI containing an NRI and transmit the P-TMSI to the FAP (old).

As a result, the FAP (old) may obtain the NRI of the PS server (old) that manages its own FAP (old) from the PS server (old) and stores the NRI in its own FAP (old) before the FAP (old) receives the IKE-AUTH Response at step B105.

Figure 11:
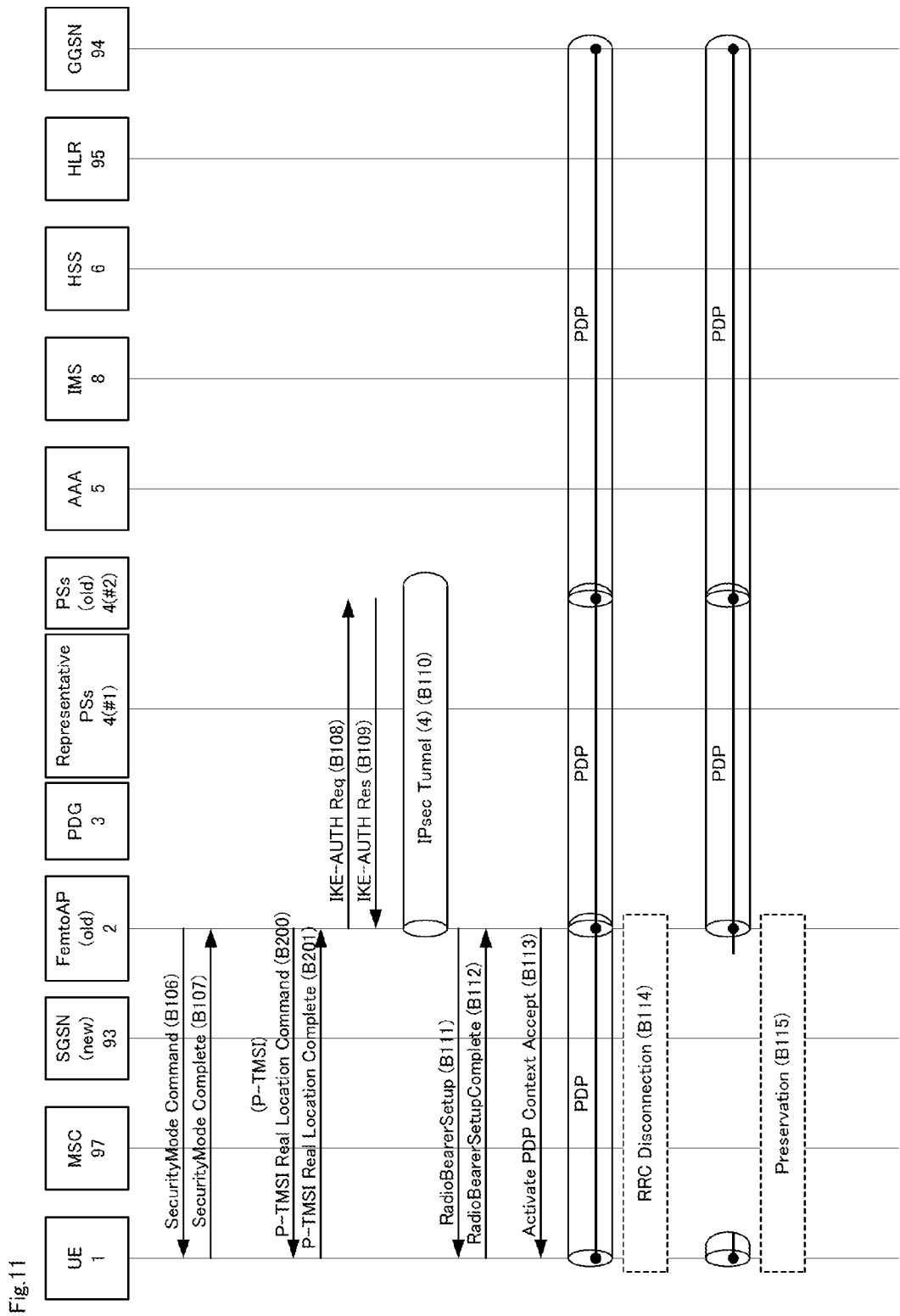
FIG. 11 is a sequence diagram describing another example of a PS handover operation performed from the IMS-Femto network to the existing 3G network.
Figure 12B:
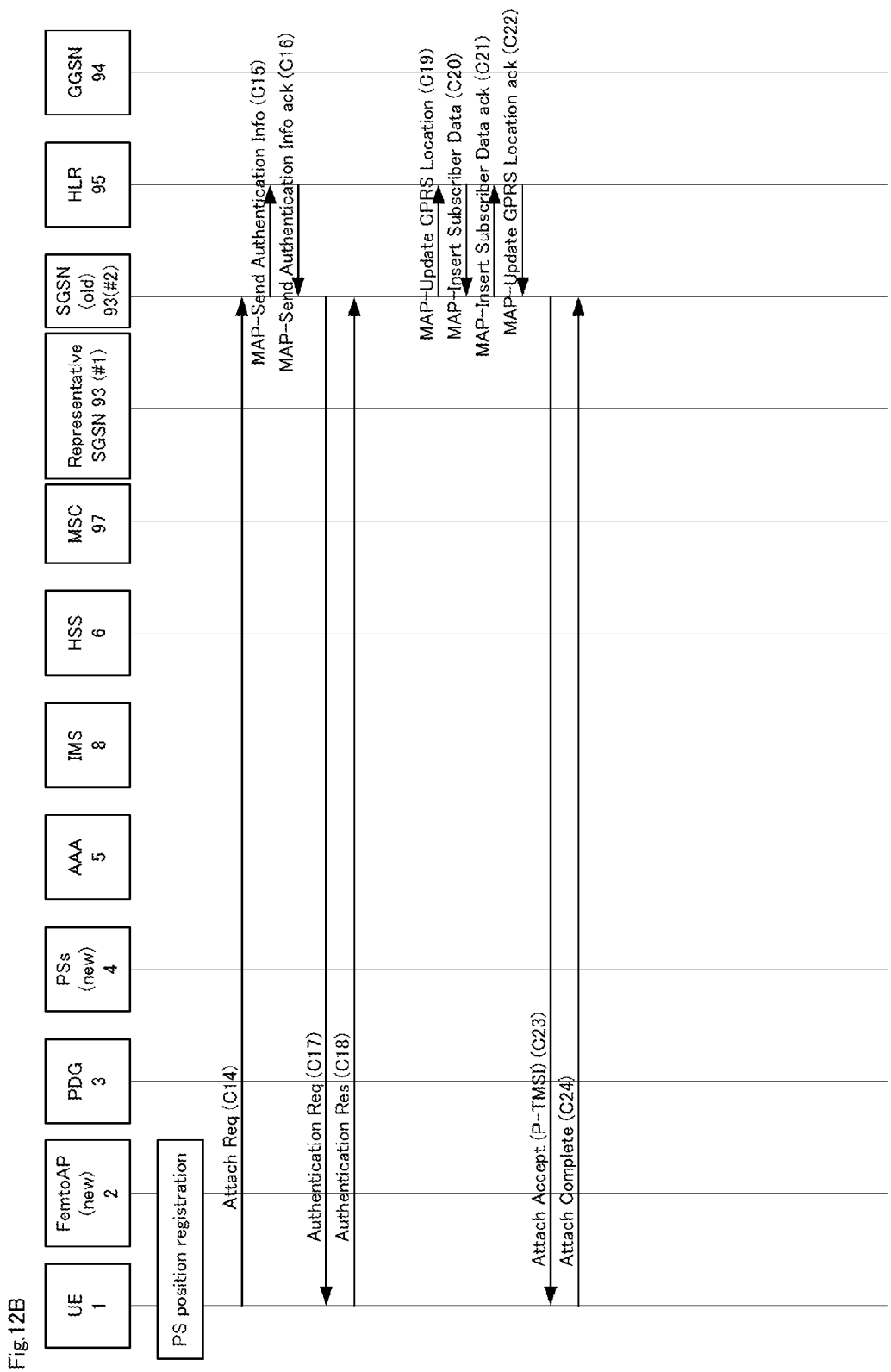
FIG. 12B is a first part of a sequence diagram showing an example of a PS handover operation performed from the existing 3G network to the IMS-Femto network.
Figure 13:
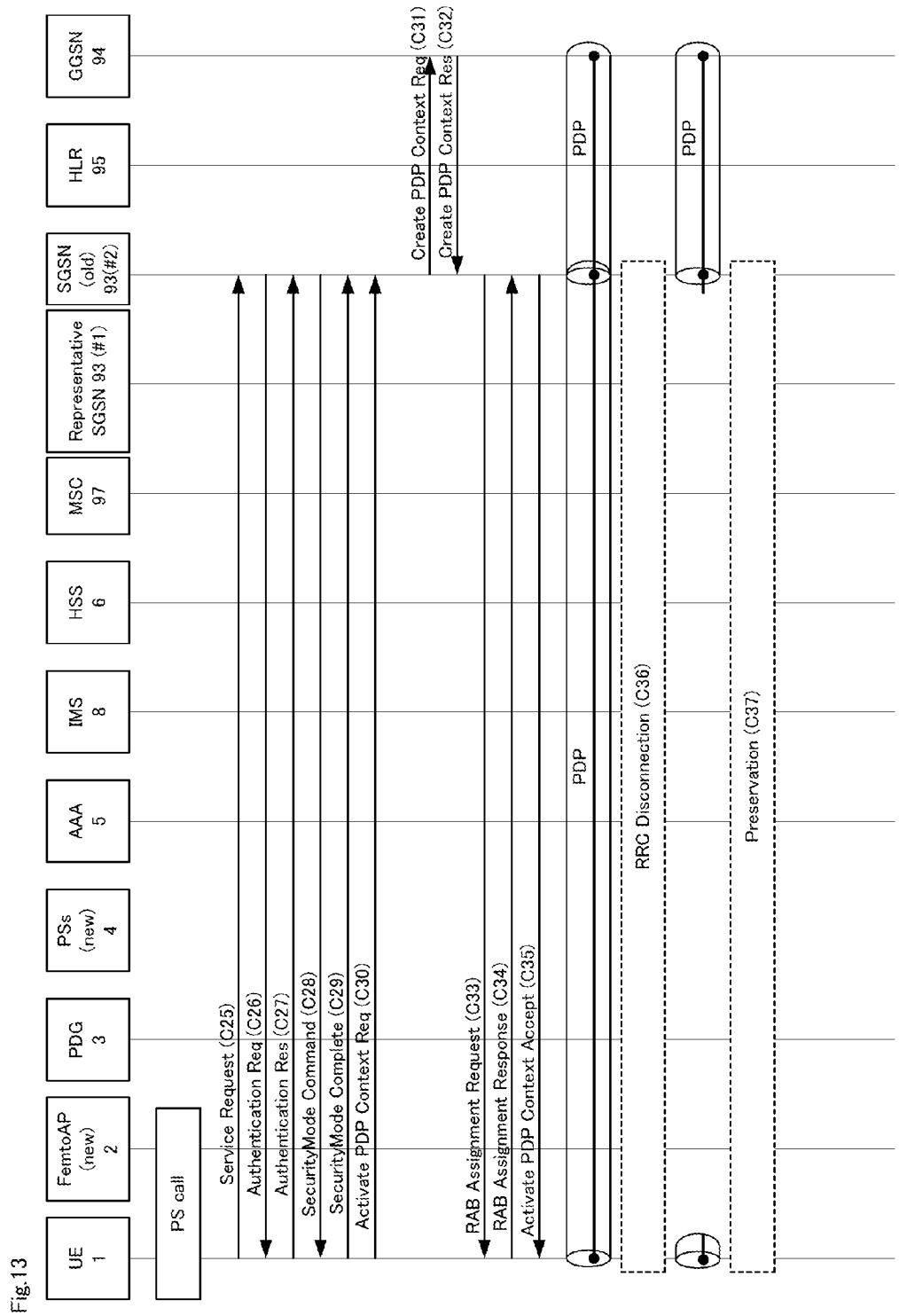
FIG. 13 is a second part of a sequence diagram showing an example of a PS handover operation performed from the existing 3G network to the IMS-Femto network.
Figure 14A:
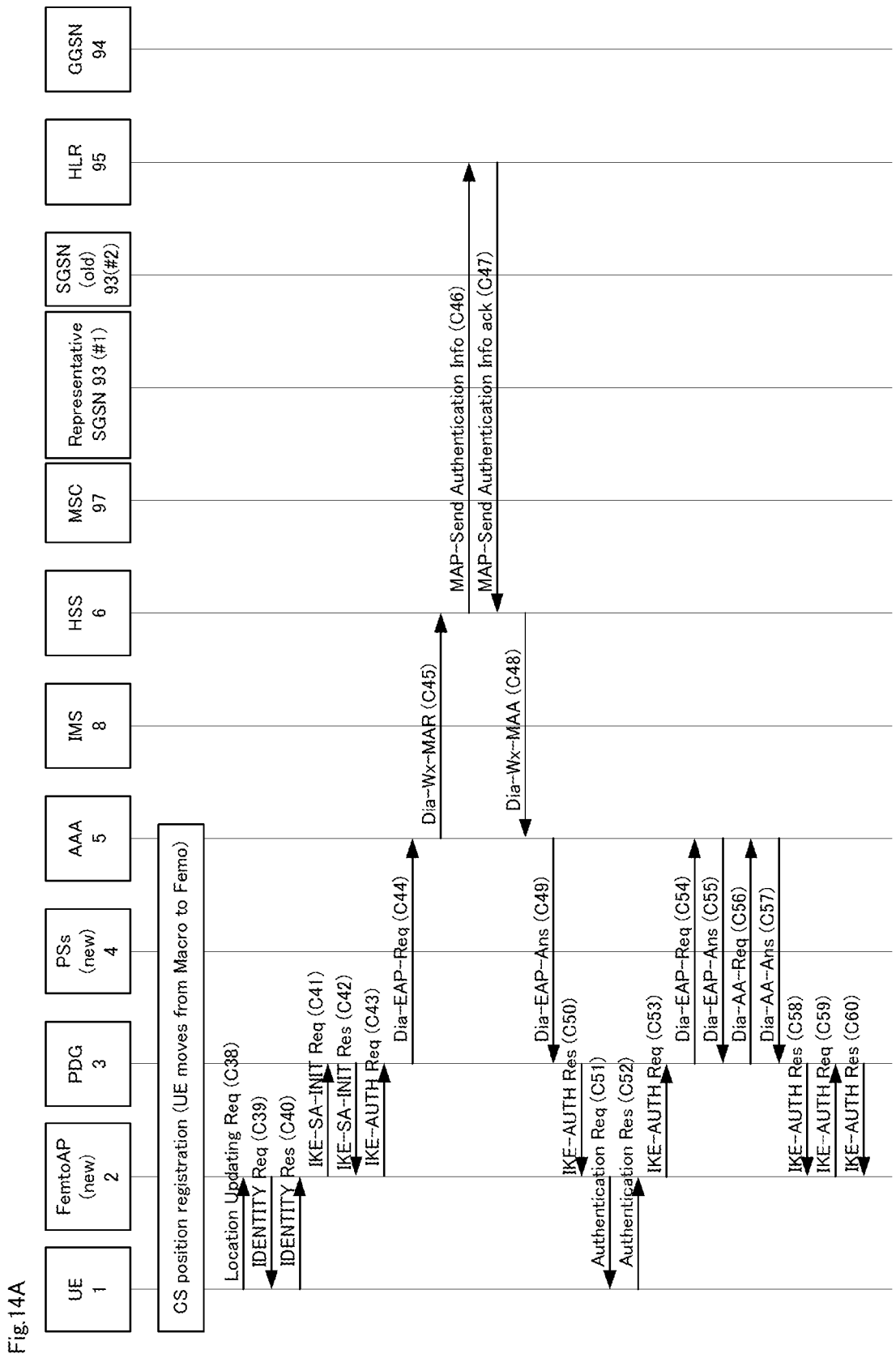
FIG. 14A is a third part of a sequence diagram showing an example of a PS handover operation performed from the existing 3G network to the IMS-Femto network.
Figure 16A:
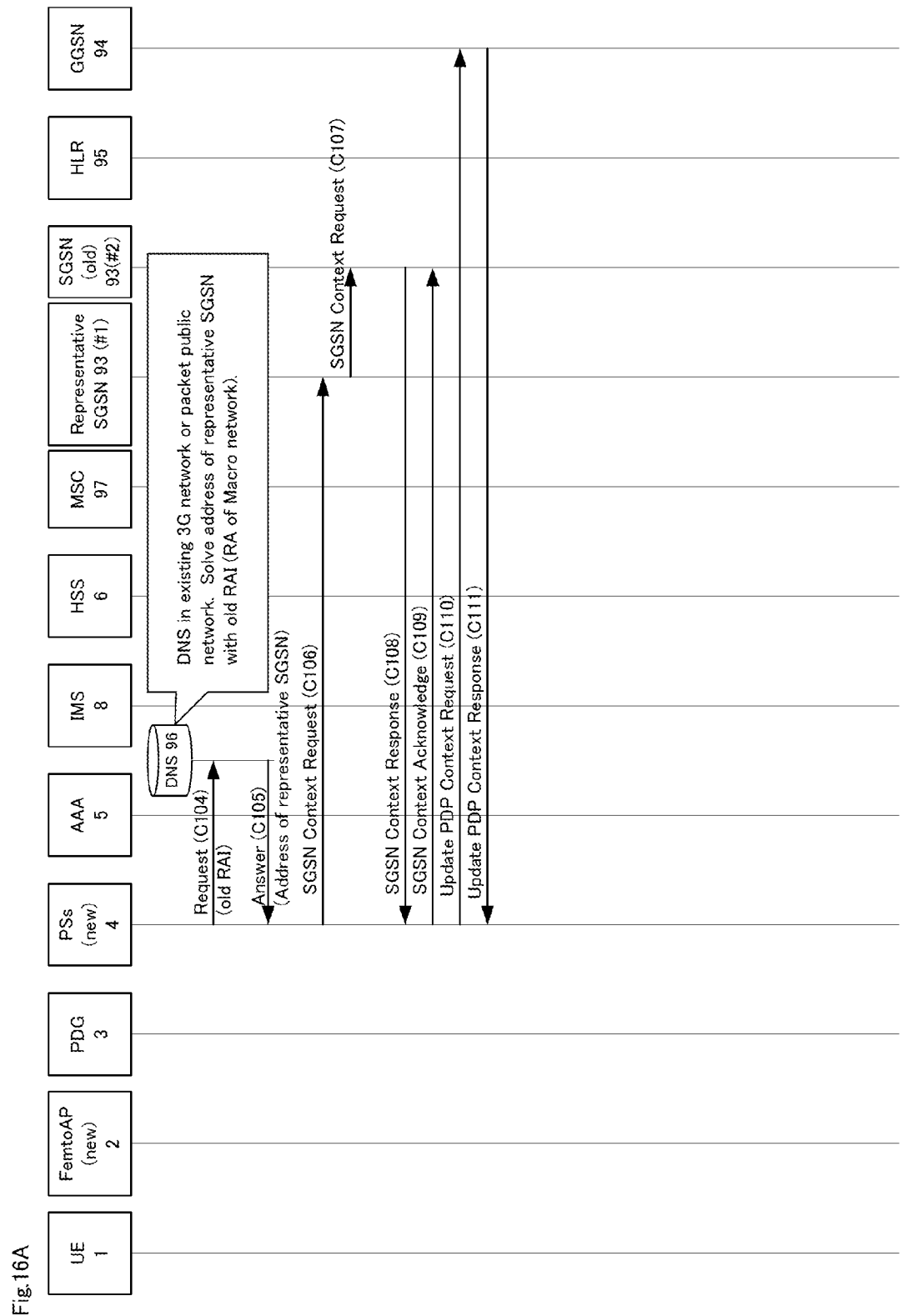
FIG. 16A is a fifth part of a sequence diagram showing an example of a PS handover operation performed from the existing 3G network to the IMS-Femto network.
Figure 16B:
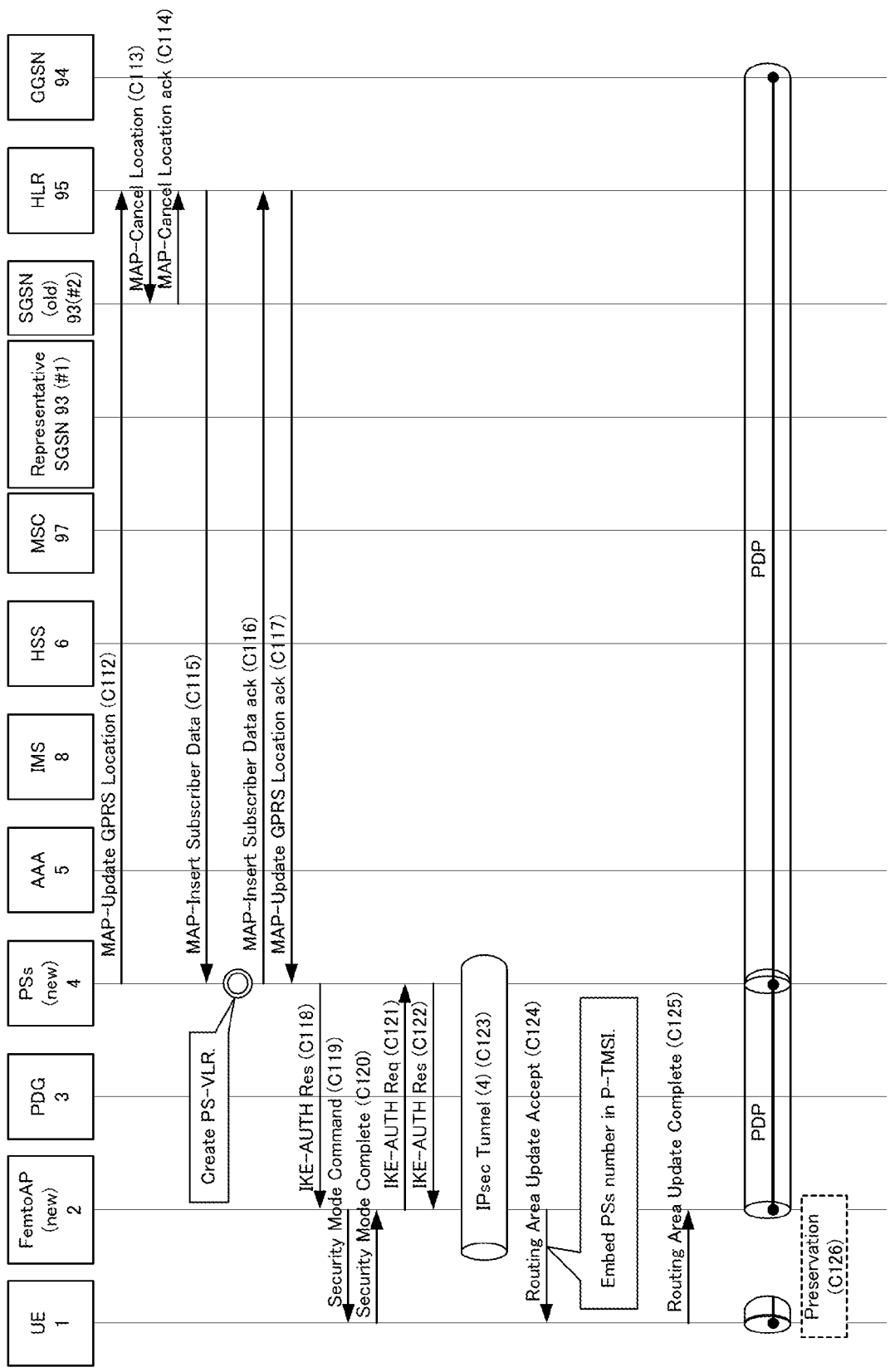
FIG. 16B is a fifth part of a sequence diagram showing an example of a PS handover operation performed from the existing 3G network to the IMS-Femto network.
Figure 17A:
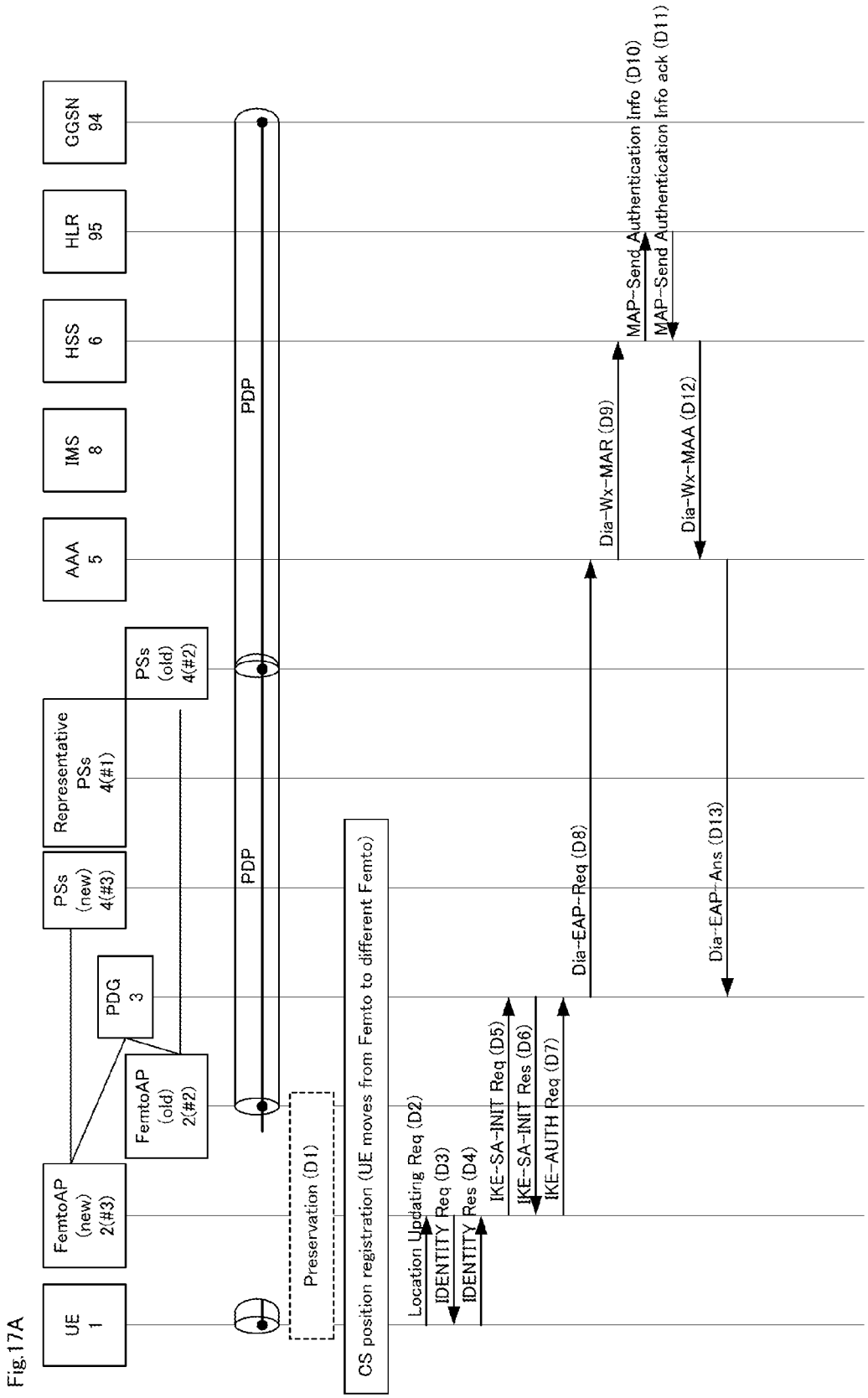
FIG. 17A is a first part of a sequence diagram showing an example of a PS handover operation performed between FAPs of different PS servers.
Figure 17B:
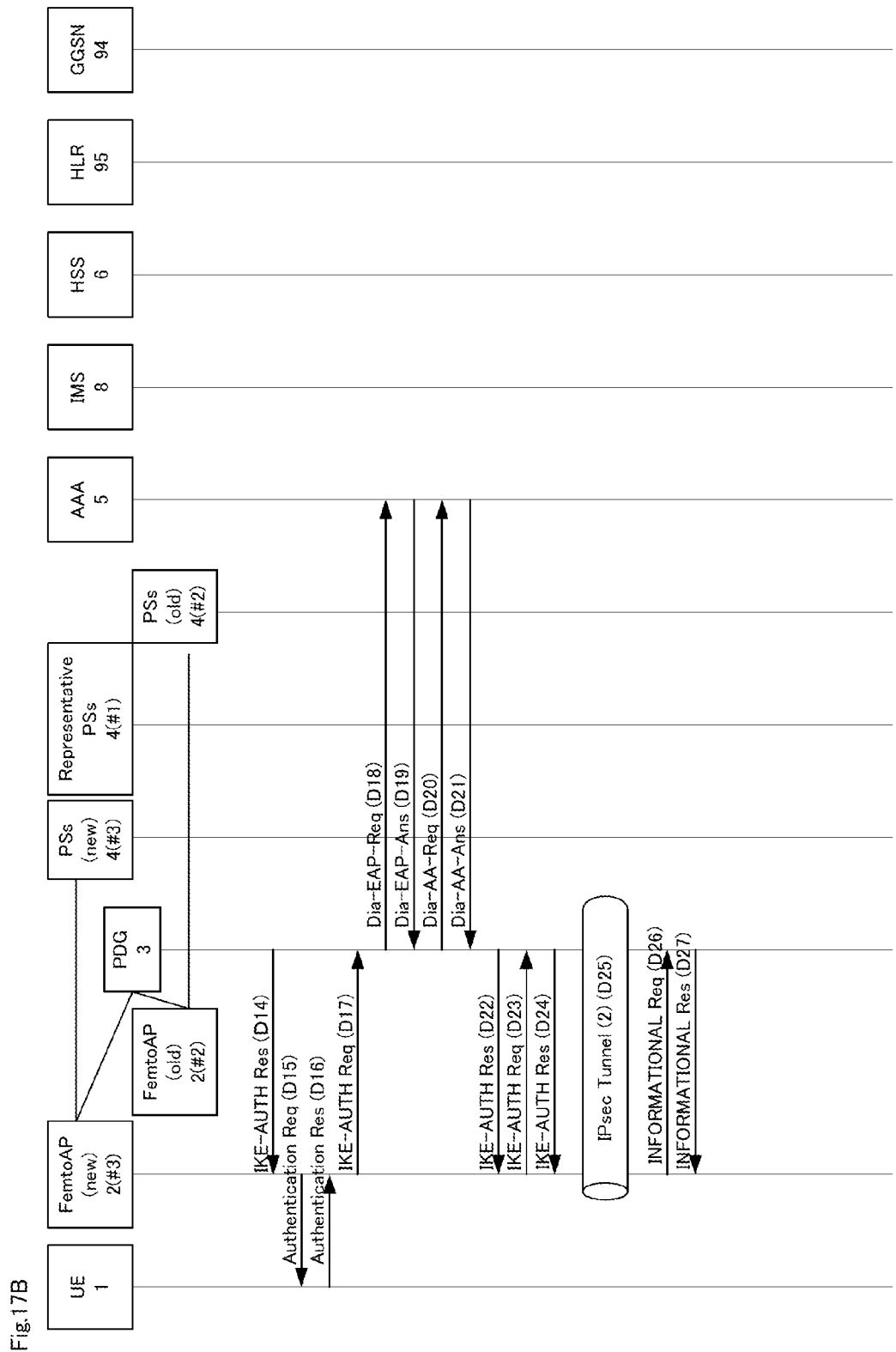
FIG. 17B is a first part of a sequence diagram showing an example of a PS handover operation performed between FAPs of different PS servers.
Figure 18A:
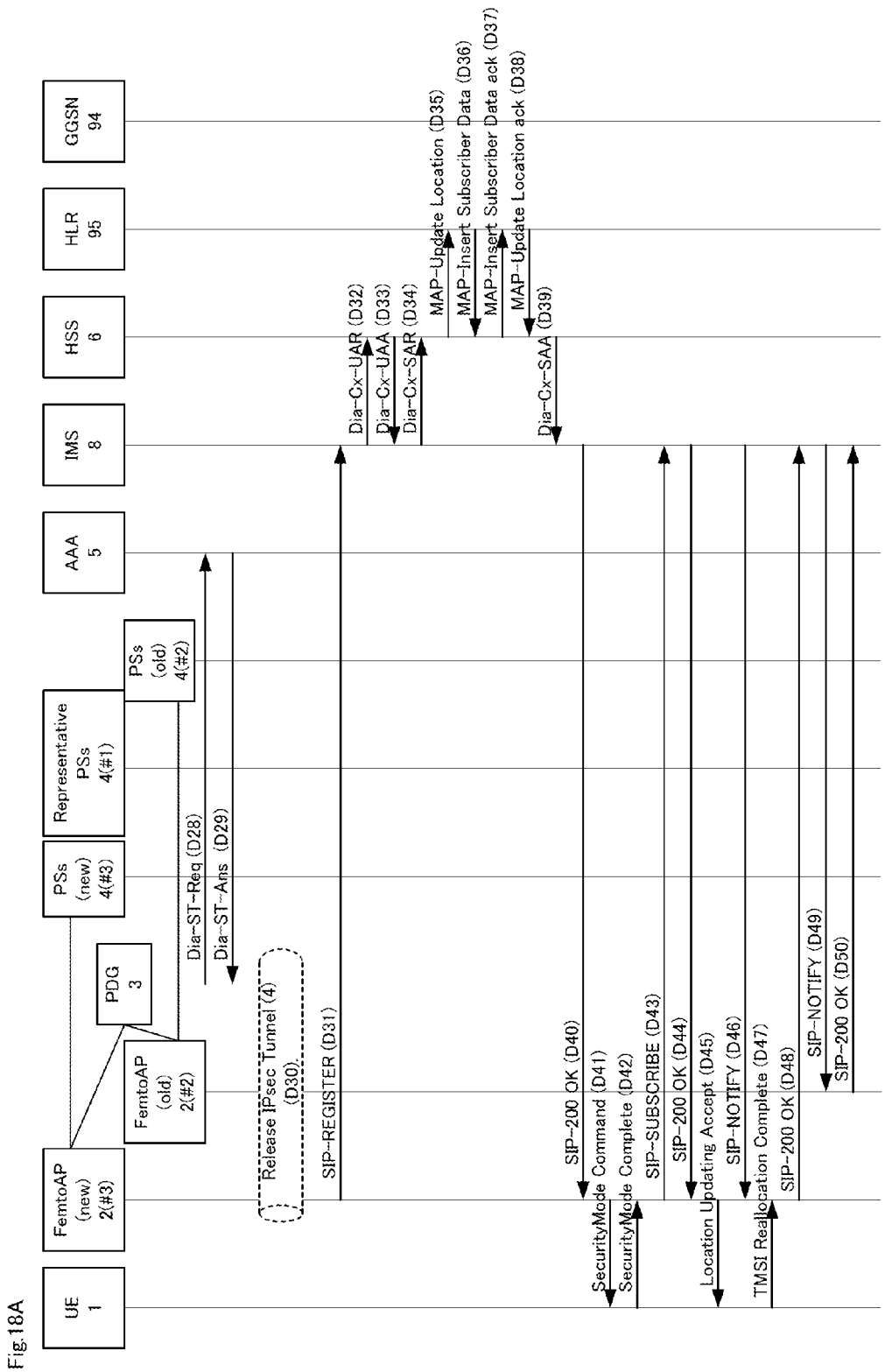
FIG. 18A is a second part of a sequence diagram showing an example of a PS handover operation performed between FAPs of different PS servers.
Figure 18B:
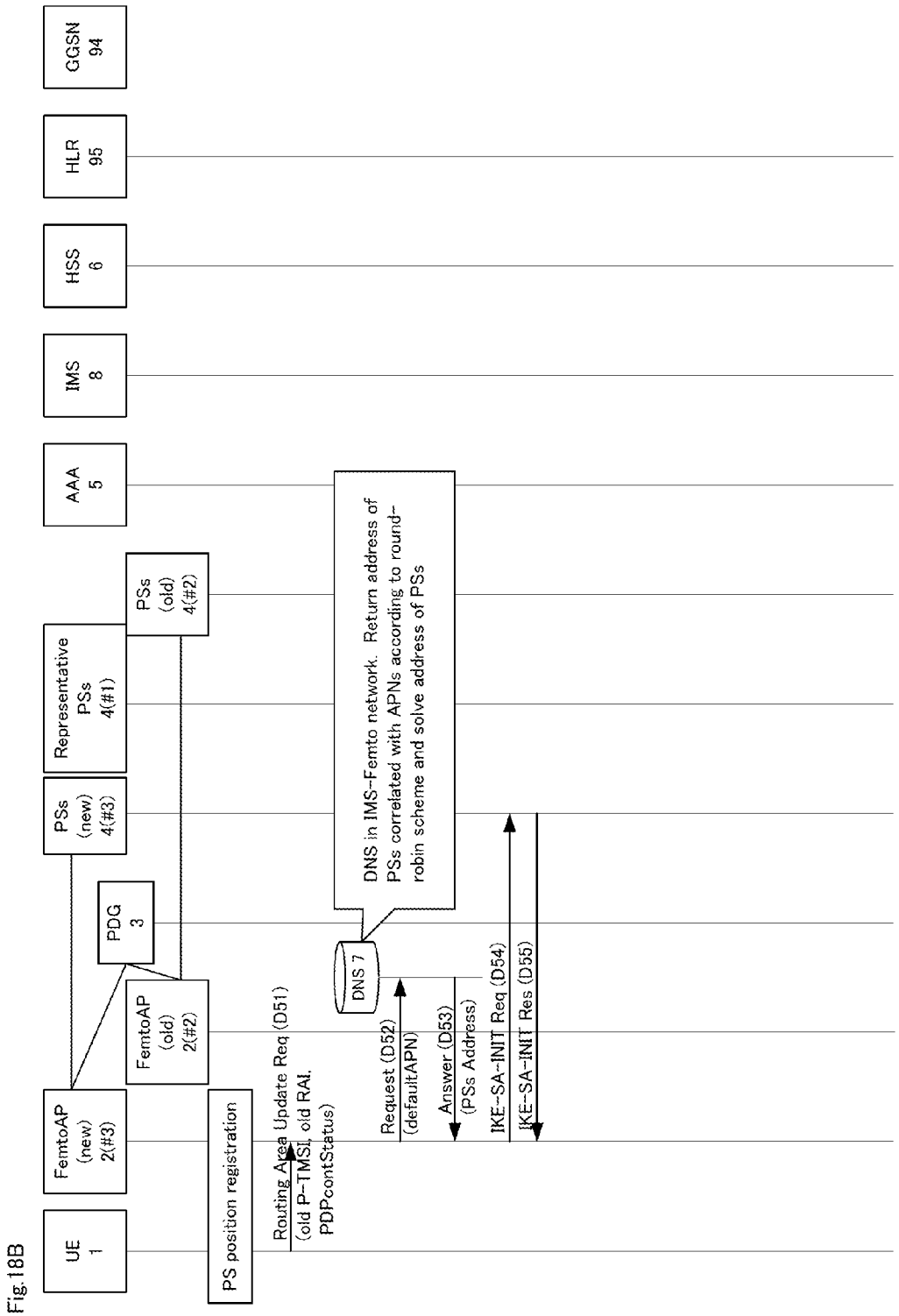
FIG. 18B is a second part of a sequence diagram showing an example of a PS handover operation performed between FAPs of different PS servers.
Figure 19A:
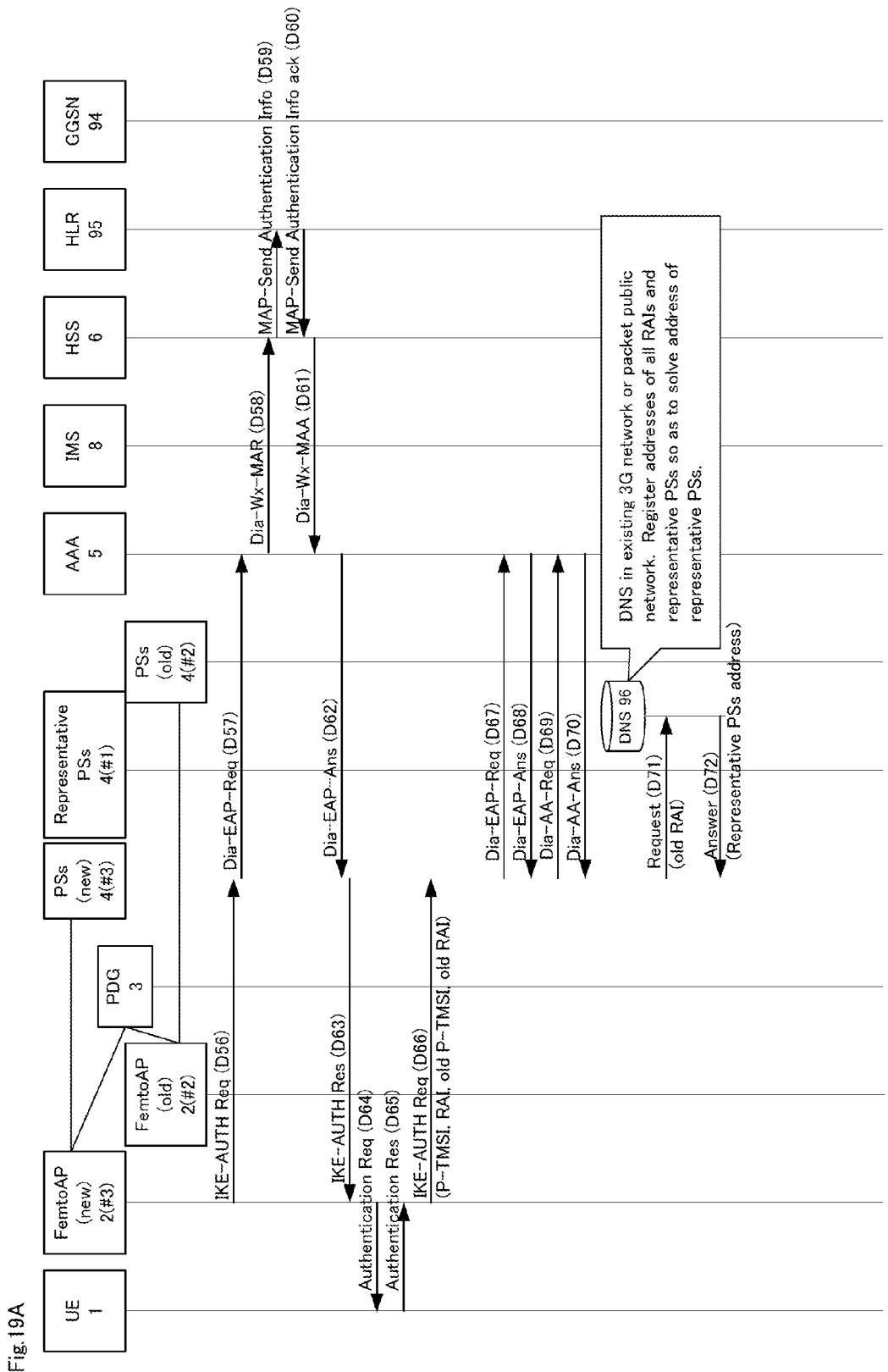
FIG. 19A is a third part of a sequence diagram showing an example of a PS handover operation performed between FAPs of different PS servers.
Figure 19B:
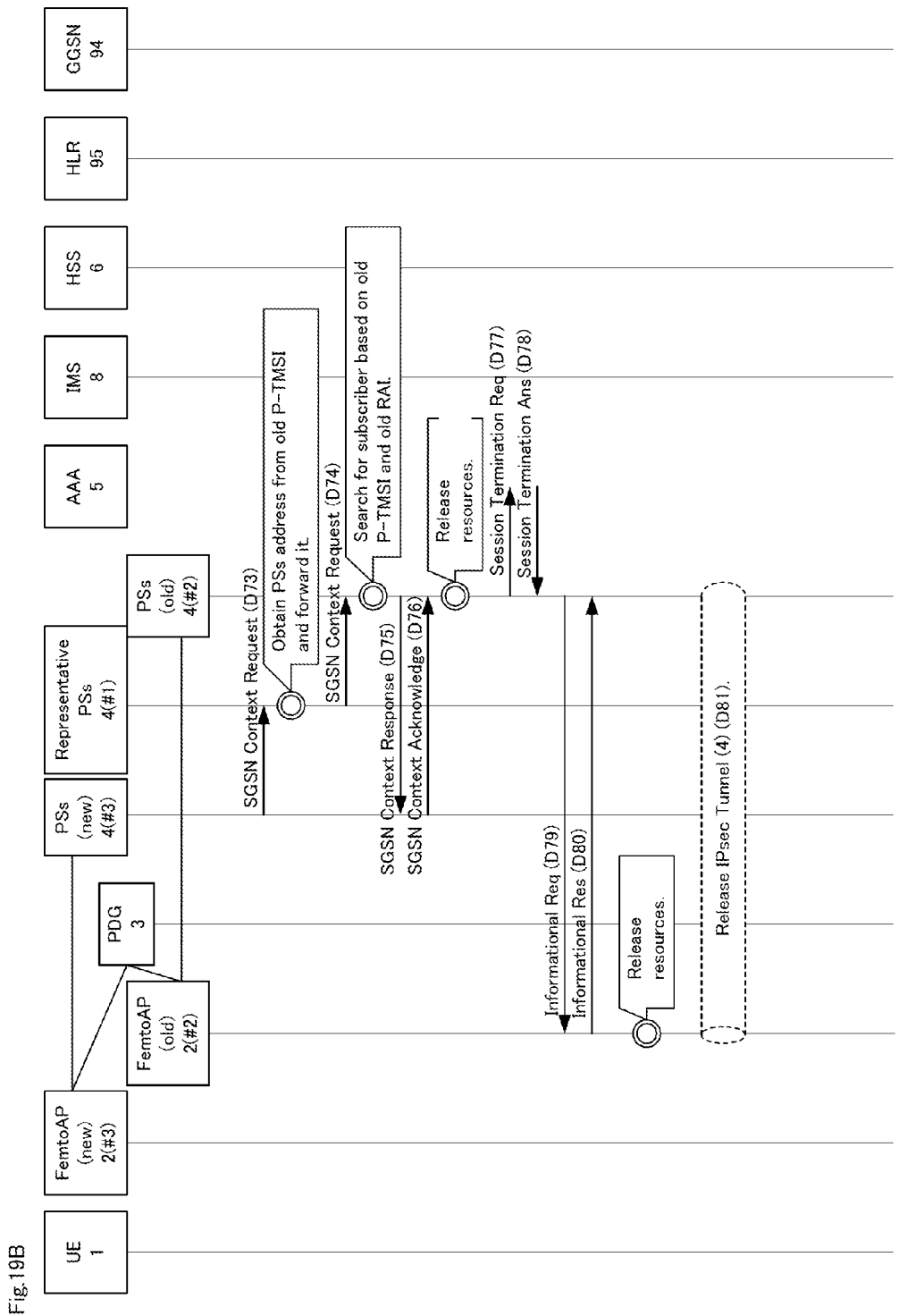
FIG. 19B is a third part of a sequence diagram showing an example of a PS handover operation performed between FAPs of different PS servers.
Figure 20A:
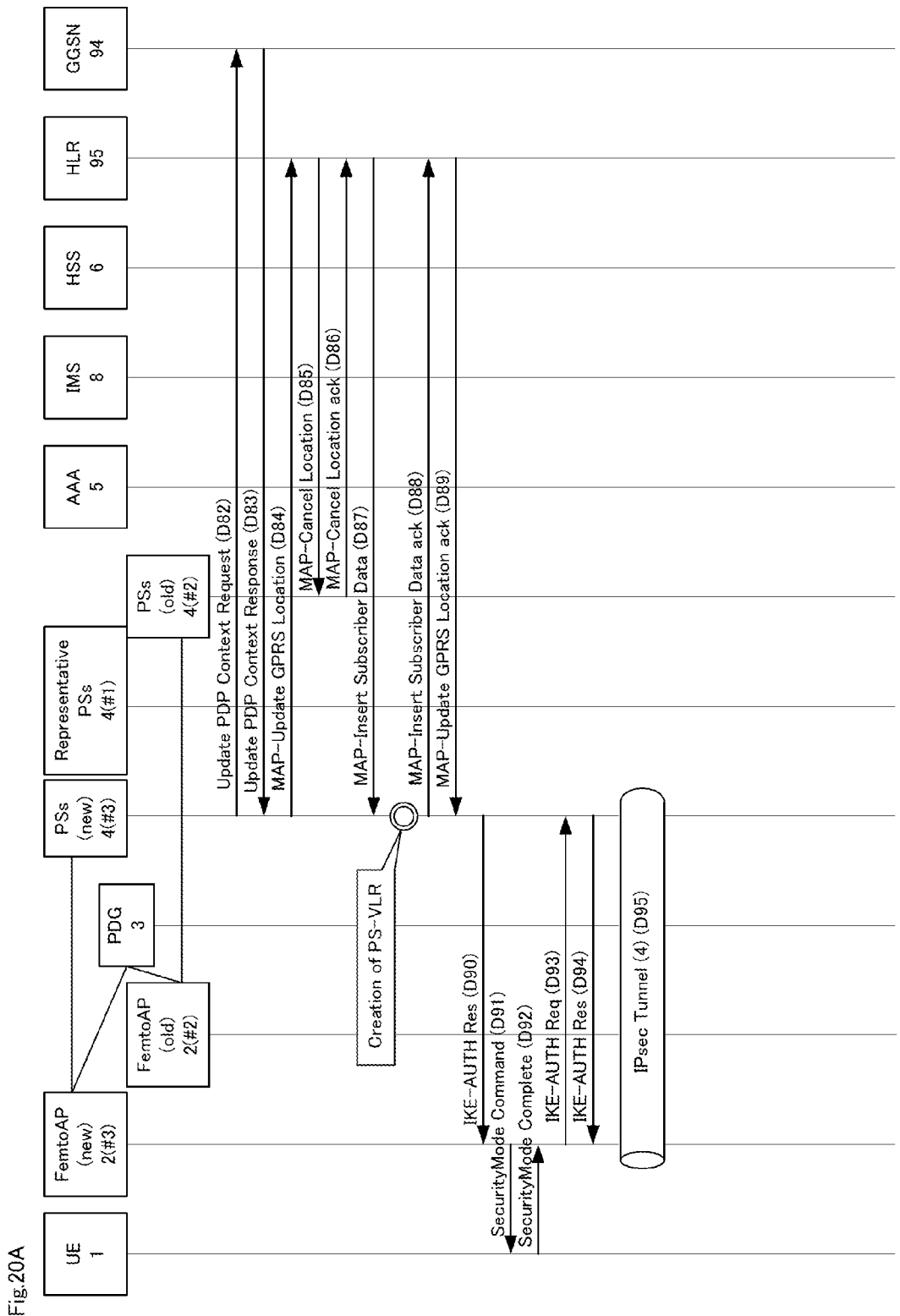
FIG. 20A is a fourth part of a sequence diagram showing an example of a PS handover operation performed between FAPs of different PS servers.
Figure 21A:
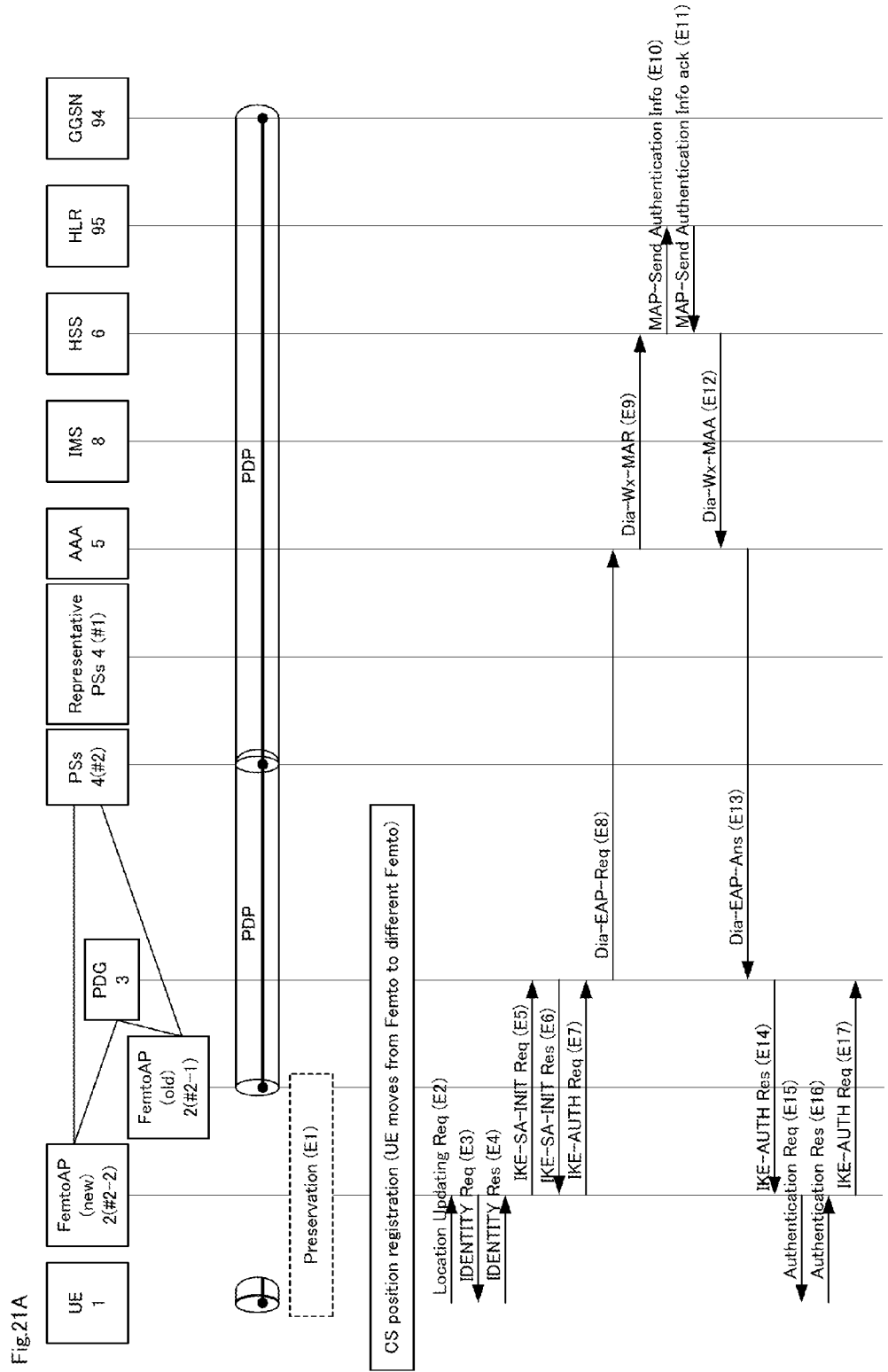
FIG. 21A is a first part of a sequence diagram showing an example of a PS handover operation performed between FAPs that belong to the same PS server.
Figure 21B:
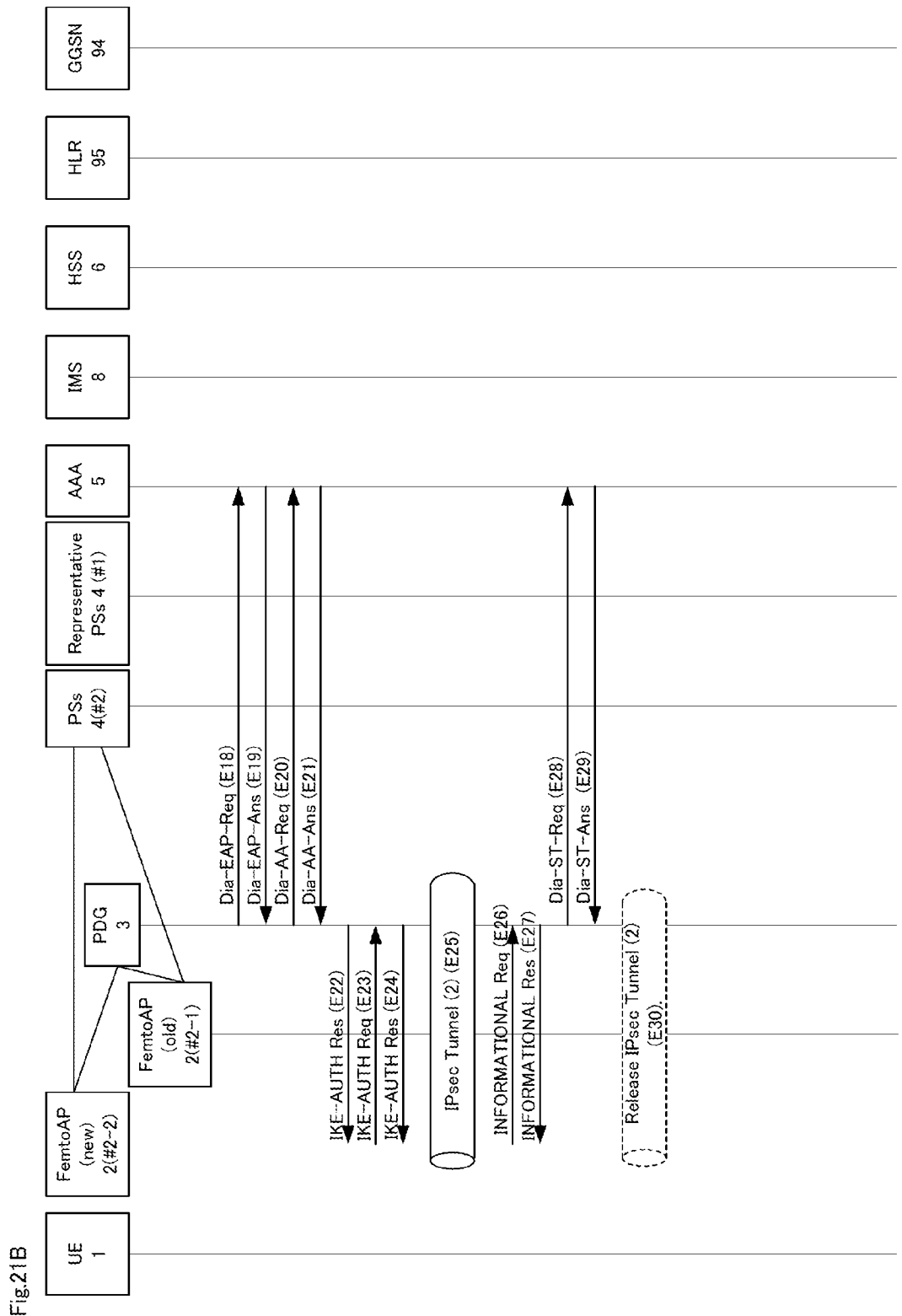
FIG. 21B is a first part of a sequence diagram showing an example of a PS handover operation performed between FAPs that belong to the same PS server.
Figure 22B:
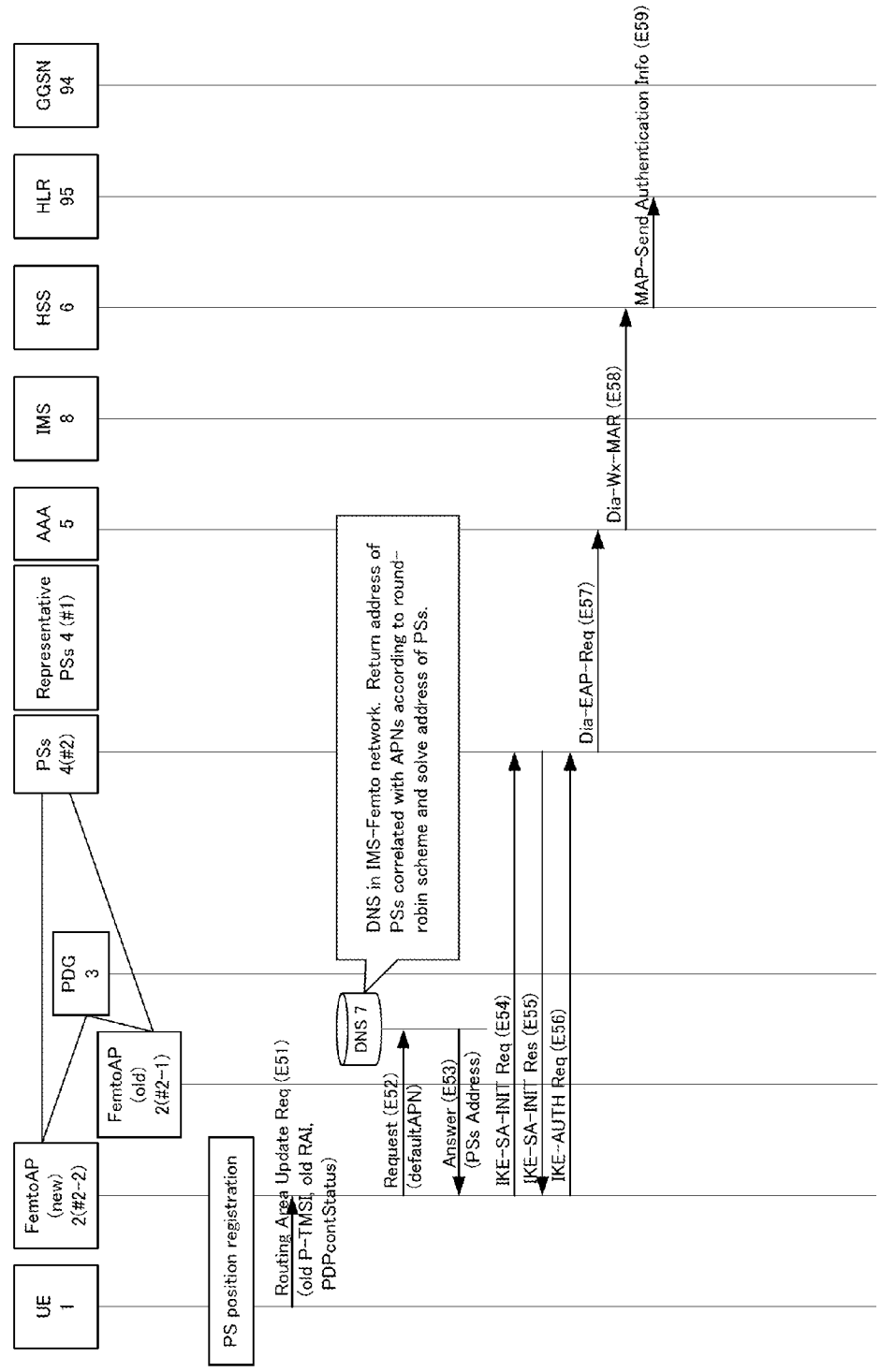
FIG. 22B is a second part of a sequence diagram showing an example of a PS handover operation performed between FAPs that belong to the same PS server.
Figure 23A:
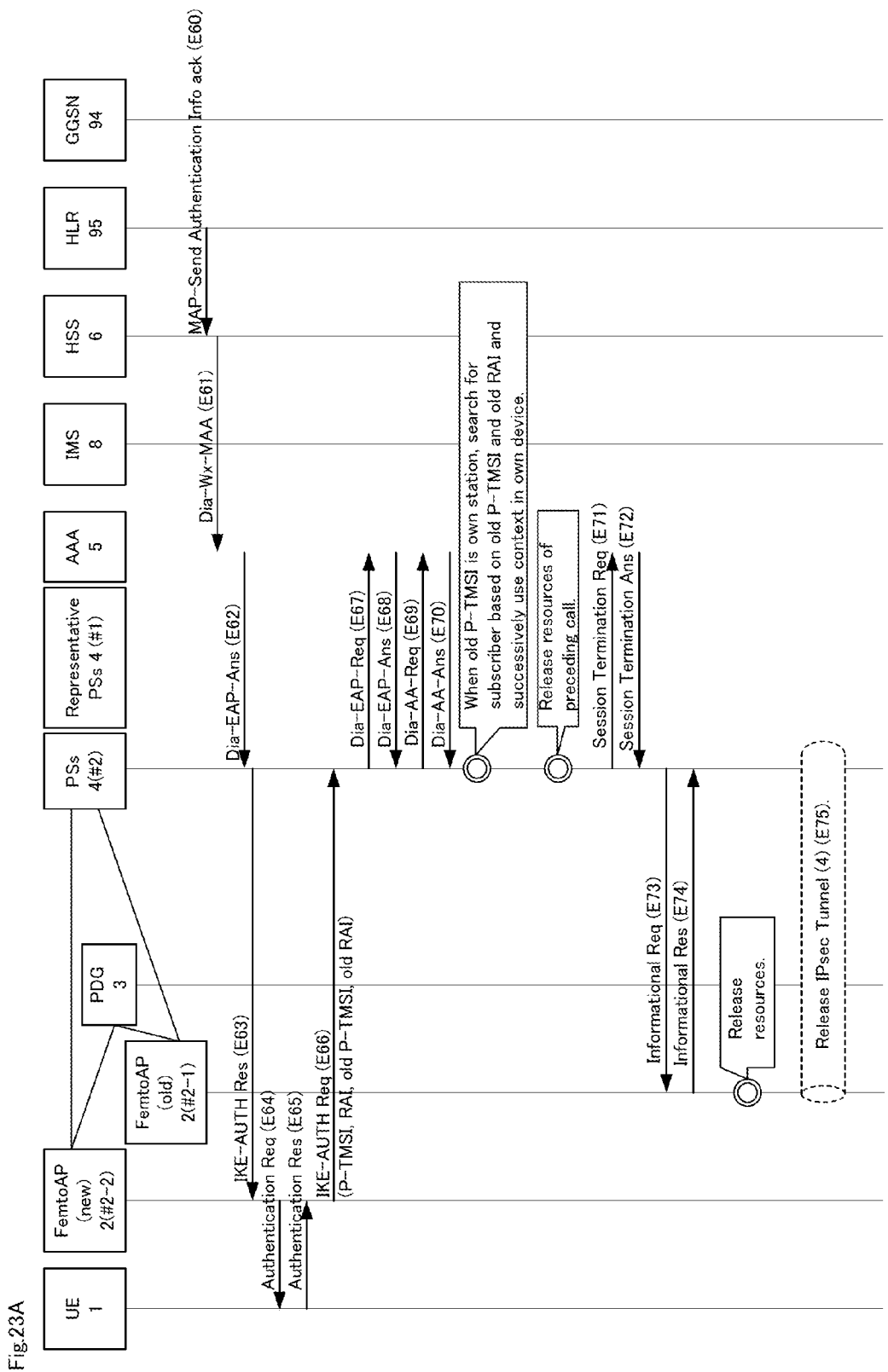
FIG. 23A is a third part of a sequence diagram showing an example of a PS handover operation performed between FAPs that belong to the same PS server.
Figure 23B:
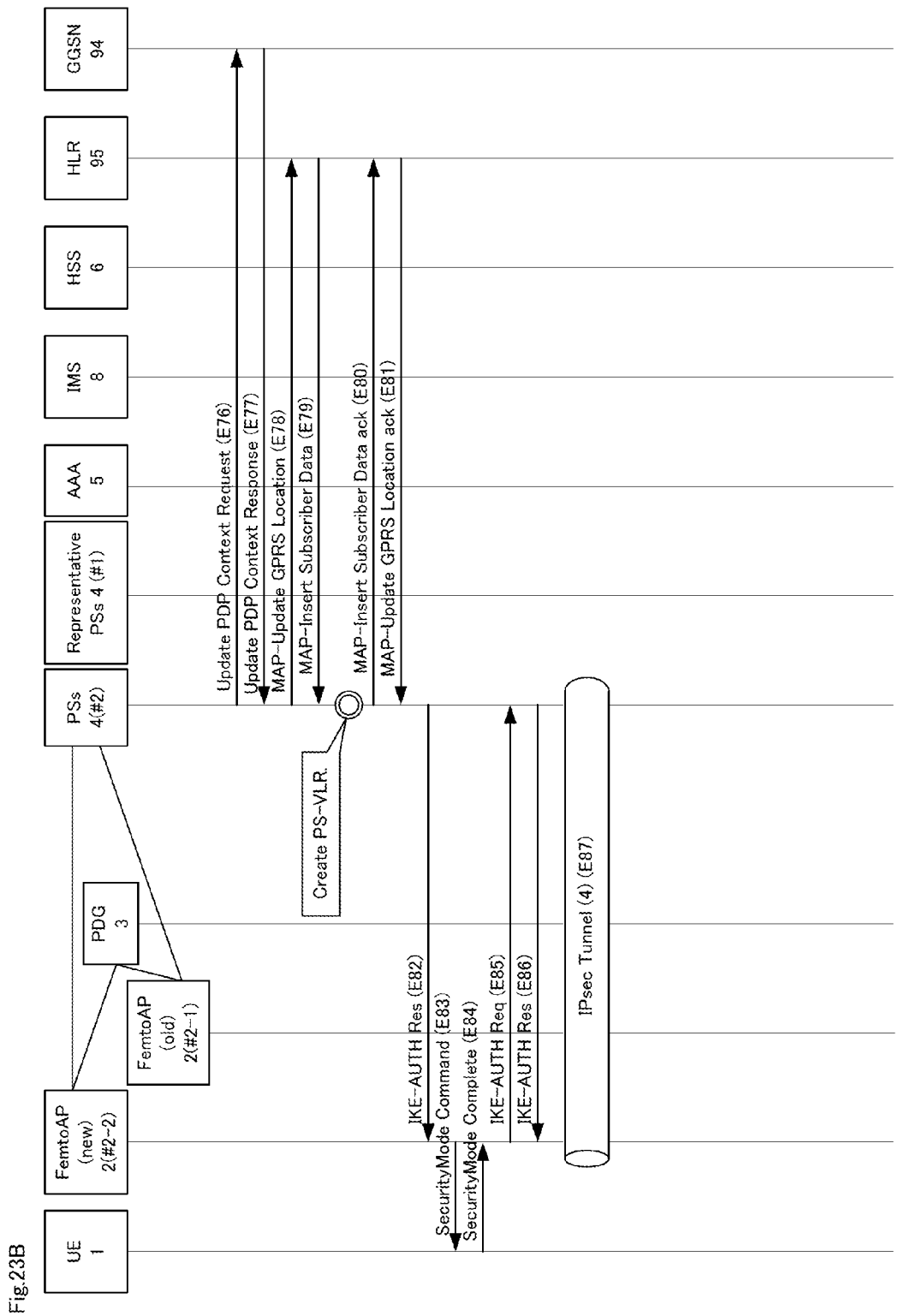
FIG. 23B is a third part of a sequence diagram showing an example of a PS handover operation performed between FAPs that belong to the same PS server.

Thereafter, when the FAP (old) receives the Security Mode Complete from the UE at step B107 in the foregoing example, the FAP (old) issues the P-TMSI containing the NRI of the PS server (old) that manages its own FAP (old) and transmits a P-TMSI Real Location Command containing the P-TMSI to the UE (at step B200) as shown in FIG. 11.

As a technique that embeds an NRI in a P-TMSI, a predetermined number of last digits of a P-TMSI can be designated as an NRI in the same manner as the Iu-Flex function in the existing 3G network. Thus, the P-TMSI Real Location Command transmitted to the UE contains a P-TMSI in the same manner in which an NRI is contained by the Iu-Flex function in the existing 3G network.

When the PS server (old) issues the P-TMSI containing the NRI of its own PS server (old) and notifies the FAP (old) of the P-TMSI, the FAP (old) transmits the P-TMSI Real Location Command containing the P-TMSI received from the PS server (old) to the UE at step B200 in the same manner as the foregoing example.

When the UE receives the P-TMSI Real Location Command, the UE stores the P-TMSI in its own UE and transmits a P-TMSI Real Location Complete to the FAP (old) (at step B201).

When the FAP (old) receives the P-TMSI Real Location Complete, the FAP (old) transmits an IKE-AUTH Request to the PS server (old) at step B108.

When the FAP (old) obtains the identification information (NRI) of the PS server that manages the own device from the PS server (old) that is a higher hierarchical device of the IMS-Femto network and transmits the P-TMSI containing the NRI to the UE before it moves and performs handover, the PS handover operation according to this embodiment can be accomplished as prescribed in the 3GPP Standard and so forth.

In the foregoing example, a PS server does not need to have been specifically allocated to a PDG. Thus, as the relationship between PDGs and PS servers, whenever connected, an optimum PDG and optimum PS server may be selected.

<Example of PS Handover Operation from Existing 3G Network to IMS-Femto Network>

Next, with reference to sequence diagrams shown in FIG. 12A to FIG. 16B, an example of an operation in the case in which a UE hands over a call from a Node B of the existing 3G network to an FAP of the IMS-Femto network according to this embodiment will be described.

In the following description, it is assumed that an SGSN that manages a handover source Node B to which the UE belonged is referred to as the SGSN (old); a handover destination FAP to which the UE newly belongs is referred to as the FAP (new); and a PS server that manages the FAP (new) is referred to as the PS server (new).

To activate a PDP context before a UE moves and perform PS handover, a sequence of operations is performed between the UE and the existing 3G network including the handover destination Node B: the CS position is registered (at steps C1 to C13), the PS position is registered (at steps C14 to C24), and the PS call is performed (at steps C25 to C35). Since these operations are those of the existing 3G network prescribed in the 3GPP standard, their description will be omitted.

As a result, the PDP context is activated and thereby the UE can communicate with the device of the remote party through Node B. Thereafter, if no communication state continues for a predetermined time, a RRC Disconnection automatically releases only the wireless channel between the UE and the Node B (at step C36) and then the preservation state occurs (at step C37).

After the communication connection is established based on the PDP context, when the UE moves from the Node B of the existing 3G network (Macro network) to the FAP (new) of the IMS-Femto network, the UE starts registering the CS position to the IMS-Femto network.

Since the CS position registration operation at steps C38 to C83 is the same as that at steps B1 to B44 except that the FAP (old) is substituted with the FAP (new), their description will be omitted. It is assumed that the UE starts registering the CS position at steps C38 to C83 in the state in which IPsec Tunnel (1) has been established between the FAP (new) and the PDG.

To register the PS position after the UE moves and performs handover, the UE transmits a Routing Area Update Request containing an old RAI that identifies the handover source Node B, an old P-TMSI that the UE received before it moved, and a PDP Context Status to the FAP (new) (at step C84).

Since the FAP (new) receives the Routing Area Update Request containing the PDP Context Status, the FAP (new) determines to successively use the PDP context and thereby transmits an address request (Request) for the PS server (new) that manages its own FAP (new) containing a default APN that has been set to its own FAP (new) to the DNS of the IMS-Femto network (at step C85).

When the DNS of the IMS-Femto network receives the address request (Request) containing the APN, the DNS sequentially sends back address information of PS servers according to the round robin scheme. In other words, the DNS transmits address information of a predetermined number of PS servers (address information of at least one PS server) and the FAP (new) successively determines whether or not the address information of a PS server can be allocated. If the address information of a PS server can be allocated, the FAP (new) is allocated to the PS server. If the address information of a PS server cannot be allocated, the DNS retransmits address information of the predetermined number of PS servers. In such a manner, the DNS sends back (answers) address information of the predetermined number of PS servers that can be allocated to the FAP (new) (at step C86).

When the FAP (new) receives the address of the PS server (new), the FAP (new) transmits an IKE-SA-INIT Request to the PS server (new) (at step C87).

When the PS server (new) receives the IKE-SA-INIT Request, the PS server (new) transmits an IKE-SA-INIT Response to the FAP (new) (at step C88).

When the FAP (new) receives the IKE-SA-INIT Response, the FAP (new) transmits an IKE-AUTH Request containing the APN and NAI (Network Access Identifier) to the PS server (new) (at step C89).

When the PS server (new) receives the IKE-AUTH Request, the PS server (new) transmits a Dia-EAP Request containing the NAI contained in the IKE-AUTH Request to the AAA (at step C90).

When the AAA receives the Dia-EAP Request, the AAA transmits a Dia-Wx-MAR containing the IMSI.UE of the NAI contained in the Dia-EAP Request to the HSS (at step C91).

When the HSS receives the Dia-Wx-MAR, the HSS transmits a MAP-SAI containing the IMSI.UE contained in the Dia-Wx-MAR to the HLR (at step C92). MAP-SAI is an acronym of MAP Send Authentication Info.

When the HLR receives the MAP-SAI, the HLR obtains authentication information for the IMSI.UE contained in the MAP-SAI and transmits a MAP-SAI Ack containing the authentication information to the HSS (at step C93).

When the HSS receives the MAP-SAI Ack, the HSS transmits a Dia-Wx-MAA containing the authentication information for the IMSI.UE contained in the MAP-SAI Ack to the AAA (at step C94).

When the AAA receives the Dia-Wx-MAA, the AAA transmits a Dia-EAP Answer containing the Result Code (multi-round) and EAP Request/AKA Challenge to the PS server (new) (at step C95).

When the PS server (new) receives the Dia-EAP Answer, the PS server (new) transmits an IKE-AUTH Response containing EAP Request/AKA Challenge to the FAP (new) (at step C96).

When the FAP (new) receives the IKE-AUTH Response, the FAP (new) transmits an Authentication Request to the UE (at step C97).

When the UE receives the Authentication Request, the UE transmits an Authentication Response to the FAP (new) (at step C98).

When the FAP (new) receives the Authentication Response, since the Routing Area Update Request contains the PDP Context Status at step C84 and thereby the FAP (new) determines to successively use the PDP context, the FAP (new) transmits an IKE-AUTH Request containing the old RAI and old P-TMSI contained in the Routing Area Update Request received at step C84, and the new RAI and new P-TMSI to the PS server (new) (at step C99). In this case, the new RAI is identification information that identifies the own device (FAP (new)). The new P-TMSI is a value issued by its own FAP (new) such that the NRI that is the identification information (PS server number) of the PS server (new) that manages its own FAP (new) is contained in the P-TMSI. As a technique that embeds an NRI in a P-TMSI, a predetermined number of last digits of a P-TMSI can be designated as an NRI in the same manner as the Iu-Flex function in the existing 3G network.

When the PS server (new) receives the IKE-AUTH Request, the PS server (new) transmits a Dia-EAP Request containing the EAP Response/AKA Challenge to the AAA (at step C100).

When the AAA receives the Dia-EAP Request, the AAA transmits a Dia-EAP Answer to the PS server (new) (at step C101). If the UE has been successfully authenticated, the AAA transmits a Dia-EAP Answer containing the Result Code (Success) and EAP Request/Success to the PS server (new).

When the PS server (new) receives the Dia-EAP Answer, the PS server (new) transmits a Dia-AA Request to the AAA (at step C102).

When the AAA receives the Dia-AA Request, the AAA transmits a Dia-AA Answer to the PS server (new) (at step C103). If the UE has been successfully authenticated, the AAA transmits a Dia-AA Answer containing the Result Code (Success) to the PS server (new).

In this case, the PS server (new) determines to successively use the PDP context based on the IKE-AUTH Request received from the FAP (new) at step C102. Thus, the PS server (new) checks a predetermined region that is for example a predetermined number of the last digits of the old P-TMSI contained in the IKE-AUTH Request as the NRI. If the PS server (new) cannot detect the NRI of its own PS server (new) from the old P-TMSI, the PS server (new) transmits an address request (Request) for the handover source SGSN containing the old RAI contained in the IKE-AUTH Request received from the FAP (new) to the DNS of the existing 3G network or packet public network (at step C104).

In this case, the DNS of the existing 3G network or packet public network cannot obtain the address of the handover source SGSN from the old RAI contained in the address request. In other words, the Iu-Flex function of the existing 3G network cannot obtain the address of the SGSN (old) that manages the Node B identified with the old RAI.

Thus, when the DNS of the existing 3G network or packet public network receives an address request from the PS server (new), the DNS sends back (answers) the address of the representative SGSN of the existing 3G network to the PS server (new) according to a technique based on the 3GPP standard (at step C105).

When the PS server (new) receives the address from the DNS, the PS server (new) transmits an SGSN Context Request to the address so as to successively use the PDP context (at step C106). Since the PS server (new) has received the address of the representative SGSN as the address of the handover source SGSN at step C105, the PS server (new) transmits an SGSN Context Request containing the IMSI.UE, old RAI, and old P-TMSI to the representative SGSN.

When the representative SGSN receives the SGSN Context Request, the representative SGSN obtains the NRI from the P-TMSI contained in the SGSN Context Request using the Iu-Flex function prescribed in the 3GPP technical specifications and determines that the SGSN identified with the NRI is the handover source SGSN (old).

The representative SGSN forwards the SGSN Context Request received from the PS server (new) to the address of the SGSN (old) identified according to a technique based on the 3GPP standard (at step C107).

When the SGSN (old) receives the SGSN Context Request, the SGSN (old) searches the subscriber profile of the PS-VLR for configuration information of the PDP context corresponding to the IMSI.UE based on the IMSI.UE, old RAI, and old P-TMSI contained in the SGSN Context Request so as to identify the configuration information of the PDP context corresponding to the IMSI.UE. The SGSN (old) transmits an SGSN Context Response containing the configuration information of the identified PDP context such that the PS server (new) successively uses the PDP context (at step C108). It is assumed that the configuration information of the PDP context contains at least the MM context, PDP context, IMSI_UE, and the address of the SGSN prescribed in the 3GPP standard.

When the PS server (new) receives the SGSN Context Response, the PS server (new) successively uses the PDP context based on the configuration information of the received PDP context in the same manner as performed in an SGSN of the existing 3G network. Thereafter, the PS server (new) sends back an SGSN Context Acknowledge containing the IMSI.UE to the SGSN (old) (at step C109).

Thereafter, the PS server (new) transmits a GTP: Update PDP Context Request to the GGSN (at step C110). When the GGSN receives the GTP: Update PDP Context Request, the GGSN updates communication path information and transmits a GTP: Update PDP Context Response to the PS server (new) (at step C111).

When the PS server (new) receives the GTP: Update PDP Context Response, the PS server (new) transmits a MAP Update GPRS Location containing the IMSI.UE to the HLR (at step C112).

When the HLR receives the MAP Update GPRS Location, the HLR transmits a MAP Cancel Location containing the IMSI.UE to the SGSN (old) (at step C113).

When the SGSN (old) receives the MAP Cancel Location, the SGSN (old) deletes the subscriber information (PS) of the UE identified with the IMSI.UE and transmits a MAP Cancel Location Ack to the HLR (at step C114).

When the HLR receives the MAP Cancel Location Ack, the HLR transmits a MAP Insert Subscriber Data containing the subscriber information of IMSI.UE to the PS server (new) (at step C115).

When the PS server (new) receives the MAP Insert Subscriber Data, the PS server (new) creates a subscriber profile (PS) based on the subscriber information of IMSI.UE and stores it as the PS-VLR. Thereafter, the PS server (new) sends back a MAP Insert Subscriber Data Ack to the HLR (at step C116).

When the HLR receives the MAP Insert Subscriber Data Ack, the HLR transmits a MAP Update GPRS Location Ack to the PS server (new) (at step C117).

When the PS server (new) receives the MAP Update GPRS Location Ack, the PS server (new) transmits an IKE-AUTH Response containing the EAP Request/Success to the FAP (new) (at step C118).

When the FAP (new) receives the IKE-AUTH Response, the FAP (new) transmits a Security Mode Command to the UE (at step C119).

When the UE receives the Security Mode Command, the UE transmits a Security Mode Complete to the FAP (new) (at step C120).

When the FAP (new) receives the Security Mode Complete, the FAP (new) performs a 3G wireless encryption process and transmits an IKE-AUTH Request to the PS server (new) (at step C121). The FAP (new) performs the 3G wireless encryption process according to a technique based on the 3GPP standard.

When the PS server (new) receives the IKE-AUTH Request, the PS server (new) transmits an IKE-AUTH Response to the FAP (new) (at step C122).

When the FAP (new) receives the IKE-AUTH Response, IPsec Tunnel (4) is established between the FAP (new) and the PS server (new) (at step C123). Thereafter, the FAP (new) transmits a Routing Area Update Accept containing the P-TMSI to the UE (at step C124).

At this point, the FAP (new) has received the NRI that is the identification information of the PS server (new) that manages its own FAP (new) from the PS server (new) and has stored the NRI in its own FAP (new).

The NRI transmitted from the PS server (new) to the FAP (new) that the PS server (new) manages may be contained in any one of predetermined signals transmitted from the PS server (new) to the FAP (new) in the foregoing example. The NRI may be contained in any one of signals transmitted from the PS server (new) to the FAP (new) at any one of the foregoing steps C88, C96, C118, and C122. In particular, it is preferred that the NRI be contained in any one of these signals at C118 or C122.

The PS server (new) may notify the FAP (new) of the NRI in such a manner that the PS server (new) transmits the NRI itself to the FAP (new). Alternatively, the PS server (new) may issue a P-TMSI that contains the NRI and transmit the P-TMSI to the FAP (new).

Alternatively, the identification information (NRI) of the PS server (new) can be received from a PDG instead of the FAP (new). In this case, it is assumed that a PDG is specifically allocated to a PS server and that the FAP (new) has stored the NRI of the PS server allocated to the PDG.

The NRI transmitted from the PDG to the FAP (new) may be contained in any one of predetermined signals transmitted from the PDG to the FAP (new) in the foregoing example. The NRI may be contained in any one of signals transmitted from the PDG to the FAP (new) at any one of the foregoing steps C42, C50, C58, C60, and C62.

The PDG may notify the FAP (new) of the NRI of the PS server that manages the FAP (new) in such a manner that the PDG transmits the NRI itself to the FAP (new). Alternatively, the PDG may issue a P-TMSI that contains the NRI and transmit the P-TMSI to the FAP (new).

At this point, the FAP (new) has stored the identification information (NRI) of the PS server (new) that manages its own FAP (new) in its own FAP (new). Thus, when the FAP (new) embeds the P-TMSI in the Routing Area Update Accept, the FAP (new) issues the P-TMSI such that it contains the NRI. Thereafter, the FAP (new) transmits the Routing Area Update Accept to the UE. As a technique that embeds an NRI in a P-TMSI, a predetermined number of last digits of a P-TMSI can be designated as an NRI in the same manner as the Iu-Flex function in the existing 3G network. Thus, the Routing Area Update Accept transmitted to the UE contains a P-TMSI in the same manner in which an NRI is contained by the Iu-Flex function in the existing 3G network.

When the PS server (new) issues a P-TMSI containing an NRI of its own PS server (new) PS server (new) notifies the FAP (new) of the NRI, the FAP (new) also transmits the Routing Area Update Accept containing the P-TMSI received from the PS server (new) to the UE at step C124 in the same manner as the foregoing example.

When the UE receives the Routing Area Update Accept, the UE stores the P-TMSI in its own UE and transmits a Routing Area Update Complete to the FAP (new) (at step C125).

As a result, after the UE moves and performs PS handover, the PDP context is activated and thereby the UE can communicate with the device of the remote party through the handover destination FAP (new). Thereafter, if no communication state continues for a predetermined time, the wireless channel between the UE and the FAP (new) is automatically released and the preservation state occurs (at step C126).

<Example of PS Handover Operation Between FAPs of IMS-Femto Network (Between Different PS Servers)>

Next, with reference to sequence diagrams shown in FIG. 17A to FIG. 20B, an example of an operation is provided in the case that a UE hands over from an FAP that belongs to one PS server of the IMS-Femto network according to this embodiment to an FAP that belongs to another PS server of the IMS-Femto network.

In the following description, it is assumed that an FAP to which a UE belonged before it moved and performed handover is referred to as the FAP (old), a PS server that manages the FAP (old) is referred to as a PS server (old), an FAP to which the UE belongs after it moved is referred to as the FAP (new), and a PS server that manages the FAP (new) is referred to as the PS server (new). In addition, it is assumed that IPsec Tunnel (1) has been established between each of the FAP (old) and FAP (new) and a PDG.

Since the position registration operation to an FAP before the UE moves and performs handover and so forth are the same as steps B1 to B114 of that of the sequence diagrams shown in FIG. 5A to FIG. 8, their description will be omitted. It is assumed that after the PDP context is activated, the preservation state occurs in the same manner as that at step B115 (at step D1).

After the PDP context is activated and communication connection is established, when the UE moves from the FAP (old) to the FAP (new) of the same IMS-Femto network, the UE starts registering the CS position to the IMS-Femto network.

Since steps D2 to D48 of the CS position registration operation of steps D2 to D50 are the same as steps B1 to B44 except that the FAP (old) is substituted with the FAP (new), their description will be omitted.

When the CS position of the FAP (new) is registered at steps D2 to D48, the IMS core transmits an SIP NOTIFY to the FAP (old) (at step D49). The IMS core sets state="terminated," event="deactivated," and so forth to the Contact tag of the body of the SIP NOTIFY such that the message represents De-Register.

When the FAP (old) receives the SIP NOTIFY, the FAP (old) deletes the subscriber information (CS) of the UE, releases connection to the IMS core, and transmits an SIP-200 OK to the IMS core (at step D50).

Thereafter, to register the PS position after the UE performs handover, the UE transmits a Routing Area Update Request containing the old RAI that identifies the handover source FAP (old), the old P-TMSI that the UE received before it moved, and the PDP Context Status to the FAP (new) (at step D51).

Since the FAP (new) receives the Routing Area Update Request containing the PDP Context Status, the FAP (new) determines to successively use the PDP context and thereby transmits an address request (Request) for the PS server (new) that manages its own FAP (new) containing a default APN that has been set in its own FAP (new) to the DNS of the IMS-Femto network (at step D52).

When the DNS of the IMS-Femto network receives the address request (Request) containing the APN, the DNS sequentially sends back address information of PS servers according to the round robin scheme. In other words, the DNS transmits address information of a predetermined number of PS servers and then the FAP (new) determines whether or not address information of a PS server can be allocated. If the address information of a PS server can be allocated, the FAP (new) is allocated to the PS server. If the address information of a PS server cannot be allocated, the DNS retransmits address information of a predetermined number of PS servers. The DNS sends back (answers) the address information of PS servers that can be allocated to the FAP (new) (at step D53).

When the FAP (new) receives the address of the PS server (new), the FAP (new) transmits an IKE-SA-INIT Request to the PS server (new) (at step D54).

When the PS server (new) receives the IKE-SA-INIT Request, the PS server (new) transmits an IKE-SA-INIT Response to the FAP (new) (at step D55).

When the FAP (new) receives the IKE-SA-INIT Response, the FAP (new) transmits an IKE-AUTH Request containing the APN and NAI (Network Access Identifier) to the PS server (new) (at step D56).

When the PS server (new) receives the IKE-AUTH Request, the PS server (new) transmits a Dia-EAP Request containing the NAI contained in the IKE-AUTH Request to the AAA (at step D57).

When the AAA receives the Dia-EAP Request, the AAA transmits a Dia-Wx-MAR containing the IMSI.UE of the NAI contained in the Dia-EAP Request to the HSS (at step D58).

When the HSS receives the Dia-Wx-MAR, the HSS transmits a MAP-SAI containing the IMSI.UE contained in the Dia-Wx-MAR to the HLR (at step D59). MAP-SAI is an acronym of MAP Send Authentication Info.

When the HLR receives the MAP-SAI, the HLR obtains authentication information for the IMSI.UE contained in the MAP-SAI and transmits a MAP-SAI Ack containing the authentication information to the HSS (at step D60).

When the HSS receives the MAP-SAI Ack, the HSS transmits a Dia-Wx-MAA containing the authentication information for the IMSI.UE contained in the MAP-SAI Ack to the AAA (at step D61).

When the AAA receives the Dia-Wx-MAA, the AAA transmits a Dia-EAP Answer containing the Result Code (multi-round) and EAP Request/AKA Challenge to the PS server (new) (at step D62).

When the PS server (new) receives the Dia-EAP Answer, the PS server (new) transmits an IKE-AUTH Response containing the EAP Request/AKA Challenge to the FAP (new) (at step D63).

When the FAP (new) receives the IKE-AUTH Response, the FAP (new) transmits an Authentication Request to the UE (at step D64).

When the UE receives the Authentication Request, the UE transmits an Authentication Response to the FAP (new) (at step D65).

When the FAP (new) receives the Authentication Response, since the Routing Area Update Request contains the PDP Context Status at step D51 and thereby the FAP (new) determines to successively use the PDP context, the FAP (new) transmits an IKE-AUTH Request containing the old RAI and old P-TMSI contained in the Routing Area Update Request received at step D51, and the new RAI and new P-TMSI to the PS server (new) (at step D66). In this case, the new RAI is identification information that identifies the own device (FAP (new)). The new P-TMSI is a value issued by its own FAP (new) such that the NRI that is the identification information (PS server number) of the PS server (new) that manages its own FAP (new) is contained in the P-TMSI. As a technique that embeds an NRI in a P-TMSI, a predetermined number of last digits of a P-TMSI can be designated as an NRI in the same manner as the Iu-Flex function in the existing 3G network.

When the PS server (new) receives the IKE-AUTH Request, the PS server (new) transmits a Dia-EAP Request containing the EAP Response/AKA Challenge to the AAA (at step D67).

When the AAA receives the Dia-EAP Request, the AAA transmits a Dia-EAP Answer to the PS server (new) (at step D68). If the UE has been successfully authenticated, the AAA transmits the Dia-EAP Answer containing the Result Code (Success) and EAP Request/Success to the PS server (new).

When the PS server (new) receives the Dia-EAP Answer, the PS server (new) transmits a Dia-AA Request to the AAA (at step D69).

When the AAA receives the Dia-AA Request, the AAA transmits a Dia-AA Answer to the PS server (new) (at step D70). If the UE has been successfully authenticated, the AAA transmits the Dia-AA Answer containing the Result Code (Success) to the PS server (new).

In this case, the PS server (new) determines to successively use the PDP context based on the IKE-AUTH Request received from the FAP (new) at step D66. Thus, the PS server (new) checks a predetermined region that is for example a predetermined number of last digits of the old P-TMSI contained in the IKE-AUTH Request as the NRI. If the PS server (new) cannot detect the NRI of its own PS server (new) from the old P-TMSI, the PS server (new) transmits an address request (Request) for the handover source SGSN containing the old RAI contained in the IKE-AUTH Request received from the FAP (new) to the DNS of the existing 3G network or packet public network (at step D71).

The DNS of the existing 3G network or packet public network has correlatively stored all FAPs and RAIs to the address of the representative PS server. Thus, when the DNS receives an address request containing the RAI of the FAP (old), the DNS sends back (answers) the address of the representative PS server that has been preset in the IMS-Femto network to the PS server (new) (at step D72).

When the PS server (new) receives the address from the DNS, the PS server (new) transmits an SGSN Context Request to the address so as to successively use the PDP context (at step D73). Since the PS server (new) has received the address of the representative PS server as the address of the handover source SGSN at step D72, the PS server (new) transmits the SGSN Context Request containing the IMSI.UE, old RAI, and old P-TMSI to the address of the representative SGSN at step D73.

When the representative PS server receives the SGSN Context Request, the representative PS server checks a predetermined region that is for example a predetermined number of last digits of the old P-TMSI contained in the SGSN Context Request as the NRI. The representative PS server has correlatively stored the address information of each PS server and an NRI that is a number that identifies each PS server. Thus, if a number obtained from the predetermined region of the received P-TMSI matches any one of stored NRIs, the representative PS server identifies the address information correlated with the matched NRI as address information of the PS server (old) that manages the handover source FAP (old) to which the UE belonged before it moved.

The representative PS server forwards the SGSN Context Request received from the PS server (new) to the address of the identified PS server (old) (at step D74).

When the PS server (old) receives the SGSN Context Request, the PS server (old) searches the subscriber profile of the PS-VLR for configuration information of the PDP context corresponding to the IMSI.UE based on the IMSI.UE, old RAI, and old P-TMSI contained in the SGSN Context Request so as to identify the configuration information of the PDP context corresponding to the IMSI.UE. The PS server (old) transmits an SGSN Context Response containing the configuration information of the identified PDP context the PS server (new) so as to successively use the PDP context (at step D75). It is assumed that the configuration information of the PDP context contains at least the MM context, PDP context, IMSI_UE, and the address of the SGSN prescribed in the 3GPP standard.

When the PS server (new) receives the SGSN Context Response, the PS server (new) successively uses the PDP context based on the configuration information of the received PDP context in the same manner as performed in an SGSN of the existing 3G network. Thereafter, the PS server (new) sends back an SGSN Context Acknowledge containing the IMSI.UE to the SGSN (old) (at step D76).

When the PS server (old) receives the SGSN Context Acknowledge, the PS server (old) deletes the subscriber information (PS) of the UE identified with the IMSI.UE so as to release the resources. Thereafter, the PS server (old) transmits a Session Termination Request to the AAA (at step D77).

When the AAA receives the Session Termination Request, the AAA sends back a Session Termination Answer to the PS server (old) (at step D78).

When the PS server (old) receives the Session Termination Answer, the PS server (old) transmits an Informational Request containing the IMSI.UE to the FAP (old) (at step D79).

When the FAP (old) receives the Informational Request, the FAP (old) deletes the subscriber information (PS) of the UE identified with the IMSI.UE so as to release the resources. Thereafter, the FAP (old) sends back an Informational Response to the PS server (old) (at step D80). As a result, IPsec Tunnel (4) is released between the FAP (old) and the PS server (old) (at step D81).

Thereafter, the PS server (new) transmits a GTP: Update PDP Context Request to the GGSN (at step D82). When the GGSN receives the GTP: Update PDP Context Request, the GGSN updates communication path information and transmits a GTP: Update PDP Context Response to the PS server (new) (at step D83).

When the PS server (new) receives the GTP: Update PDP Context Response, the PS server (new) transmits a MAP Update GPRS Location containing the IMSI.UE to the HLR (at step D84).

When the HLR receives the MAP Update GPRS Location, the HLR transmits a MAP Cancel Location containing the IMSI.UE to the SGSN (old) (at step D85).

When the PS server (old) receives the MAP Cancel Location, since the subscriber information (PS) of the UE identified with the IMSI.UE has been deleted, the PS server (old) simply transmits a MAP Cancel Location Ack to the HLR (at step D86).

When the HLR receives the MAP Cancel Location Ack, the HLR transmits a MAP Insert Subscriber Data containing the IMSI.UE to the PS server (new) (at step D87).

When the PS server (new) receives the MAP Insert Subscriber Data, the PS server (new) creates a subscriber profile (PS) based on the subscriber information of IMSI.UE and stores it as the PS-VLR. Thereafter, the PS server (new) sends back a MAP Insert Subscriber Data Ack to the HLR (at step D88).

When the HLR receives the MAP Insert Subscriber Data Ack, the HLR transmits a MAP Update GPRS Location Ack to the PS server (new) (at step D89).

When the PS server (new) receives the MAP Update GPRS Location Ack, the PS server (new) transmits an IKE-AUTH Response containing the EAP Request/Success to the FAP (new) (at step D90).

When the FAP (new) receives the IKE-AUTH Response, the FAP (new) transmits a Security Mode Command to the UE (at step D91).

When the UE receives the Security Mode Command, the UE transmits a Security Mode Complete to the FAP (new) (at step D92).

When the FAP (new) receives the Security Mode Complete, the FAP (new) performs a 3G wireless encryption process and transmits an IKE-AUTH Request to the PS server (new) (at step D93). The FAP (new) performs the 3G wireless encryption process according to a technique based on the 3GPP standard.

When the PS server (new) receives the IKE-AUTH Request, the PS server (new) transmits an IKE-AUTH Response to the FAP (new) (at step D94).

When the FAP (new) receives the IKE-AUTH Response, IPsec Tunnel (4) is established between the FAP (new) and the PS server (new) (at step D95). Thereafter, the FAP (new) transmits a Routing Area Update Accept containing the P-TMSI to the UE (at step D96).

At this point, the FAP (new) issues the P-TMSI such that it contains an NRI that is identification information (PS server number) of the PS server (new) that manages its own FAP (new) device and then transmits the P-TMSI to the UE. As a technique that embeds an NRI in a P-TMSI, a predetermined number of last digits of a P-TMSI can be designated as an NRI in the same manner as the Iu-Flex function in the existing 3G network. Thus, the Routing Area Update Accept transmitted to the UE contains a P-TMSI in the same manner in which an NRI is contained by the Iu-Flex function in the existing 3G network.

When the UE receives the Routing Area Update Accept, the UE stores the P-TMSI in its own UE and transmits a Routing Area Update Complete to the FAP (new) (at step D97).

As a result, after the UE moves and performs handover, the PDP context is activated and thereby the UE can communicate with the device of the remote party through the handover destination FAP (new). Thereafter, if no communication state continues for a predetermined time, a RRC Disconnection automatically releases only the wireless channel between the UE and the FAP (new) is released then the preservation state occurs (at step D98).

<Example of PS Handover Operation Between FAPs of IMS-Femto Network (that Belongs to One PS Server)>

Next, with reference to sequence diagrams shown in FIG. 21A to FIG. 24, an example of an operation is provided in the case that a UE hands over from an FAP that belongs to one PS server in the IMS-Femto network according to this embodiment to another FAP that belongs to the same PS server will be described.

In the following description, it is assumed that an FAP to which a UE belonged before it moved and before handover was performed to as the FAP (old), an FAP to which the UE belongs after it moved is referred to as the FAP (new) and the FAP (old) and the FAP (new) belong to the same PS server. In addition, it is assumed that IPsec Tunnel (1) has been established between each of the FAP (old) and FAP (new) and a PDG.

Since the position registration operation to an FAP before the UE moves and performs handover and so forth are the same as steps B1 to B114 of that of the sequence diagrams shown in FIG. 5A to FIG. 8, their description will be omitted. It is assumed that after the PDP context is activated, the preservation state occurs in the same manner as that at step B115 (at step E1).

After the PDP context is activated and communication connection is established, when the UE moves from the FAP (old) to the FAP (new) of the same IMS-Femto network, the UE starts registering the CS position to the IMS-Femto network.

Since steps E2 to E50 of the CS position registration operation are the same as steps D2 to D50 of that in the sequence diagrams shown in FIG. 17A to FIG. 20B, their description will be omitted.

Likewise, since steps E51 to E70 of the PS position registration operation are the same as step D51 to D70 of that of the sequence diagrams shown in FIG. 17A to FIG. 20B, their description will be omitted.

After the AAA has successfully authenticated the UE, the PS server determines to successively use the PDP context based on the IKE-AUTH Request received from the FAP (new) at step E66. Thus, the AAA checks a predetermined region that is for example a predetermined number of last digits of the old P-TMSI as the NRI. When the AAA detects the NRI of its own PS server from the P-TMSI, the AAA searches the subscriber profile (PS) of the PS-VLR of its own PS server for configuration information of the PDP context based on the old P-TMSI and old RA so as to identify the configuration information of the PDP context corresponding to the IMSI.UE. The configuration information of the PDP context contains at least the MM context, PDP context, IMSI_UE, and the address of the SGSN prescribed in the 3 GPP Standard.

The PS server successively uses the PDP context in its own PS server based on the configuration information of the identified PDP context in the same manner as performed in an SGSN in the existing 3G network.

In addition, the PS server deletes the subscriber profile (PS) of the UE that belongs to the FAP (old) from the PS-VLR so as to release the resources.

Thereafter, the PS server transmits a Session Termination Request to the AAA (at step E71).

When the AAA receives the Session Termination Request, the AAA sends back a Session Termination Answer to the PS server (at step E72).

When the PS server receives the Session Termination Answer, the PS server transmits an Informational Request containing the IMSI.UE to the FAP (old) (at step E73).

When the FAP (old) receives the Informational Request, the FAP (old) deletes the subscriber information (PS) of the UE identified with the IMSI.UE so as to release the resources. Thereafter, the FAP (old) sends back an Informational Response to the PS server (at step E74). As a result, IPsec Tunnel (4) is released between the FAP (old) and the PS server (at step E75).

Thereafter, the PS server transmits a GTP: Update PDP Context Request to the GGSN (at step E76). When the GGSN receives the GTP: Update PDP Context Request, the GGSN updates communication path information and transmits a GTP: Update PDP Context Response to the PS server (at step E77).

When the PS server receives the GTP: Update PDP Context Response, the PS server transmits a MAP Update GPRS Location containing the IMSI.UE to the HLR (at step E78).

When the HLR receives the MAP Update GPRS Location, the HLR transmits a MAP Insert Subscriber Data containing the IMSI.UE to the PS server (at step E79).

When the PS server receives the MAP Insert Subscriber Data, the PS server creates a subscriber profile (PS) based on the subscriber information of IMSI.UE and stores it as the PS-VLR. Thereafter, the PS server sends back a MAP Insert Subscriber Data Ack to the HLR (at step E80).

When the HLR receives the MAP Insert Subscriber Data Ack, the HLR transmits a MAP Update GPRS Location Ack to the PS server (at step E81).

When the PS server receives the MAP Update GPRS Location Ack, the PS server transmits an IKE-AUTH Response containing the EAP Request/Success to the FAP (new) (at step E82).

When the FAP (new) receives the IKE-AUTH Response, the FAP (new) transmits a Security Mode Command to the UE (at step E83).

When the UE receives the Security Mode Command, the UE transmits a Security Mode Complete to the FAP (new) (at step E84).

When the FAP (new) receives the Security Mode Complete, the FAP (new) performs a 3G wireless encryption process and transmits an IKE-AUTH Request to the PS server (at step E85). The FAP (new) performs the 3G wireless encryption process according to a technique based on the 3GPP standard.

When the PS server receives the IKE-AUTH Request, the PS server transmits an IKE-AUTH Response to the FAP (new) (at step E86).

When the FAP (new) receives the IKE-AUTH Response, IPsec Tunnel (4) is established between the FAP (new) and the PS server (at step E87). Thereafter, the FAP (new) transmits a Routing Area Update Accept containing the P-TMSI to the UE (at step E88).

At this point, the FAP (new) issues the P-TMSI such that it contains an NRI that is identification information (PS server number) of the PS server that manages its own FAP (new) and then transmits the P-TMSI to the UE. As a technique that embeds an NRI in a P-TMSI, a predetermined number of last digits of a P-TMSI can be designated as an NRI in the same manner as the Iu-Flex function in the existing 3G network. Thus, the Routing Area Update Accept transmitted to the UE contains a P-TMSI in the same manner in which an NRI is contained by the Iu-Flex function in the existing 3G network.

When the UE receives the Routing Area Update Accept, the UE stores the P-TMSI in its own UE and transmits a Routing Area Update Complete to the FAP (new) (at step E89).

As a result, after the UE moves and performs handover, the PDP context is activated and thereby the UE can communicate with the device of the remote party through the handover destination FAP (new). Thereafter, if no communication state continues for a predetermined time, only the wireless channel between the UE and the FAP (new) is released and then the preservation state occurs (at step E90).

Effects of Embodiment

As described above, when PS handover is performed in the IMS-Femto network according to the embodiment of the present invention, the PDP context can be successively used. Thus, PS handover can be performed between the IMS-Femto network and the existing mobile communication network such as existing 3G network in the same manner as that performed in the existing 3G network.

More specifically, when PS handover is performed from the IMS-Femto network according to this embodiment to the existing 3G network, identification information (NRI) that identifies the handover source PS server (old) is embedded in a P-TMSI contained in the Attach Accept transmitted to the UE at step B74.

As another example, identification information (NRI) that identifies the handover source PS server (old) is embedded in a P-TMSI contained in the P-TMSI Real Location Command transmitted to the UE at step B200.

As a result, after the UE moves, when the representative PS server receives the SGSN Context Request at step B138, the representative PS server can identify the handover source PS server (old) with the P-TMSI contained in the SGSN Context Request and forward the received SGSN Context Request to the identified PS server (old). Thus, the PDP context can be successively used by PS handover performed between the IMS-Femto network and the existing 3G network in the same manner as that performed in the existing 3G network.

When PS handover is performed from the existing 3G network to the IMS-Femto network according to this embodiment, the handover destination PS server (new) transmits the SGSN Context Request containing the P-TMSI that contains identification information (NRI) that identifies the handover source SGSN (old) using the Iu-Flex function according to the 3GPP technical specifications to the representative SGSN of the existing 3G network that contains the handover source SGSN at step C106.

As a result, the SGSN Context Request can be forwarded from the representative SGSN of the existing 3G network to the handover source SGSN in the same manner as that performed in the existing 3G network. Thus, the PDP context can be successively used by PS handover performed between the IMS-Femto network and the existing 3G network in the same manner as that performed in the existing 3G network.

When PS handover is performed from an FAP that belong to one PS server in the IMS-Femto network according to this embodiment to another FAP that belongs to another PS server, the representative PS server that receives the SGSN Context Request at step D73 can identify the handover source PS server (old) based on the P-TMSI contained in the SGSN Context Request and forwards the received SGSN Context Request to the identified PS server (old) in the same manner as that performed from the foregoing IMS-Femto network to the existing 3G network.

Thus, the PDP context can be successively used by PS handover performed between the IMS-Femto network and the existing 3G network in the same manner as that performed in the existing 3G network.

When PS handover is performed from an FAP that belongs to one PS server of the IMS-Femto network according to this embodiment to another FAP that belongs to the same PS server, the PS server that manages the handover destination FAP determines that the NRI embedded in the old P-TMSI contained in the IKE-AUTH Request received at step E66 so as to successively use the PDP context in the own device.

Thus, the PDP context can be successively used by PS handover performed between the IMS-Femto network and the existing 3G network in the same manner as that performed in the existing 3G network.

According to this embodiment, since the PDP context is successively used as described above, PS handover can be performed between the IMS-Femto network and the existing 3G network in the same manner as that performed in the existing 3G network without having to reactivate the PDP context at the PS handover destination SGSN.

Thus, even if PS handover is performed during packet communication or in the preservation state where no communication state continues for a predetermined time in the packet communication state, the packet communication can be continued in the same manner as that performed in the existing 3G network.

In addition, according to this embodiment, since a PS server virtually configures an SGSN function section, signals can be transmitted and received between the IMS-Femto network and a device that belongs to a network other than the IMS-Femto network (for example, an SGSN of the existing 3G network) in the same manner as those between SGSNs of the existing 3G network. Thus, according to this embodiment, a network other than the IMS-Femto network such as the existing 3G network recognizes a PS server to be an SGSN such that the PDP context can be successively used by PS handover using signals transmitted and received as prescribed in the applied standards such as 3GPP TS 23.236.

Thus, the foregoing effects can be obtained without having to modify individual devices of the existing mobile communication network such as the existing 3G network.

In the foregoing, PS handover performed between the existing 3G network and the IMS-Femto network was described. The SGSN function section of a PS server of the IMS-Femto network is recognized as an SGSN by a device that belongs to a network other than the IMS-Femto network. Thus, a PS server of the IMS-Femto network is identified as an SGSN of the existing 3G network by any one of a various types of mobile communication networks such as an LTE network. As a result, when PS handover is performed between any one of various types of mobile communication networks such as an LTE network and the IMS-Femto network, the PDP context can be successively used according to a process as prescribed in standards such as 3GPP standard in the same manner as the foregoing embodiment.

Since the foregoing embodiment is just a preferred embodiment of the present invention, the present invention can be modified in various manners based on the spirit of the present invention.

For example, Non-Patent Literature 1 presented in this specification is just an example. Thus, the communication system according to this embodiment can not be realized not based on the version of the 3GPP standard described in Non-Patent Literature 1.

In addition, the foregoing embodiment describes that a UE moves in the preservation state. Instead, as a series of handover operations are performed, the wireless channel between a UE and an FAP or a Node B is released regardless of whether or not the preservation state occurs when the UE moves. In other words, when PS handover is performed as the UE moves after the PS communication is established, each function of the foregoing embodiment can be realized regardless of which or not the preservation state occurs.

An example of a configuration in which a PS server accomplishes the SGSN function section is described. As long as the function can be accomplished, the device that accomplishes the function is not limited to a PS server. Instead, even if another device such as a PDG operates as a service control device that has the SGSN function section of the foregoing embodiment, the present invention can be accomplished likewise.

Thus, as long as the function of each device of the foregoing embodiment can be realized, a device that implements the function may not be limited to the foregoing embodiment. Instead, even if other device implements such functions, the present invention can be realized likewise.

In other words, each device and each system described in this specification is a logical set of function sections (function modules and devices) that realizes individual functions regardless of whether or not the individual function sections are provided in a device or provided in a single housing.

The control operation of each device that configures the communication system according to the foregoing embodiment can be executed by hardware, software, or a hybrid configuration of the both.

When a process is executed by software, a program that codes a process sequence can be installed in memory provided in a computer that is built in dedicated hardware and executed. Alternatively, the program may be installed in a general purpose computer that can execute various processes and executed.

For example, the program can be pre-recorded on a hard disk or a ROM (Read Only Memory) as a record medium. Alternatively, the program can be temporarily or permanently stored (recorded) on a removable record medium. Such a removable record medium can be provided as so-called package software. Examples of the removable record medium include floppy (registered trademark) disk, CD-ROM (Compact Disc Read Only Memory), MO (Magneto Optical) disc, DVD (Digital Versatile Disc), magnetic disc, and semiconductor memory.

The program is installed from the foregoing removable record medium to the computer. Alternatively, the program may be wirelessly transferred from a download site to the computer. Further alternatively, the program may be wired to the computer through a network.

In the communication system according to the foregoing embodiment, processes may be executed in time series as described in the foregoing embodiment. Alternatively, processes may be executed in parallel or discretely when necessary or depending on the capability of the device that executes the processes.

In addition, the communication system according to the foregoing embodiment may be composed of a logical set of a plurality of devices. Alternatively, the communication system according to the foregoing embodiment may be accommodated in a single housing.

With reference to the embodiments, the present invention has been described. However, it should be understood by those skilled in the art that the structure and details of the present invention may be changed in various manners without departing from the scope of the present invention.

The present application claims priority based on Japanese Patent Application JP 2011-203677 filed on Sep. 16, 2011, the entire contents of which are incorporated herein by reference in its entirety.

The invention claimed is:

1. A communication system that configures an IMS (IP Multimedia Subsystem) network, comprising:
    a femtocell base station;
    a service control device; and
    a core device that controls a call,
    wherein said service control device has an SGSN (Serving GPRS Support Node) function section that sends back a signal transmitted from a network that uses a communication procedure different from that of the IMS network in the same manner as a signal transmitted from an SGSN, a plurality of service control devices being provided in said IMS network,
    wherein one of the plurality of service control devices has been designated as a representative service control device,
    wherein said representative service control device correlatively stores identification information of each of said plurality of service control devices and address information of service control devices identified with the identification information,
    wherein said femtocell base station has transmission means that transmits a P-TMSI (Packet-Temporary Mobile Subscriber Identity) that accords with a communication procedure prescribed in an applicable standard and that contains identification information of a service control device that manages the its own femtocell base station to a UE (User Equipment) that belongs to the femtocell base station, and
    wherein said representative service control device has representative control means that
        receives the P-TMSI contained in a PDP (Packet Data Protocol) context succession request signal from the UE according to a handover communication procedure prescribed in the applicable standard after the UE moves,
        determines whether or not the service control device, which is identified with the identification information, is the representative service control device based on the identification information contained in the received P-TMSI,
        identifies the service control device identified with the identification information as a service control device that manages a femtocell base station to which the UE belonged before it moved unless the service control device identified with the identification information contained in the received P-TMSI is determined to be its own representative service control device, and
        forwards said PDP context succession request signal to the identified service control device.

2. The communication system as set forth in claim 1, wherein when a PS (Packet Switching) position of the UE is registered according to the handover communication procedure prescribed in the applicable standard after the UE moves, if the service control device identified with the identification information contained in the P-TMSI received from said femtocell base station that belongs to the service control device is its own service control device, said SGSN function section successively uses the PDP context in its own service control device.

3. The communication system as set forth in claim 1, wherein said femtocell base station has obtaining means that obtains the identification information of the service control device that manages its own femtocell base station from a higher hierarchical device as the PS position of the UE is registered to said core device that belongs to the femtocell base station or as a PS call signal is transmitted or received to or from the core device, and
    wherein said transmission means embeds the identification information of the service control device obtained by said obtaining means in the P-TMSI and transmits the P-TMSI containing the identification information to the UE.

4. A communication method for a communication system that configures an IMS (IP Multimedia Subsystem) network, wherein said IMS network comprises:
    a femtocell base station;
    a service control device; and
    a core device that controls a call,
    wherein said service control device has an SGSN (Serving GPRS Support Node) function section that sends back a signal transmitted from a network that uses a communication procedure different from that of the IMS network in the same manner as a signal transmitted from an SGSN, a plurality of service control devices being provided in said IMS network,
    wherein one of the plurality of service control devices has been designated as a representative service control device,
    wherein said representative service control device correlatively stores identification information of each of said plurality of service control devices and address information of service control devices identified with the identification information, wherein the communication method comprises:

a transmission step that causes said femtocell base station to transmit a P-TMSI (Packet-Temporary Mobile Subscriber Identity) that accords with a communication procedure prescribed in an applicable standard and that contains identification information of a service control device that manages its own femtocell base station to a UE (User Equipment) that belongs to the femtocell base station, and a representative control step that causes said representative service control device to receive the P-TMSI contained in a PDP (Packet Data Protocol) context succession request signal from the UE according to a handover communication procedure prescribed in the applicable standard after the UE moves, determine whether or not the service control device, which is identified with the identification information, is the representative service control device based on the identification information contained in the received P-TMSI, identify the service control device identified with the identification information as a service control device that manages a femtocell base station to which the UE belonged before it moved unless the service control device identified with the identification information contained in the received P-TMSI is determined to be its own representative service control device, and forward said PDP context succession request signal to the identified service control device.

5. The communication method as set forth in claim 4, wherein when a PS (Packet Switching) position of the UE is registered according to the handover communication procedure prescribed in the applicable standard after the UE moves, if the service control device identified with the identification information contained in the P-TMSI received from said femtocell base station that belongs to the service control device is its own service control device, said SGSN function section successively uses the PDP context in the own device.

6. The communication method as set forth in claim 4, wherein said method further comprises obtaining step that causes said femtocell base station to obtain the identification information of the service control device that manages its own femtocell base station from a higher hierarchical device as the PS position of the UE is registered to said core device that belongs to the femtocell base station or as a PS call signal is transmitted or received to or from the core device, and wherein said transmission step is performed by embedding the identification information of the service control device obtained at said obtaining step in the P-TMSI and transmitting the P-TMSI containing the identification information to the UE.

* * * * *